US010254764B2

(12) United States Patent
Laubinger et al.

(10) Patent No.: US 10,254,764 B2
(45) Date of Patent: Apr. 9, 2019

(54) PLATOON CONTROLLER STATE MACHINE

(71) Applicant: Peloton Technology, Inc., Mountain View, CA (US)

(72) Inventors: Lorenz Laubinger, San Francisco, CA (US); Stephen M. Erlien, Mountain View, CA (US); Joshua P. Switkes, Mountain View, CA (US)

(73) Assignee: Peloton Technology, Inc., Mountain View, CA (US)

( * ) Notice: Subject to any disclaimer, the term of this patent is extended or adjusted under 35 U.S.C. 154(b) by 72 days.

(21) Appl. No.: 15/607,902

(22) Filed: May 30, 2017

(65) Prior Publication Data

US 2017/0344023 A1 Nov. 30, 2017

Related U.S. Application Data

(60) Provisional application No. 62/377,970, filed on Aug. 22, 2016, provisional application No. 62/363,192, (Continued)

(51) Int. Cl.
*G05D 1/02* (2006.01)
*G08G 1/00* (2006.01)
(Continued)

(52) U.S. Cl.
CPC ......... *G05D 1/0272* (2013.01); *B60W 30/165* (2013.01); *G08G 1/22* (2013.01);
(Continued)

(58) Field of Classification Search
CPC . G05D 1/0272; G05D 1/0293; B60W 30/165; G08G 1/22; H04W 84/18;
(Continued)

(56) References Cited

U.S. PATENT DOCUMENTS 3,725,921 A   4/1973   Weidman et al.
4,370,718 A   1/1983   Chasek
(Continued)

FOREIGN PATENT DOCUMENTS

DE   102011002275   10/2012
EP   0 982 173   3/2000
(Continued)

OTHER PUBLICATIONS

Bergenheim et al., "Overview of Platooning Systems", http://publications.lib.chalmers.se/records/fulltext/174621.pdf, 2012.
(Continued)

*Primary Examiner* — Brian P Sweeney
(74) *Attorney, Agent, or Firm* — Beyer Law Group LLP

(57) ABSTRACT

Systems, methods, controllers and algorithms for controlling a vehicle to closely follow another vehicle safely using automatic or partially automatic control are described. The described control schemes are well suited for use in vehicle platooning and/or vehicle convoying applications, including truck platooning and convoying controllers. In one aspect, methods of initiating a platoon between a host vehicle and a platoon partner are described. In another aspect, a number of specific checks are described for determining whether a platoon controller is ready to initiate platoon control of the host vehicle. In another aspect, a platoon controller that includes a state machine that determines the state of the platoon controller is described. In another aspect, methods for generating braking alerts to a driver of a vehicle while the vehicle is being at least semi-automatically controlled by a platoon controller are described.

20 Claims, 51 Drawing Sheets

Related U.S. Application Data filed on Jul. 15, 2016, provisional application No. 62/343,819, filed on May 31, 2016.

(51) Int. Cl.

| | | |
|---|---|---|
| *B60W 30/165* | (2012.01) | |
| *H04W 84/00* | (2009.01) | |
| *H04W 84/18* | (2009.01) | |
| *G01S 13/93* | (2006.01) | |

(52) U.S. Cl.
CPC . *G01S 2013/936* (2013.01); *G01S 2013/9325* (2013.01); *G01S 2013/9353* (2013.01); *G01S 2013/9367* (2013.01); *G05D 1/0293* (2013.01); *H04W 84/005* (2013.01); *H04W 84/18* (2013.01)

(58) Field of Classification Search
CPC .......... H04W 84/005; G01S 2013/9367; G01S 2013/936; G01S 2013/9353; G01S 2013/9325

See application file for complete search history.

(56) References Cited

U.S. PATENT DOCUMENTS

| | | |
|---|---|---|
| 5,166,881 A | 11/1992 | Akasu |
| 5,331,561 A | 7/1994 | Barrett et al. |
| 5,572,449 A | 11/1996 | Ting et al. |
| 5,633,456 A | 5/1997 | Stander |
| 5,680,122 A | 10/1997 | Mio |
| 5,777,451 A | 7/1998 | Kobayashi et al. |
| 5,781,119 A | 7/1998 | Yamashita et al. |
| 5,815,825 A | 9/1998 | Tachibana et al. |
| 5,880,958 A | 3/1999 | Helms et al. |
| 6,032,097 A | 2/2000 | Iihoshi et al. |
| 6,125,321 A | 9/2000 | Tabata et al. |
| 6,128,559 A | 10/2000 | Saitou et al. |
| 6,188,950 B1 | 2/2001 | Tsutsumi et al. |
| 6,265,990 B1 | 7/2001 | Isogai et al. |
| 6,285,929 B1 | 9/2001 | Hashimoto |
| 6,345,603 B1 | 2/2002 | Abboud et al. |
| 6,356,820 B1 | 3/2002 | Hashimoto et al. |
| 6,397,149 B1 | 5/2002 | Hashimoto |
| 6,418,370 B1 | 7/2002 | Isogai et al. |
| 6,484,078 B1 | 11/2002 | Kageyama |
| 6,510,381 B2 | 1/2003 | Grounds et al. |
| 6,604,038 B1 | 8/2003 | Lesesky et al. |
| 6,633,006 B1 | 10/2003 | Wolf et al. |
| 6,879,910 B2 | 4/2005 | Shike et al. |
| 6,898,585 B2 | 5/2005 | Benson et al. |
| 6,963,795 B2 | 11/2005 | Haissig et al. |
| 6,975,246 B1 | 12/2005 | Trudeau |
| 7,286,825 B2 | 10/2007 | Shishido et al. |
| 7,460,951 B2 | 12/2008 | Altan et al. |
| 7,554,435 B2 | 6/2009 | Tengler et al. |
| 7,593,811 B2 | 9/2009 | Schmidt et al. |
| 7,596,811 B2 | 9/2009 | Schmidt et al. |
| 7,729,823 B2 | 6/2010 | Ruoppolo |
| 7,782,227 B2 | 8/2010 | Boss et al. |
| 7,831,345 B2 | 11/2010 | Heino et al. |
| 7,894,982 B2 | 2/2011 | Reeser et al. |
| 8,026,833 B2 | 9/2011 | Villaume et al. |
| 8,073,574 B2 | 12/2011 | Yamamoto et al. |
| 8,116,921 B2 | 2/2012 | Ferrin et al. |
| 8,139,109 B2 | 3/2012 | Broggi et al. |
| 8,224,551 B2 | 7/2012 | Grolle et al. |
| 8,275,491 B2 | 9/2012 | Ferrin et al. |
| 8,326,473 B2 | 12/2012 | Simpson et al. |
| 8,352,111 B2 | 1/2013 | Mudalige |
| 8,352,112 B2 | 1/2013 | Mudalige |
| 8,354,955 B2 | 1/2013 | Miyake et al. |
| 8,442,735 B2 | 5/2013 | Hrovat et al. |
| 8,538,656 B2 | 9/2013 | Yamashiro |
| 8,554,468 B1 | 10/2013 | Bullock |
| 8,618,922 B2 | 12/2013 | Debouk et al. |
| 8,620,517 B2 | 12/2013 | Caveney et al. |
| 8,660,779 B2 | 2/2014 | Shida |
| 8,666,587 B2 | 3/2014 | Anderson |
| 8,676,466 B2 | 3/2014 | Mudalige |
| 8,682,511 B2 | 3/2014 | Andreasson |
| 8,688,349 B2 | 4/2014 | Grolle et al. |
| 8,738,238 B2 | 5/2014 | Rekow |
| 8,744,666 B2 | 6/2014 | Switkes et al. |
| 8,775,060 B2 | 7/2014 | Solyom et al. |
| 8,798,907 B2 | 8/2014 | Shida |
| 8,947,531 B2 | 2/2015 | Fischer et al. |
| 8,948,995 B2 | 2/2015 | Pandita et al. |
| 8,951,272 B2 | 2/2015 | Adam et al. |
| 8,954,272 B2 | 2/2015 | Adam et al. |
| 8,970,401 B2 | 3/2015 | Molander et al. |
| 9,037,389 B2 | 5/2015 | You |
| 9,079,587 B1 | 7/2015 | Rupp et al. |
| 9,141,112 B1 | 9/2015 | Loo et al. |
| 9,145,137 B2 | 9/2015 | Doi et al. |
| 9,174,672 B2 | 11/2015 | Zeng et al. |
| 9,221,396 B1 | 12/2015 | Zhu et al. |
| 9,224,300 B2 | 12/2015 | Lee et al. |
| 9,355,423 B1 | 5/2016 | Slusar |
| 9,367,065 B2 | 6/2016 | Dolgov et al. |
| 9,396,661 B2 | 7/2016 | Okamoto |
| 9,423,794 B2 | 8/2016 | Lind et al. |
| 9,449,258 B1 | 9/2016 | Palacio et al. |
| 9,460,622 B1 | 10/2016 | Ferguson et al. |
| 9,494,944 B2 | 11/2016 | Alam et al. |
| 9,582,006 B2 | 2/2017 | Switkes et al. |
| 9,598,078 B2 | 3/2017 | Moran et al. |
| 9,613,466 B1 | 4/2017 | Bullock |
| 9,616,743 B1 | 4/2017 | Mays et al. |
| 9,632,507 B1 | 4/2017 | Korn |
| 9,645,579 B2 | 5/2017 | Switkes et al. |
| 9,665,102 B2 | 5/2017 | Switkes et al. |
| 9,721,474 B2 | 8/2017 | Eskilson |
| 9,771,070 B2 | 9/2017 | Zagorski et al. |
| 9,799,224 B2 | 10/2017 | Okamoto |
| 9,823,166 B2 | 11/2017 | Dudar et al. |
| 9,852,475 B1 | 12/2017 | Konrardy et al. |
| 9,878,657 B2 | 1/2018 | Wunsche, III et al. |
| 9,884,631 B2 | 2/2018 | James et al. |
| 9,927,816 B2 | 3/2018 | Li et al. |
| 9,928,746 B1 | 3/2018 | MacNeille et al. |
| 9,940,840 B1 | 4/2018 | Schubert et al. |
| 10,017,039 B1 | 7/2018 | Colavincenzo |
| 10,017,179 B2 | 7/2018 | Alden et al. |
| 10,027,024 B2 | 7/2018 | Powell |
| 2001/0001138 A1 | 5/2001 | Zhu et al. |
| 2002/0077748 A1 | 6/2002 | Nakano |
| 2002/0152015 A1 | 10/2002 | Seto |
| 2002/0198632 A1 | 12/2002 | Breed et al. |
| 2003/0094858 A1 | 5/2003 | Shiue et al. |
| 2004/0046448 A1 | 3/2004 | Brown |
| 2004/0078133 A1 | 4/2004 | Miller et al. |
| 2004/0140143 A1 | 7/2004 | Saeki |
| 2004/0245853 A1 | 12/2004 | Odagawa et al. |
| 2004/0252863 A1 | 12/2004 | Chang et al. |
| 2006/0074557 A1 | 4/2006 | Mulligan et al. |
| 2006/0095195 A1 | 5/2006 | Nishimura et al. |
| 2006/0106534 A1 | 5/2006 | Kawamata et al. |
| 2006/0161341 A1 | 7/2006 | Haegebarth et al. |
| 2006/0229804 A1 | 10/2006 | Schmidt et al. |
| 2007/0027614 A1 | 2/2007 | Reeser et al. |
| 2007/0043502 A1 | 2/2007 | Mudalige et al. |
| 2007/0060045 A1 | 3/2007 | Prautzsch |
| 2007/0210953 A1 | 9/2007 | Abraham et al. |
| 2007/0213915 A1 | 9/2007 | Tange |
| 2007/0233337 A1 | 10/2007 | Plishner |
| 2007/0256481 A1 | 11/2007 | Nishiyama et al. |
| 2007/0276597 A1 | 11/2007 | Kato et al. |
| 2008/0009985 A1 | 1/2008 | Plishner |
| 2008/0033649 A1 | 2/2008 | Hasegawa et al. |
| 2008/0059007 A1 | 3/2008 | Whittaker et al. |
| 2008/0119965 A1 | 5/2008 | McCrary |
| 2008/0122652 A1 | 5/2008 | Tengler et al. |
| 2008/0249667 A1 | 10/2008 | Horvitz et al. |

(56) References Cited

U.S. PATENT DOCUMENTS

| | | |
|---|---|---|
| 2008/0255722 A1 | 10/2008 | McClellan et al. |
| 2008/0258890 A1 | 10/2008 | Follmer et al. |
| 2009/0012666 A1 | 1/2009 | Simpson et al. |
| 2009/0051510 A1 | 2/2009 | Follmer et al. |
| 2009/0062974 A1 | 3/2009 | Tamamoto et al. |
| 2009/0079839 A1 | 3/2009 | Fischer et al. |
| 2009/0118889 A1 | 5/2009 | Heino et al. |
| 2009/0157461 A1 | 6/2009 | Wright et al. |
| 2009/0164082 A1 | 6/2009 | Kobayashi et al. |
| 2009/0198427 A1 | 8/2009 | Christopher et al. |
| 2009/0222186 A1 | 9/2009 | Jensen |
| 2009/0271083 A1 | 10/2009 | Kumar |
| 2009/0286648 A1 | 11/2009 | Vesenjak |
| 2009/0287412 A1 | 11/2009 | Menzel et al. |
| 2009/0326799 A1 | 12/2009 | Crook |
| 2010/0045507 A1 | 2/2010 | Yamano et al. |
| 2010/0049374 A1 | 2/2010 | Ferrin et al. |
| 2010/0094509 A1 | 4/2010 | Luke et al. |
| 2010/0106356 A1 | 4/2010 | Trepagnier et al. |
| 2010/0194638 A1 | 8/2010 | Rivard |
| 2010/0256835 A1 | 10/2010 | Mudalige |
| 2010/0256836 A1 | 10/2010 | Mudalige |
| 2010/0256852 A1 | 10/2010 | Mudalige |
| 2010/0332101 A1 | 12/2010 | Braunberger et al. |
| 2011/0010022 A1 | 1/2011 | Beavin |
| 2011/0083011 A1 | 4/2011 | DiCrescenzo |
| 2011/0112730 A1 | 5/2011 | Rekow |
| 2011/0118967 A1 | 5/2011 | Tsuda |
| 2011/0184596 A1 | 7/2011 | Andreasson |
| 2011/0184605 A1 | 7/2011 | Neff |
| 2011/0210872 A1 | 9/2011 | Molander |
| 2011/0270514 A1 | 11/2011 | Shida |
| 2011/0270520 A1 | 11/2011 | Kronenberg |
| 2011/0274523 A1 | 11/2011 | Petalas |
| 2011/0301779 A1 | 12/2011 | Shida |
| 2012/0061154 A1 | 3/2012 | Pfister |
| 2012/0089294 A1 | 4/2012 | Fehse et al. |
| 2012/0105270 A1 | 5/2012 | Miyake et al. |
| 2012/0109610 A1 | 5/2012 | Anderson et al. |
| 2012/0139549 A1 | 6/2012 | Sufrin-Disler et al. |
| 2012/0166057 A1 | 6/2012 | Amato et al. |
| 2012/0206282 A1 | 8/2012 | Gorbold |
| 2012/0221235 A1 | 8/2012 | Prudhomme-Lacroix et al. |
| 2012/0226965 A1 | 9/2012 | Hammerschmidt et al. |
| 2012/0252415 A1 | 10/2012 | Menzel et al. |
| 2012/0259516 A1 | 10/2012 | Grolle et al. |
| 2012/0259538 A1 | 10/2012 | Oexmann |
| 2013/0015984 A1 | 1/2013 | Yamashiro |
| 2013/0018766 A1 | 1/2013 | Christman |
| 2013/0024084 A1 | 1/2013 | Yamashiro |
| 2013/0030606 A1 | 1/2013 | Mudalige et al. |
| 2013/0030657 A1 | 1/2013 | Chatterjee et al. |
| 2013/0041567 A1 | 2/2013 | Yamashiro |
| 2013/0041576 A1 | 2/2013 | Switkes et al. |
| 2013/0066511 A1 | 3/2013 | Switkes et al. |
| 2013/0079953 A1 | 3/2013 | Kumabe |
| 2013/0080040 A1* | 3/2013 | Kumabe .............. G05D 1/0293 701/117 |
| 2013/0080041 A1 | 3/2013 | Kumabe |
| 2013/0116861 A1 | 5/2013 | Nemoto |
| 2013/0124064 A1 | 5/2013 | Nemoto |
| 2013/0151058 A1 | 6/2013 | Zagorski et al. |
| 2013/0173114 A1 | 7/2013 | Pillai |
| 2013/0211624 A1 | 8/2013 | Lind et al. |
| 2013/0218365 A1 | 8/2013 | Caveney et al. |
| 2013/0231820 A1 | 9/2013 | Solyom et al. |
| 2013/0317676 A1 | 11/2013 | Cooper et al. |
| 2013/0325306 A1 | 12/2013 | Caveney et al. |
| 2014/0005875 A1 | 1/2014 | Hartmann et al. |
| 2014/0005906 A1 | 1/2014 | Pandita et al. |
| 2014/0019031 A1 | 1/2014 | Solyom et al. |
| 2014/0100734 A1 | 4/2014 | Yamashiro |
| 2014/0107867 A1 | 4/2014 | Yamashiro |
| 2014/0129075 A1 | 5/2014 | Carleton |
| 2014/0142799 A1 | 5/2014 | Ferguson et al. |
| 2014/0142801 A1 | 5/2014 | Shah |
| 2014/0145838 A1 | 5/2014 | Tuukkanen |
| 2014/0156118 A1 | 6/2014 | Wiemeyer et al. |
| 2014/0172265 A1 | 6/2014 | Funabashi |
| 2014/0197967 A1 | 7/2014 | Modica et al. |
| 2014/0214255 A1 | 7/2014 | Dolgov et al. |
| 2014/0222278 A1 | 8/2014 | Fujita |
| 2014/0236449 A1 | 8/2014 | Horn |
| 2014/0244144 A1 | 8/2014 | You |
| 2014/0249693 A1 | 9/2014 | Stark et al. |
| 2014/0277608 A1 | 9/2014 | Debouk et al. |
| 2014/0303870 A1 | 10/2014 | Switkes et al. |
| 2014/0306799 A1 | 10/2014 | Ricci |
| 2014/0306826 A1 | 10/2014 | Ricci |
| 2014/0309836 A1 | 10/2014 | Ollis |
| 2014/0316671 A1 | 10/2014 | Okamoto |
| 2014/0316865 A1 | 10/2014 | Okamoto |
| 2014/0324339 A1 | 10/2014 | Adam et al. |
| 2014/0350756 A1 | 11/2014 | Schoonmaker et al. |
| 2014/0350793 A1 | 11/2014 | Schrabler et al. |
| 2014/0350835 A1 | 11/2014 | Martin |
| 2015/0012204 A1 | 1/2015 | Breuer et al. |
| 2015/0015267 A1 | 1/2015 | Mueller et al. |
| 2015/0025731 A1 | 1/2015 | Uehara |
| 2015/0061492 A1 | 3/2015 | Braunberger |
| 2015/0100192 A1 | 4/2015 | Lee et al. |
| 2015/0120137 A1 | 4/2015 | Zeng et al. |
| 2015/0151737 A1 | 6/2015 | Birch et al. |
| 2015/0153733 A1 | 6/2015 | Ohmura et al. |
| 2015/0161894 A1 | 6/2015 | Duncan et al. |
| 2015/0262481 A1 | 9/2015 | Selin |
| 2015/0279122 A1 | 10/2015 | Lorenzen |
| 2015/0314790 A1 | 11/2015 | Deragarden et al. |
| 2015/0334371 A1 | 11/2015 | Galera et al. |
| 2015/0356635 A1 | 12/2015 | Thurston |
| 2015/0378722 A1 | 12/2015 | Zuniga-Hernandez |
| 2016/0009288 A1 | 1/2016 | Yu |
| 2016/0019782 A1 | 1/2016 | Alam et al. |
| 2016/0026187 A1 | 1/2016 | Alam et al. |
| 2016/0054735 A1 | 2/2016 | Switkes et al. |
| 2016/0194014 A1 | 7/2016 | Rajendran |
| 2016/0267796 A1 | 9/2016 | Hiroma et al. |
| 2016/0272207 A1 | 9/2016 | Dolgov et al. |
| 2016/0300186 A1 | 10/2016 | Scharaswak et al. |
| 2016/0359741 A1 | 12/2016 | Cooper et al. |
| 2016/0373261 A1 | 12/2016 | Tschache et al. |
| 2016/0375732 A1 | 12/2016 | Lazar et al. |
| 2017/0011633 A1 | 1/2017 | Boegel |
| 2017/0058477 A1 | 3/2017 | Niroumand |
| 2017/0069203 A1 | 3/2017 | Sharma |
| 2017/0083844 A1 | 3/2017 | Baker et al. |
| 2017/0115666 A1 | 4/2017 | Kolhouse et al. |
| 2017/0122841 A1 | 5/2017 | Dudar et al. |
| 2017/0132299 A1 | 5/2017 | Fox et al. |
| 2017/0146801 A1 | 5/2017 | Stempora |
| 2017/0178536 A1 | 6/2017 | Manci et al. |
| 2017/0186327 A1 | 6/2017 | Uysal et al. |
| 2017/0197615 A1 | 7/2017 | Elie et al. |
| 2017/0227972 A1 | 8/2017 | Sabau |
| 2017/0235316 A1 | 8/2017 | Shattil |
| 2017/0242095 A1 | 8/2017 | Schuh et al. |
| 2017/0261997 A1 | 9/2017 | Switkes et al. |
| 2017/0289864 A1 | 10/2017 | Narasimha et al. |
| 2017/0293296 A1 | 10/2017 | Stenneth et al. |
| 2017/0308097 A1 | 10/2017 | Switkes et al. |
| 2017/0309187 A1 | 10/2017 | Lin |
| 2017/0323244 A1 | 11/2017 | Rani et al. |
| 2017/0329348 A1 | 11/2017 | Li et al. |
| 2017/0344023 A1 | 11/2017 | Laubinger et al. |
| 2017/0349058 A1 | 12/2017 | Bernier et al. |
| 2017/0349176 A1 | 12/2017 | Alden et al. |
| 2017/0361762 A1 | 12/2017 | Wunsche, III et al. |
| 2018/0006365 A1 | 1/2018 | Powell |
| 2018/0018605 A1 | 1/2018 | Light-Holets et al. |
| 2018/0032072 A1 | 2/2018 | Hoye |
| 2018/0047293 A1 | 2/2018 | Dudar |
| 2018/0050697 A1 | 2/2018 | Kuszmaul et al. |
| 2018/0082590 A1 | 3/2018 | MacNeille et al. |
| 2018/0082591 A1 | 3/2018 | Pandy |

(56) References Cited

U.S. PATENT DOCUMENTS

| | | |
|---|---|---|
| 2018/0084511 A1 | 3/2018 | Wu et al. |
| 2018/0111611 A1 | 4/2018 | MacNeille et al. |
| 2018/0120861 A1 | 5/2018 | Saxena et al. |
| 2018/0137763 A1 | 5/2018 | Deragarden et al. |
| 2018/0188725 A1 | 7/2018 | Cremona et al. |
| 2018/0188745 A1 | 7/2018 | Pilkington |
| 2018/0188746 A1 | 7/2018 | Lesher et al. |
| 2018/0190119 A1 | 7/2018 | Miller, Jr. et al. |
| 2018/0190128 A1 | 7/2018 | Saigusa |
| 2018/0210461 A1 | 7/2018 | Cremona et al. |

FOREIGN PATENT DOCUMENTS

| | | |
|---|---|---|
| EP | 0 991 046 | 3/2005 |
| EP | 1 975 901 | 3/2009 |
| EP | 2 390 744 | 11/2011 |
| EP | 3316064 | 5/2018 |
| GB | 2540039 | 1/2017 |
| GB | 2551248 | 12/2017 |
| GB | 2557001 | 6/2018 |
| GB | 2557434 | 6/2018 |
| GB | 2558051 | 7/2018 |
| JP | 05-170008 | 7/1993 |
| JP | 2995970 | 12/1999 |
| JP | 2010-030525 | 2/2010 |
| JP | 5141849 | 2/2013 |
| JP | 2017-215681 | 12/2017 |
| WO | WO 2004/077378 | 9/2004 |
| WO | WO 2009/024563 | 2/2009 |
| WO | WO 2009/043643 | 4/2009 |
| WO | WO 2011/125193 | 10/2011 |
| WO | WO 2013/006826 | 1/2013 |
| WO | WO 2013/165297 | 4/2013 |
| WO | WO 2013/147682 | 10/2013 |
| WO | WO 2013/187835 | 12/2013 |
| WO | WO 2014/062118 | 4/2014 |
| WO | WO 2014/092628 | 6/2014 |
| WO | WO 2014/133425 | 9/2014 |
| WO | WO 2014/137270 | 9/2014 |
| WO | WO 2014/137271 | 9/2014 |
| WO | WO 2014/145918 | 9/2014 |
| WO | WO 2015/047174 | 4/2015 |
| WO | WO 2015/047175 | 4/2015 |
| WO | WO 2015/047176 | 4/2015 |
| WO | WO 2015/047177 | 4/2015 |
| WO | WO 2015/047178 | 4/2015 |
| WO | WO 2015/047179 | 4/2015 |
| WO | WO 2015/047181 | 4/2015 |
| WO | WO 2015/047182 | 4/2015 |
| WO | WO 2015/156731 | 10/2015 |
| WO | WO 2016/065055 | 4/2016 |
| WO | WO 2016/087555 | 6/2016 |
| WO | WO 2016/087901 | 6/2016 |
| WO | WO 2016/134610 | 9/2016 |
| WO | WO 2016/134770 | 9/2016 |
| WO | WO 2016/135207 | 9/2016 |
| WO | WO 2016/182489 | 11/2016 |
| WO | WO 2017/048165 | 3/2017 |
| WO | WO 2017/070714 | 4/2017 |
| WO | WO 2017/148113 | 9/2017 |
| WO | WO 2017/164792 | 9/2017 |
| WO | WO 2017/179193 | 10/2017 |
| WO | WO 2017/184062 | 10/2017 |
| WO | WO 2017/184063 | 10/2017 |
| WO | WO 2017/196165 | 11/2017 |
| WO | WO 2017/200433 | 11/2017 |
| WO | WO 2017/204712 | 11/2017 |
| WO | WO 2017/209124 | 12/2017 |
| WO | WO 2017/209666 | 12/2017 |
| WO | WO 2018/000386 | 1/2018 |
| WO | WO 2018/035145 | 2/2018 |
| WO | WO 2018/043519 | 3/2018 |
| WO | WO 2018/043520 | 3/2018 |
| WO | WO 2018/043753 | 3/2018 |
| WO | WO 2018/054520 | 3/2018 |
| WO | WO 2018/106774 | 6/2018 |
| WO | WO 2018/111177 | 6/2018 |
| WO | WO 2018/135630 | 7/2018 |
| WO | WO 2018/137754 | 8/2018 |

OTHER PUBLICATIONS

Alam et al., "An Experimental Study on the Fuel Reduction Potential of Heavy Duty Vehicle Platooning", 2010 13$^{th}$ International IEEE, Annual Conference on Intelligent Transportation Systems, Sep. 19-22, 2010.

Kuszmaul et al., U.S. Appl. No. 15/605,456, filed May 25, 2017.

Klaus et al., U.S. Appl. No. 15/860,024, filed Jan. 3, 2018.

Switkes et al., International Application No. PCT/US17/47771, filed on Aug. 21, 2017.

Browand et al., "Fuel Saving Achieved in the Field Test of Two Tandem Trucks", California PATH Research Report, UCB-ITS-PRR-2001-20, Jun. 2004.

Shladover et al., "Demonstration of Automated Heavy-Duty Vehicles", California PATH Research Report, UCB-ITS-PRR-2005-23, Jun. 2005.

Shladover et al., "Development and Evaluation of Selected Mobility Applications for VII (a.k.a. IntelliDrive)", http://slideplayer.com/slide/6981587/, Jul. 1, 2009.

Tsugawa, "An Overview on an Automated Truck Platoon Within the Energy ITS Project", 7$^{th}$ IFAC Symposium on Advances in Automotive Control, Tokyo, Japan, Sep. 4-7, 2013.

Sugimachi et al., "Development of Autonomous Platooning System for Heavy-Duty Trucks", 7$^{th}$ IFAC Symposium on Advances in Automotive Control, Tokyo, Japan, Sep. 4-7, 2013.

Sheikholeslam et al., "Longitudinal Control of a Platoon of Vehicles; III; Nonlinear Model", Program on Advanced Technology for the Highway, Institute of Transportation Studies, University of California at Berkeley, Apr. 1, 1990.

Sheikholeslam et al., "Longitudinal Control of a Platoon of Vehicles", Department of Electrical Engineering and Computer Science, University of California, Berkeley, May 1990.

Sheikholeslam et al., "A System Level Study of the Longitudinal Control of a Platoon of Vehicles", Department of Electrical Engineering and Computer Science, University of California, Berkeley, Jun. 1992.

Porche et al., "Real Time Task Manager for Communications and Control in Multicar Platoons", Department of Electrical Engineering and Computer Science, University of California, Berkeley, Jun. 1992.

Gerdes et al., "Brake System Requirements for Platooning on an Automated Highway", Department of Mechanical Engineering, University of California, Berkeley, Jun. 1995.

Zabat et al., "The Aerodynamic Performance of Platoons: Final Report", California PATH Research Report, California PATH Program, Institute of Transportation Studies, University of California, Berkeley, Oct. 1995.

Gerdes et al., "Vehicle Speed and Spacing Control via Coordinated Throttle and Brake Actuation", Department of Mechanical Engineering, University of California, Berkeley, Sep. 1997.

Alvarez et al., "Safe Platooning in Automated Highway Systems Part I: Safety Regions Design", Department of Mechanical Engineering, University of California, Berkeley, 1999.

Alvarez et al., "Safe Platooning in Automated Highway Systems Part II: Velocity Tracking Controller", Department of Mechanical Engineering, University of California, Berkeley, 1999.

Michaelian et al., "Field Experiments Demonstrate Fuel Savings for Close-Following", University of Southern California, California PATH Research Report, Sep. 2000.

Simon Halle, "Automated Highway Systems: Platoons of Vehicles Viewed as a Multiagent System", University of Quebec, Jun. 2005.

Friedrichs et al., "A Generic Software Architecture for a Driver Information System to Organize and Operate Truck Platoons", https://www.researchgate.net/publication/256195846, May 2008.

Meisen et al., "A Data-Mining Technique for the Planning and Organization of Truck Platoons", https://www.researchgate.net/publication/256195756, May 2008.

(56) References Cited

OTHER PUBLICATIONS

Ramakers et al., "Electronically Coupled Truck platoons on German Highways", IEEE International Conference on Systems, Man, and Cybernetics, San Antonio, TX, Oct. 2009.

Kunze et al., "Organization and Operation of Electronically Coupled Truck Platoons on German Highways", RWTH Aachen University, Center for Learning and Knowledge Management and Department of Information Management in Mechanical Engineering, Aachen, Germany, Dec. 2009.

Kunze et al., "Efficient Organization of Truck Platoons by Means of Data Mining", $7^{th}$ International Conference on Informatics in Control, Automation and Robotics, RWTH Aachen University, Center for Learning and Knowledge Management and Department of Information Management in Mechanical Engineering, Aachen, Germany, Jan. 2010.

Jacobson et al., "Functional Safety in Systems of Road Vehicles", SP Technical Research Institute of Sweden, Jul. 2010.

Nowakowski et al., "Cooperative Adaptive Cruise Control: Testing Driver's Choices of Following Distances", California PATH Program, Institute of Transportation Studies, University of California, Berkeley, Jan. 2011.

Tsugawa et al., "An Automated Truck Platoon for Energy Saving", IEEE/RSJ International Conference on Intelligent Robots and Systems, San Francisco, CA, Sep. 25-30, 2011.

Desjardins et al., "Cooperative Adaptive Cruise Control: A Reinforcement Learning Approach", IEEE Transactions on Intelligent Transportation Systems, vol. 12, No. 4, Dec. 2011.

Larson et al., "Coordinated Route Optimization for Heavy-duty Vehicle Platoons", Proceedings of the $16^{th}$ International IEEE Annual Conference on Intelligent Transportation Systems (ITSC 2013), The Hague, The Netherlands, Oct. 6-9, 2013.

Aoki, "Research and Development of Fully Automated Vehicles", ITS Research Division, Japan Automobile Research Institute, Tokyo, Japan, Nov. 2013.

Lu et al., "Automated Truck Platoon Control and Field Test, Road Vehicle Automation", https://www.researchgate.net/publication/266390502, Aug. 2014.

White Paper, "Automated Driving and Platooning Issues and Opportunities", ATA Technology and Maintenance Council Future Truck Program, Sep. 21, 2015.

Nowakowski et al., "Cooperative Adaptive Cruise Control (CACC) for Truck Platooning: Operational Concept Alternatives", California PATH, California Partners for Advanced Transportation Technology, UC Berkeley, Mar. 2015.

Erlien, "Shared Vehicle Control Using Safe Driving Envelopes for Obstacle Avoidance and Stability", A Dissertation submitted to the Department of Mechanical Engineering and the Committee on Graduate Studies of Stanford University, Mar. 2015.

Shladover et al., "Cooperative Adaptive Cruise Control, Definitions and Operating Concepts", Transportation Research Record 2489, 2015.

Tsugawa et al., "A Review of Truck Platooning Projects for Energy Savings", IEEE Transactions on Intelligent Vehicles, vol. 1, No. 1, Mar. 2016.

Geiger et al., "Team AnnieWAY's Entry to the 2011 Grand Cooperative Driving Challenge", IEEE Transactions on Intelligent Transportation Systems, vol. 13, No. 3, Sep. 2012.

Bergenheim et al., "Vehicle-to-Vehicle Communication for a Platooning System", SP Technical Research Institute of Sweden, Procedia—Social and Behavioral Sciences vol. 48, 2012.

Bae et al., "Road Grade and Vehicle Parameter Estimation for Longitudinal Control Using GPS", 2001 IEEE Intelligent Transportation Systems Conference Proceedings, Oakland, CA, Aug. 25-29, 2001.

Holm, "Vehicle Mass and Road Grade Estimation Using Kalman Filter", MSc Thesis, Department of Electrical Engineering, Sweden, Aug. 2011.

Kidambi et al., "Methods in Vehicle Mass and Road Grade Estimation", SAE International, University of Michigan, Apr. 1, 2014.

Paulsson et al., "Vehicle Mass and Road Grade Estimation Using Recursive Least Squares", MSc Thesis, Lund University, 2016.

Montvey, et al., Priority Document associated with EP Application No. 03 100457.5., Feb. 25, 2003.

International Search Report and Written Opinion dated Oct. 3, 2017 from International Application No. PCT/US17/35019.

"Automated Highway System: Milestone 2 Report, Task C2: Downselect System Configurations and Workshop #3" (National Automated Highway System Consortium, Troy, MI, Jun. 1997), 604 pages.

Wille, Matthias et al., "KONVOI: Electronically coupled truck convoys", in Human Factors for Assistance and Automation, D. de Waard et al. (Eds.) (Shaker Publishing, Maastricht, the Netherlands, Jan. 2008), pp. 243-256.

Shladover, Steven E. et al. "Development and Evaluation of Selected Mobility Applications for VII: Concept of Operations", California PATH Working Paper UCB-ITS-PWP-2009-3 (U.C. Berkeley, Berkeley, CA, Mar. 2009), 14 pages.

Al Alam, Assad et al. "Establishing Safety for Heavy Duty Vehicle Platooning: A Game Theoretical Approach", Proceedings of the 18th World Congress, The International Federation of Automatic Control (IFAC'11) Milano, Italy, Sep. 2011, pp. 3818-3823.

Roeth, Michael, "CR England Peloton Technology Platooning Test Nov. 2013", (North American Council on Freight Efficiency (NACFE.org), Fort Wayne, IN, Dec. 2013);Retrieved Aug. 23, 2018 at https://nacfe.org/wp-content/uploads/2018/02/Peloton-NACFE-Fuel-Test-Report-120213.pdf.

Bevly, David et al. "Heavy Truck Cooperative Adaptive Cruise Control: Evaluation, Testing, and Stakeholder Engagement for Near Term Deployment: Phase One Final Report", Report to Federal Highway Administration (Auburn University, Auburn, AL, Apr. 2015), 135 pages; Retrieved Aug. 23, 2018 at http://atri-online.org/wp-content/uploads/2015/05/DATPPhase1FinalReport.pdf.

Nowakowski, Christopher et al., "Heavy vehicle automation: Human factors lessons learned", Procedia Manufacturing vol. 3, Jul. 2015, pp. 2945-2952.

Zhao, Siyang et al., "Vehicle to Vehicle Communication and Platooning for EV with Wireless Sensor Network", SICE Annual Conference 2015, Hangzhou, China, Jul. 2015, pp. 1435-1440.

Brizzolara, Davide & Toth, Andrea, "The Emergence of Truck Platooning", Baltic Transport Journal, Mar. 2016, pp. 58-59.

* cited by examiner

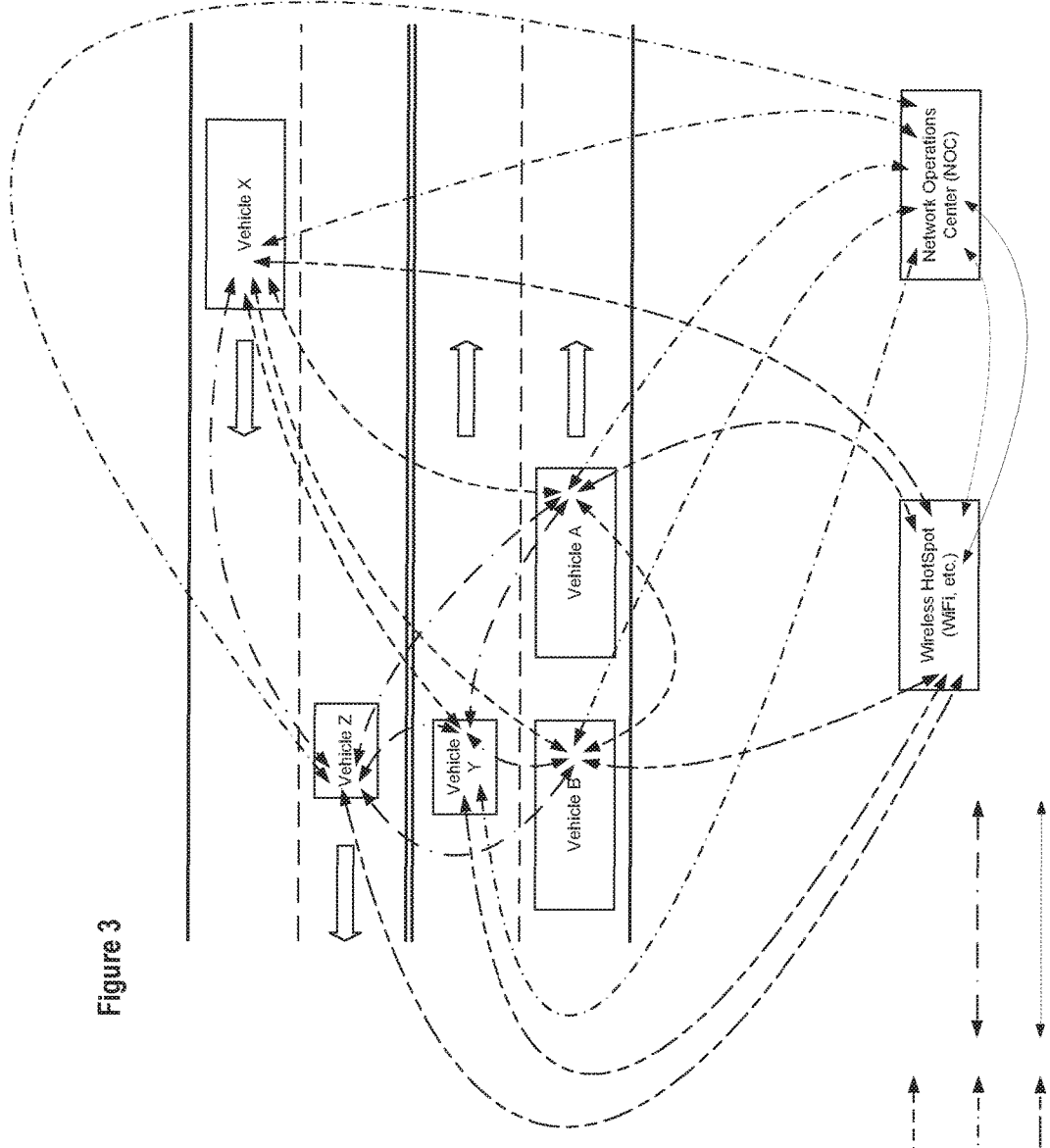

Figure 3

1. Vehicle X is approaching its depot.
2. Vehicles A, B hours away from its depot, no current cell connection to NOC, Vehicle A wants to upload log data.
3. Vehicle X advertises its Time To Destination over DSRC radio.
4. Vehicle A transfers a portion of its encrypted log to Truck X over DSRC radio.
5. Vehicle X stores log.
6. On arrival at depot, Vehicle X moves log piece to NOC.
7. NOC sends Vehicle A a log receipt over breadcrumb channel.
8. Vehicle A discards log portion that has been transferred.

10. Vehicles A, B, X hours away from their depots, no connection to NOC.
20. Vehicle A wants to upload log data.
30. Vehicle Z advertises its data transport ability via microcell or other.
40. Vehicle A transfers a portion of its encrypted log to Vehicle Z.
50. Vehicle Z stores Vehicle A's log data.
60. On arrival at hotspot or other data connection with access to NOC, Vehicle Z moves Vehicle A's stored log data to NOC.
70. NOC sends Vehicle A a log receipt over breadcrumb channel.
80. Vehicle A discards log portion that has been transferred.

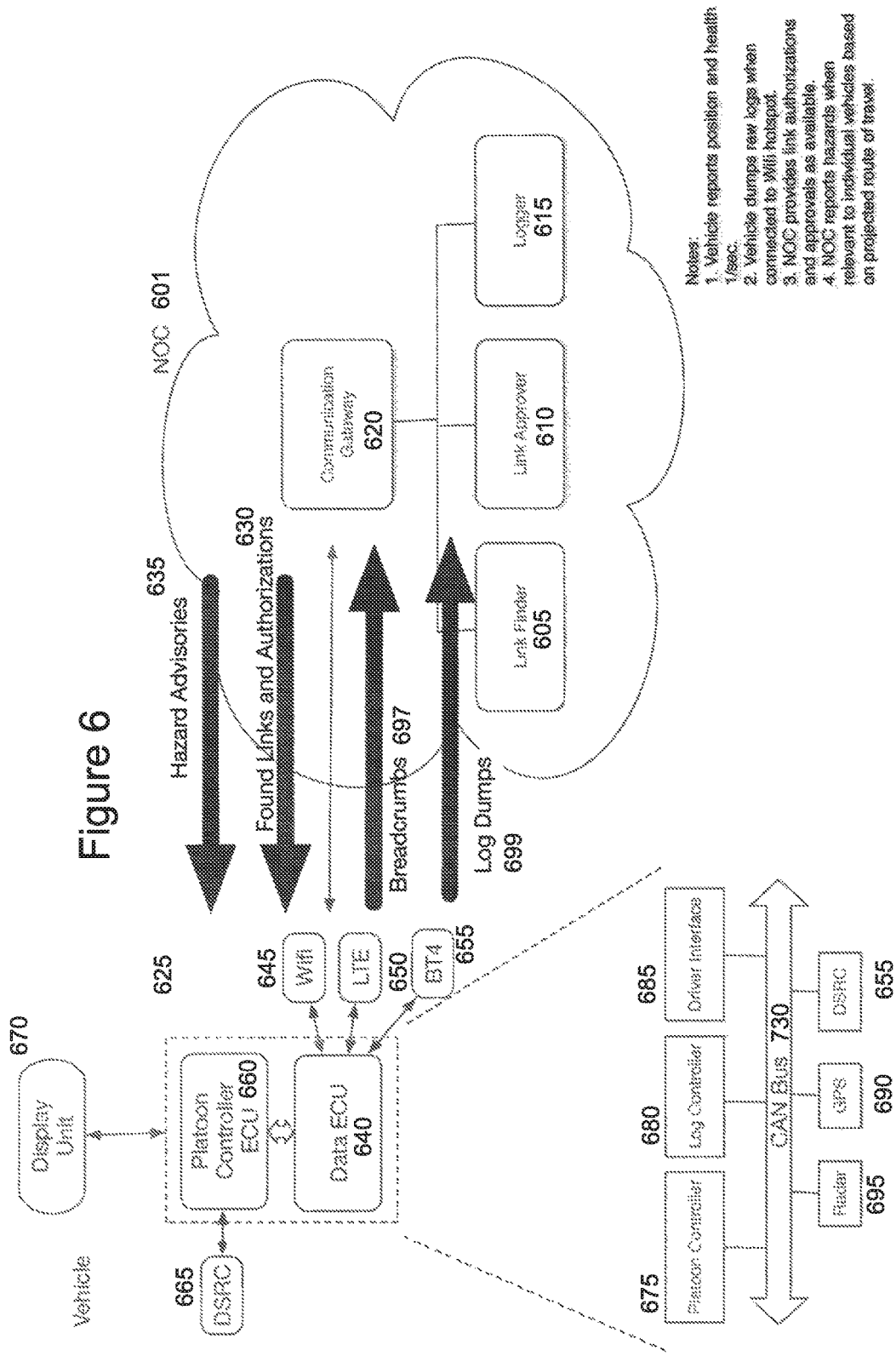

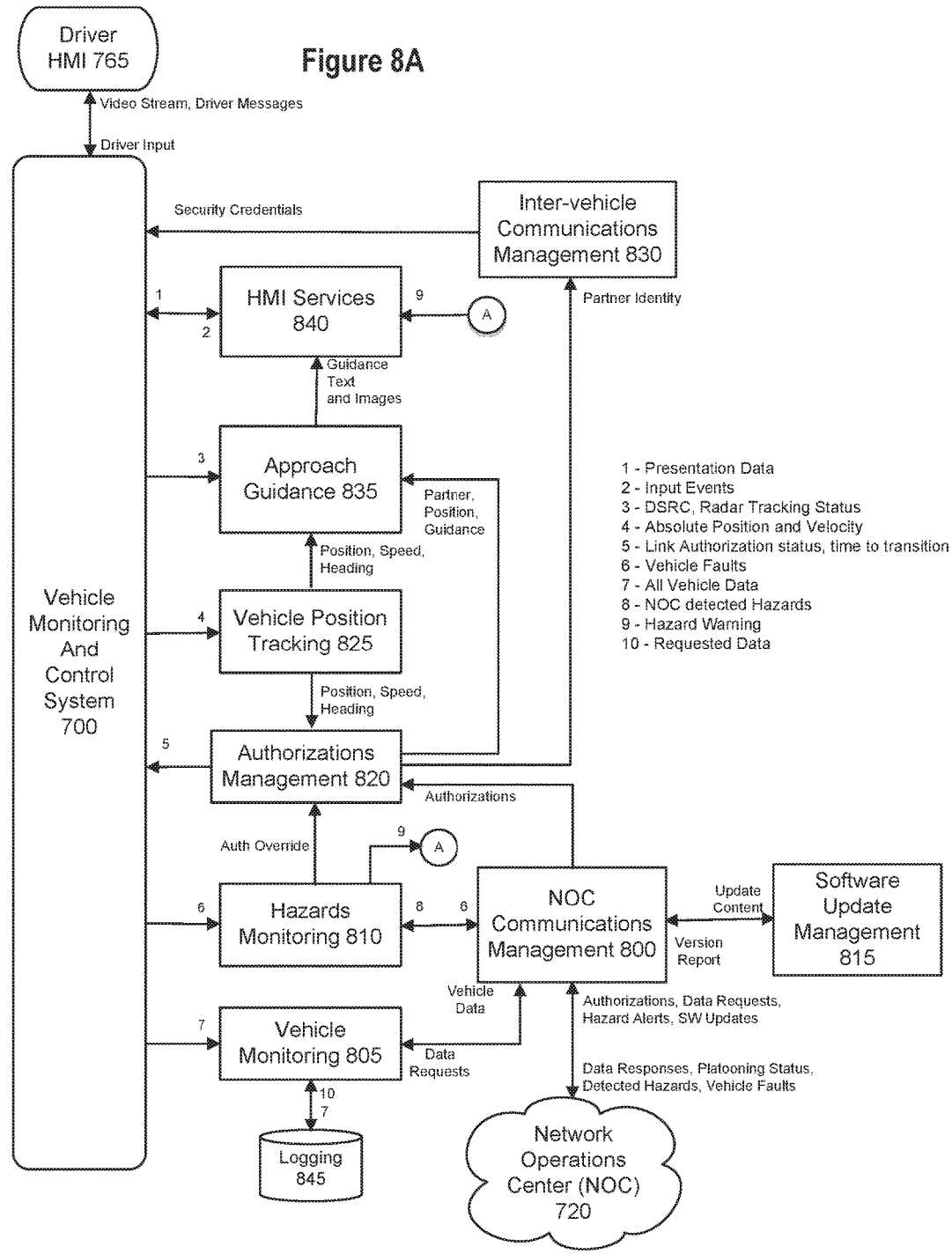

NOC-Truck Connection Management

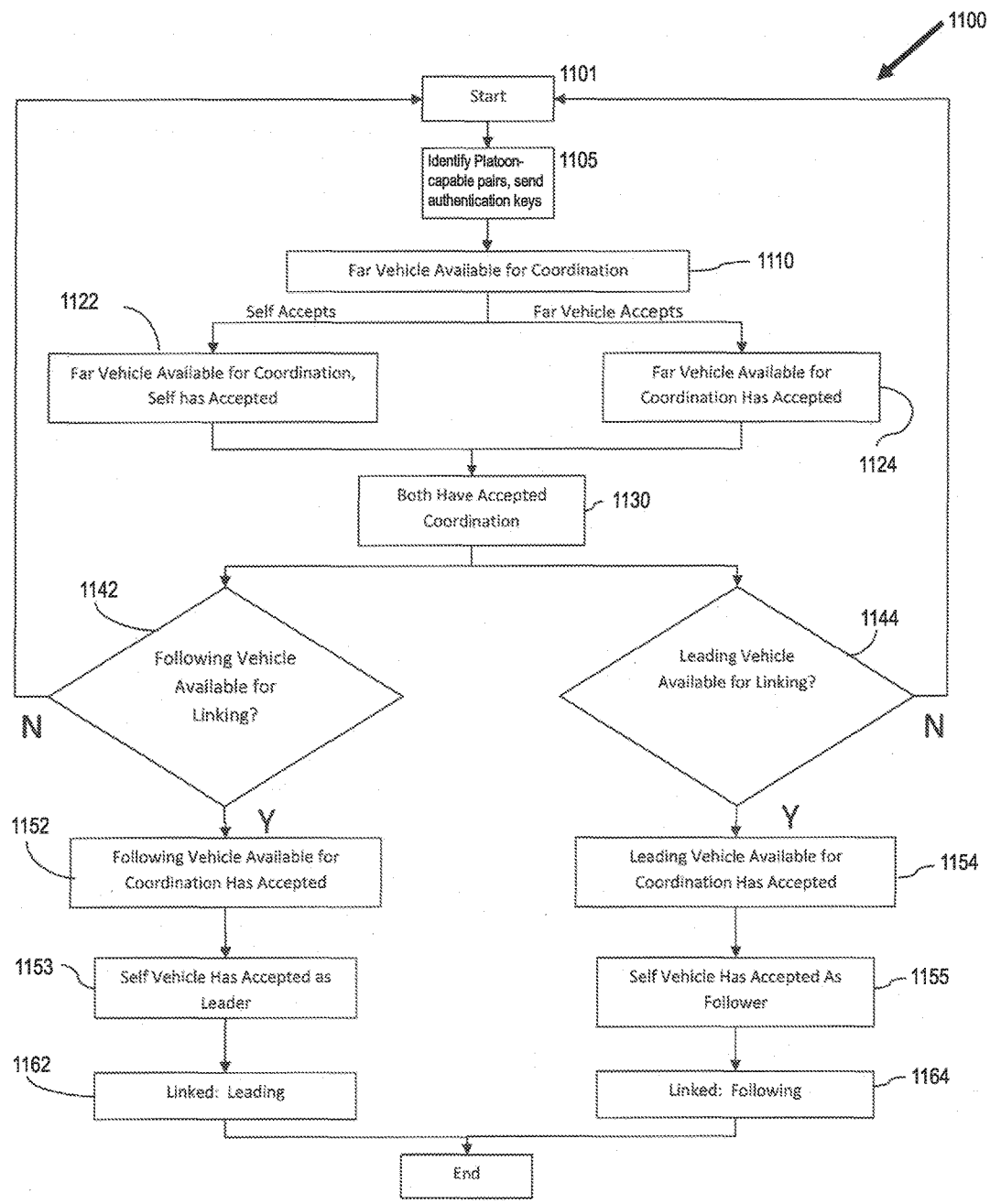
Figure 11A: Coordination and Linking Flowchart

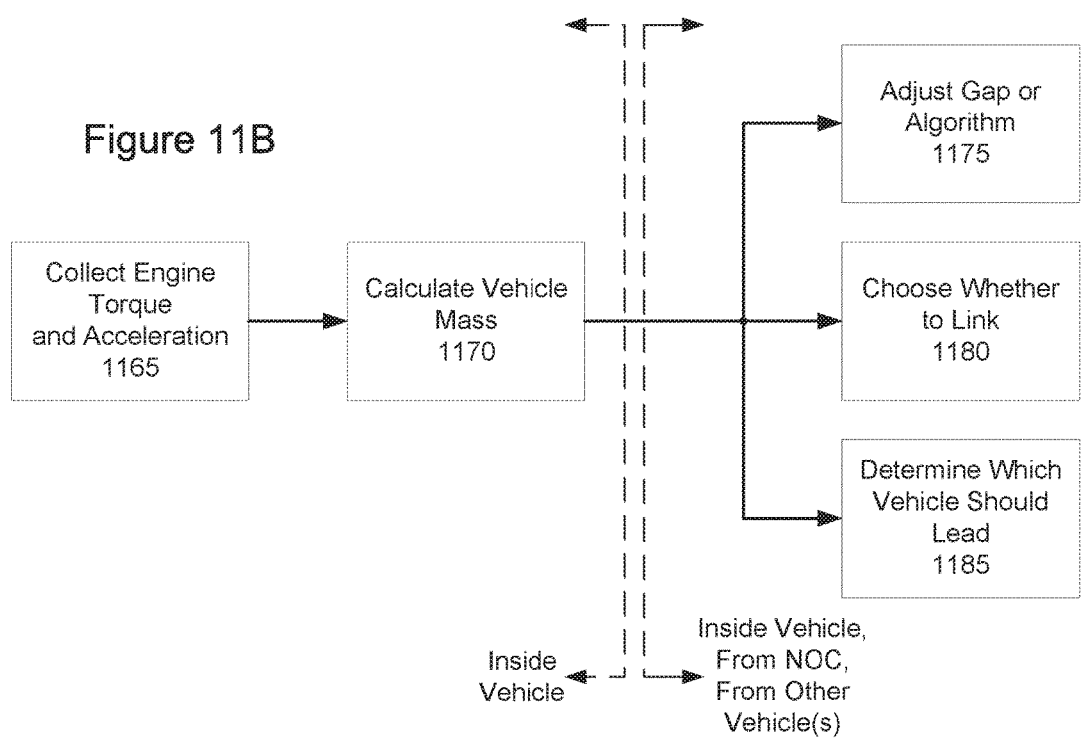

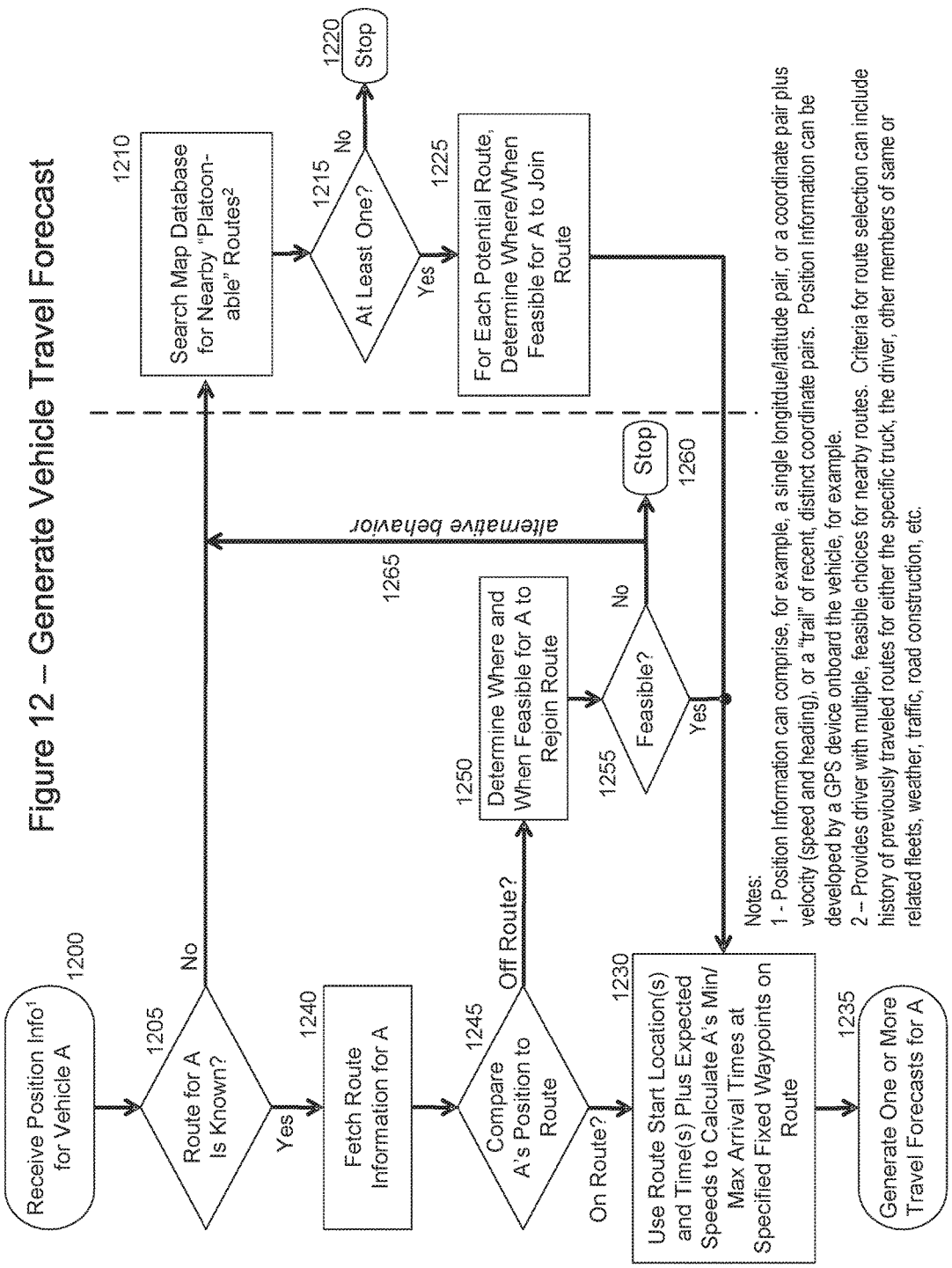
Figure 12 – Generate Vehicle Travel Forecast

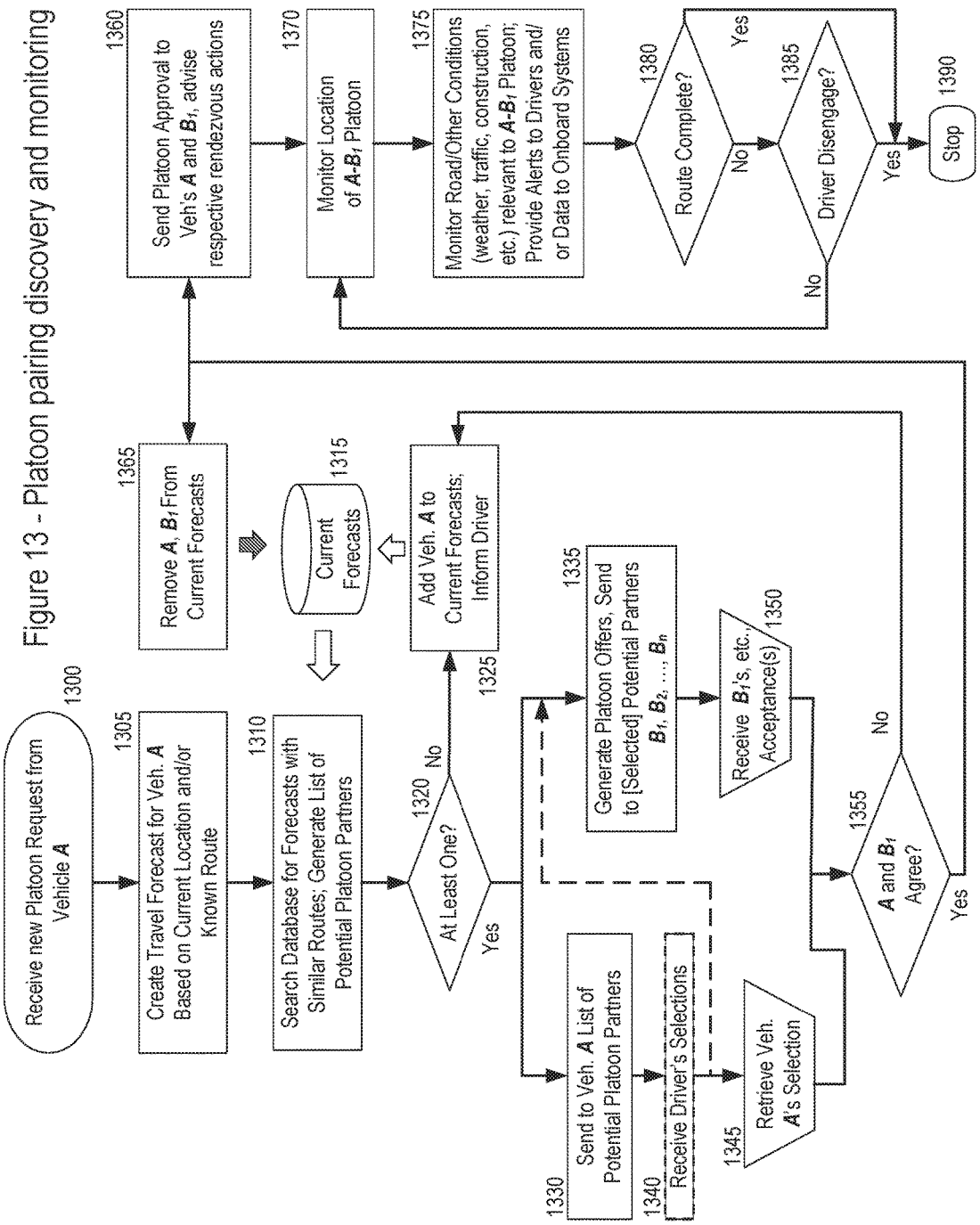

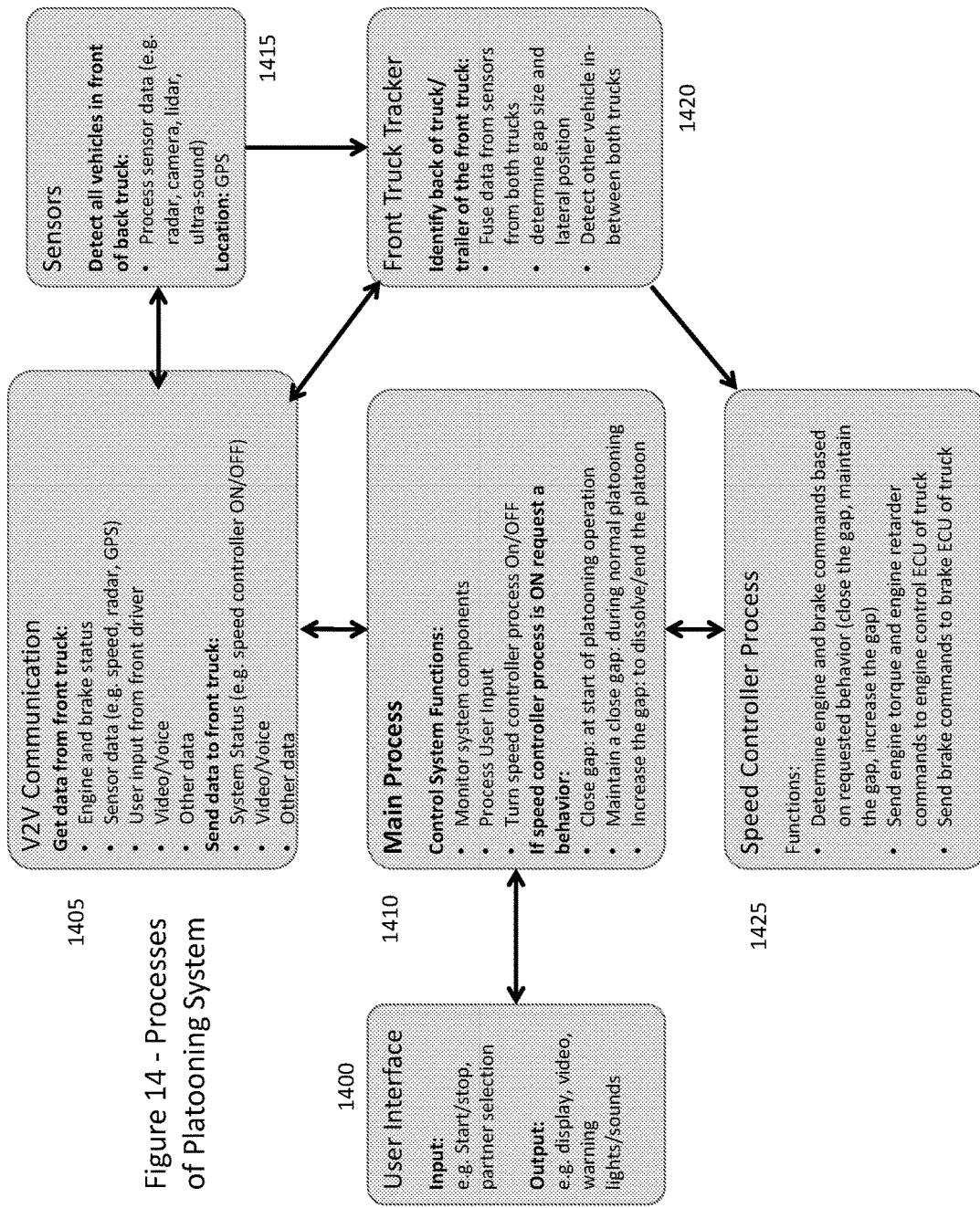
Figure 14 - Processes of Platooning System

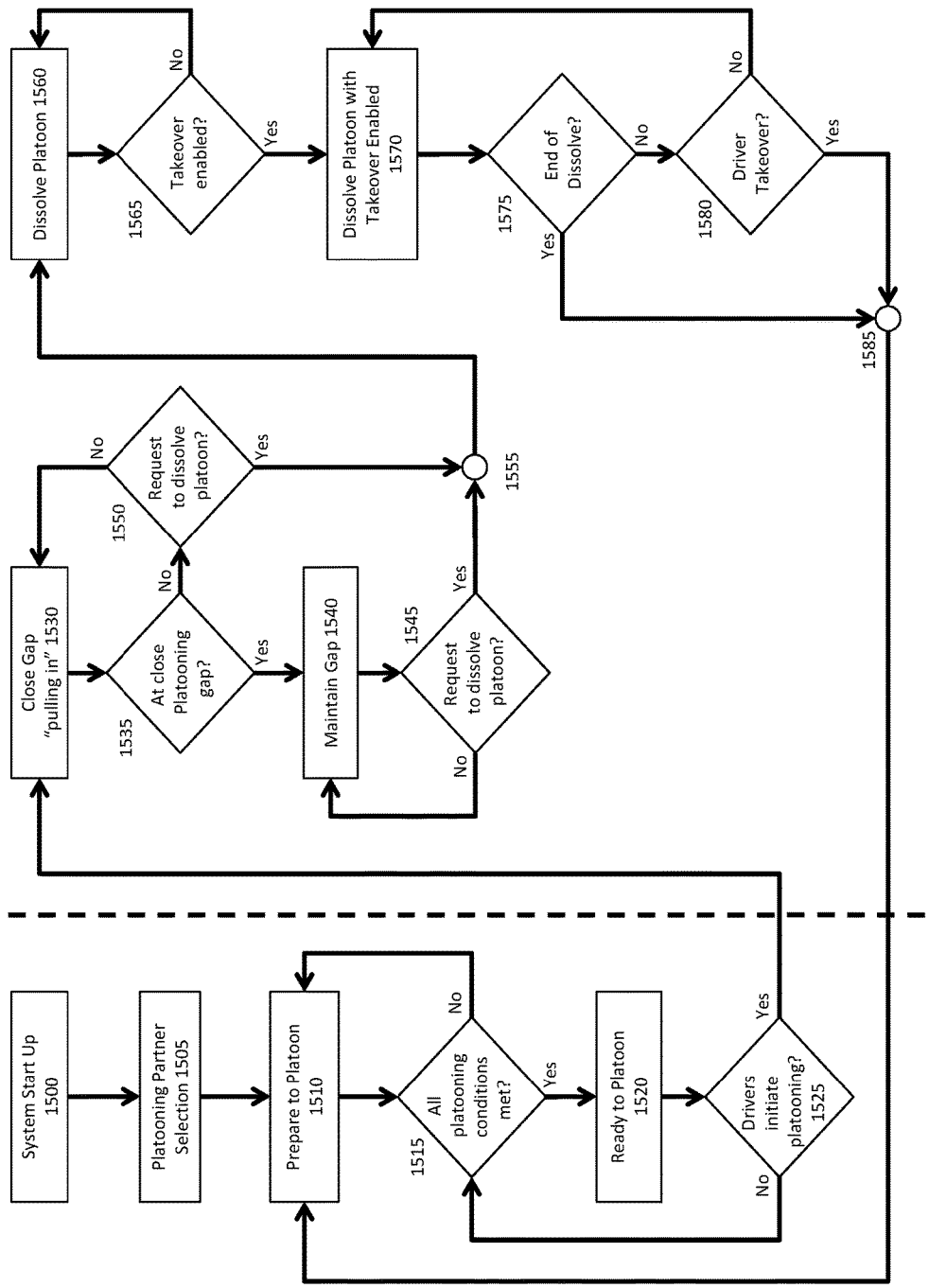

Engagement of Platooning System

Alerts – Driver Brake Alert (Version 2)

Note: System remains in respective state (Close gap, maintain gap, dissolve platoon even when alert is issued.

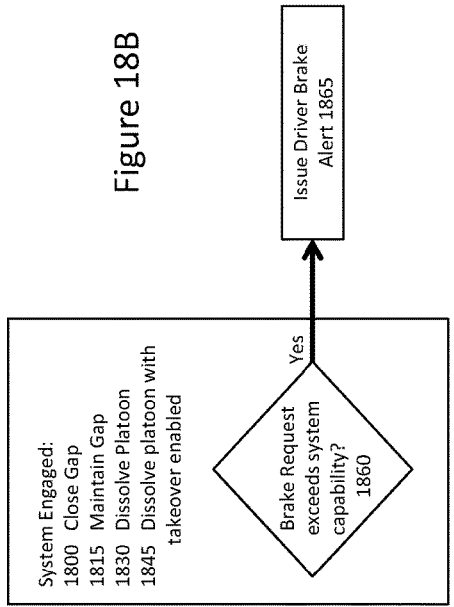

Figure 18B

System Engaged:
1800 Close Gap
1815 Maintain Gap
1830 Dissolve Platoon
1845 Dissolve platoon with takeover enabled Brake Request exceeds system capability? 1860 — Yes → Issue Driver Brake Alert 1865

Note: System remains in dissolve state even when alert is issued.

1845 Dissolve Platoon with takeover enabled → Issue Driver Takeover Alert 1870

Figure 18C

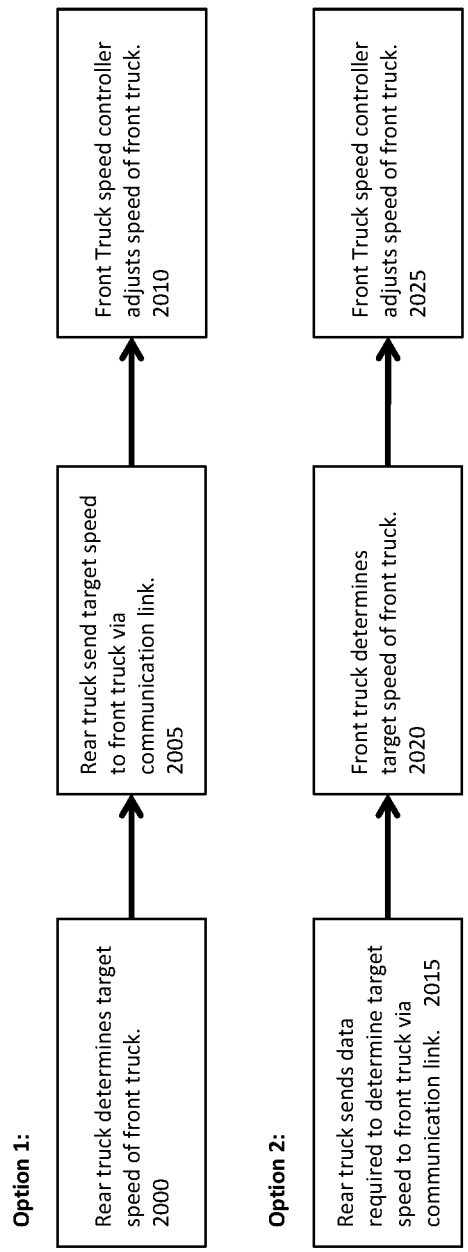

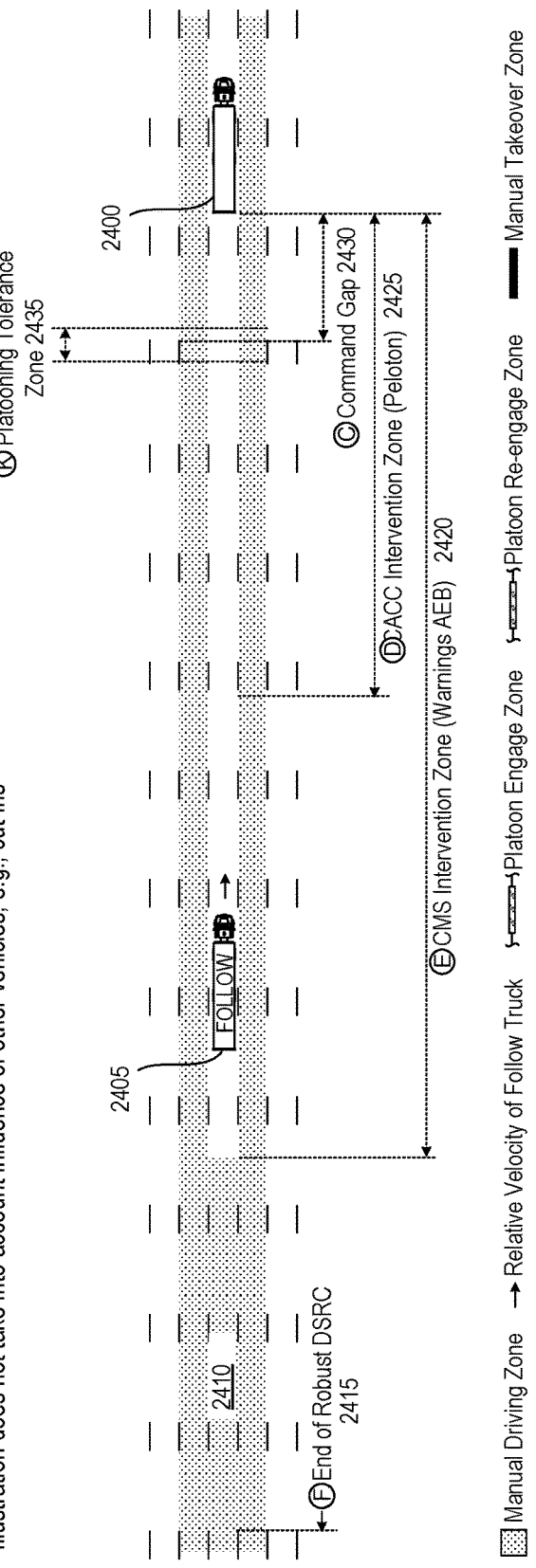
Figure 24A - Platoon Zones
All zones are exemplary and measured relative to the back of the lead vehicle
Actual distances vary based upon relative velocity between vehicles
Illustration does not take into account influence of other vehicles, e.g., cut-ins

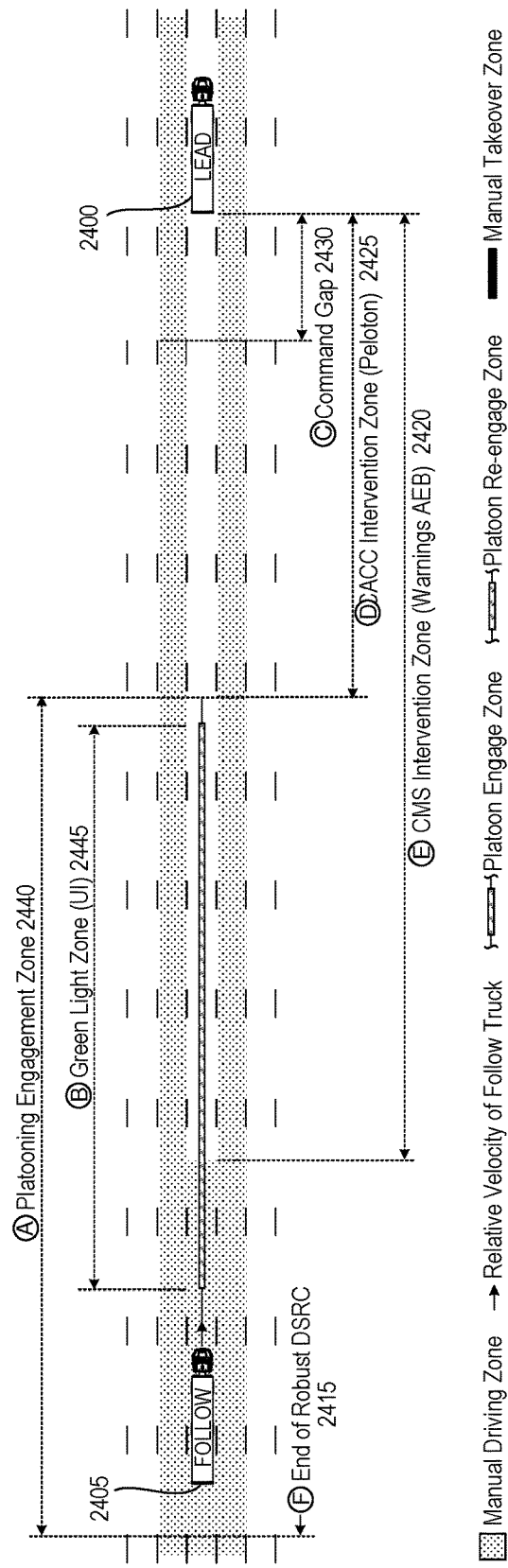
Figure 24B - Platoon Zones - Engaging

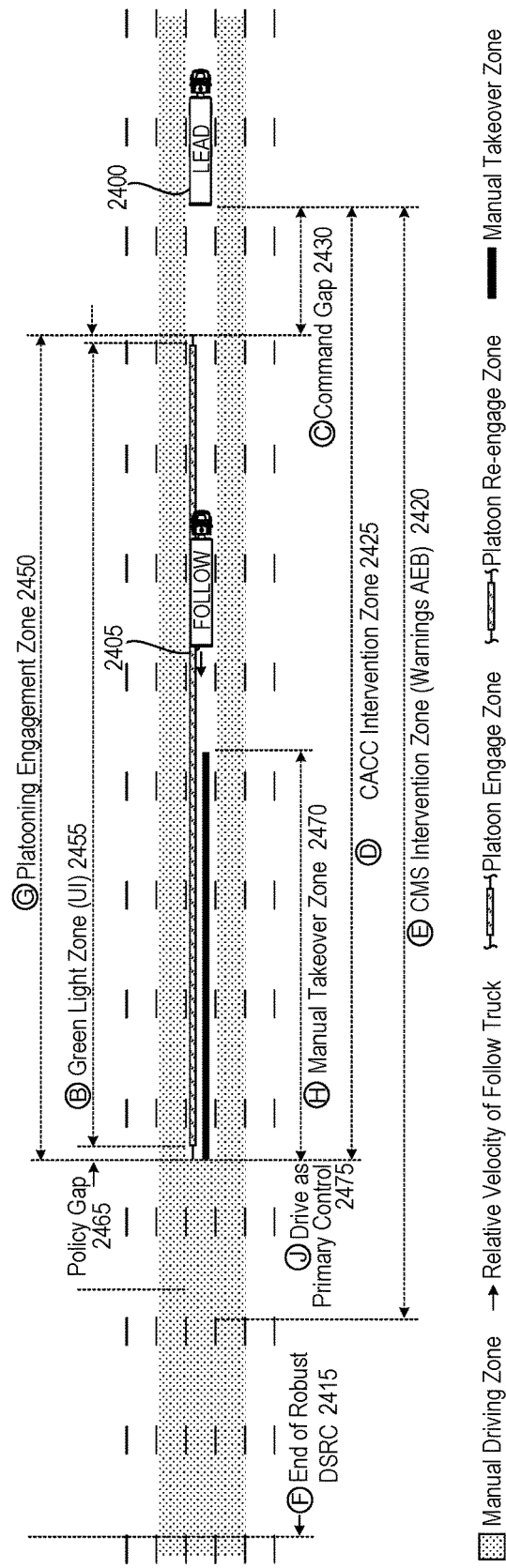

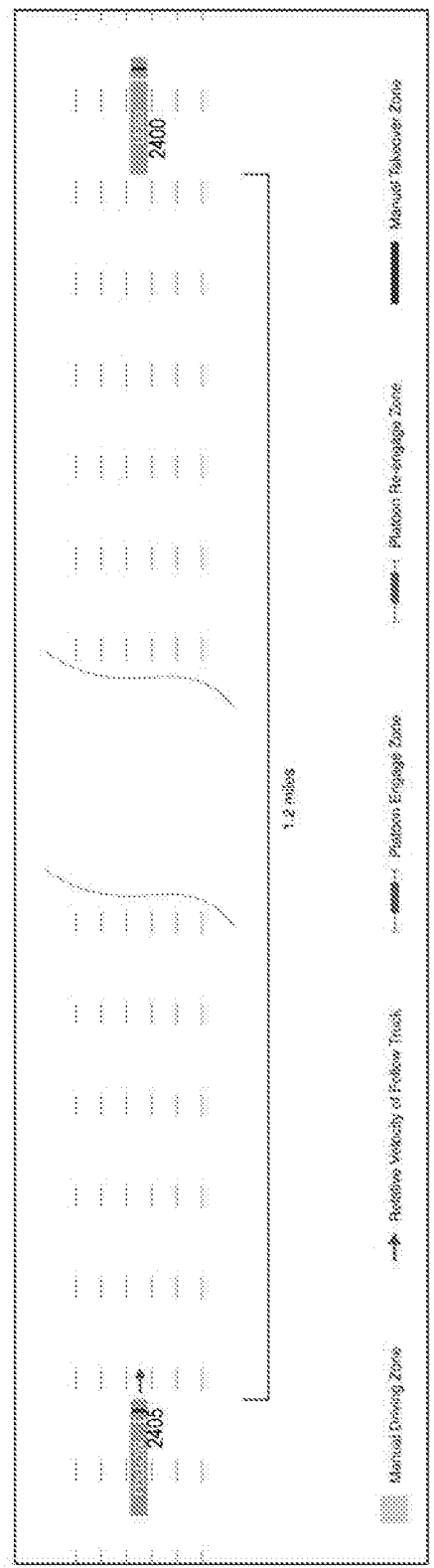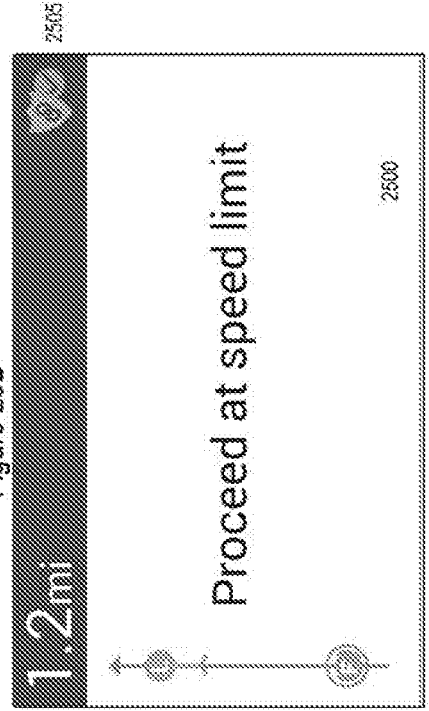

Figure 26A
RENDEZVOUS - On the Road - Micro (robust DSRC connection)
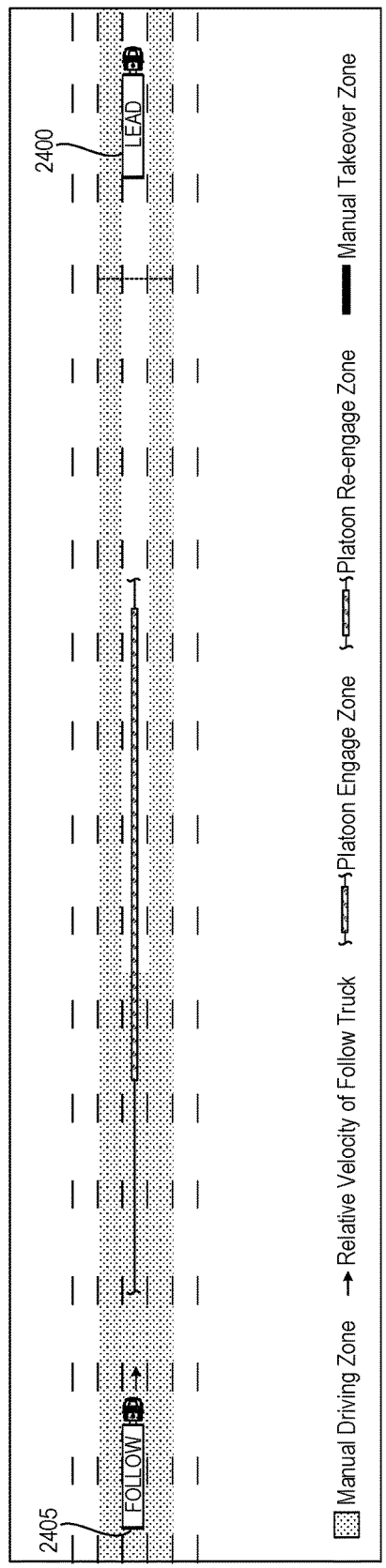
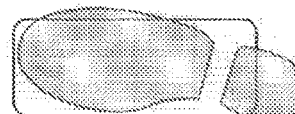
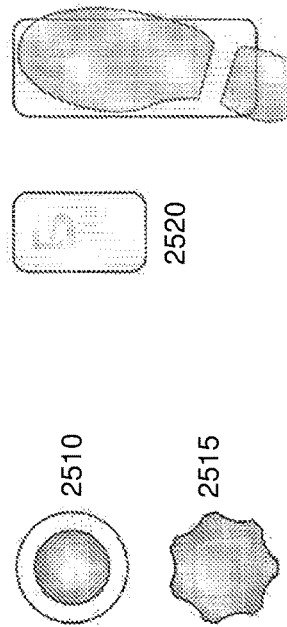
2510
2515
2520
2525
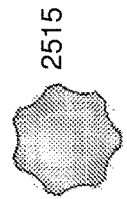
The 300ft refers the green light zone
Figure 26C
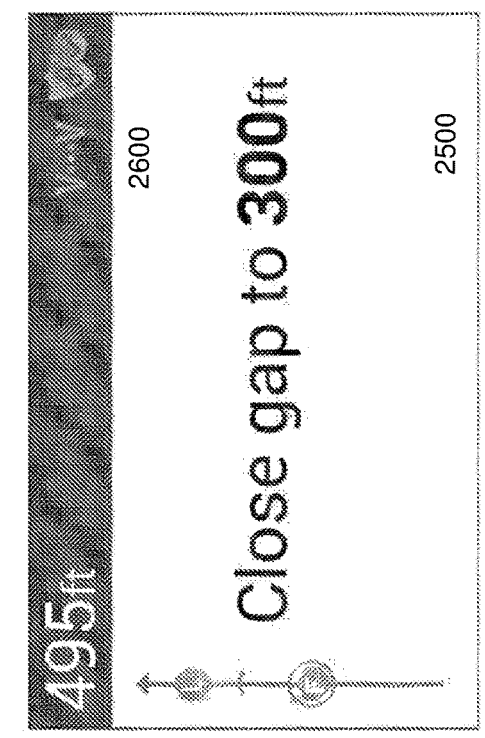
Figure 26B

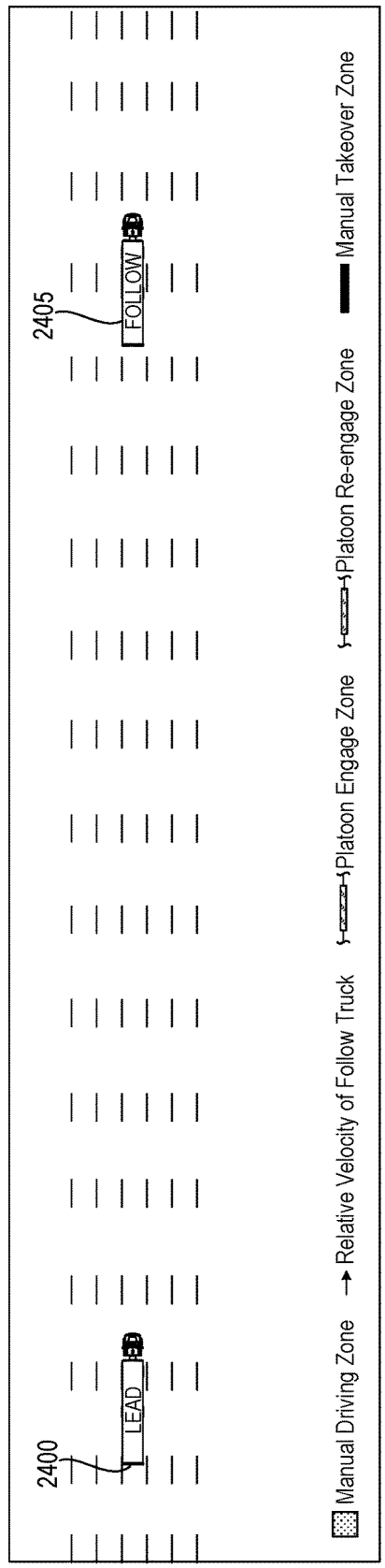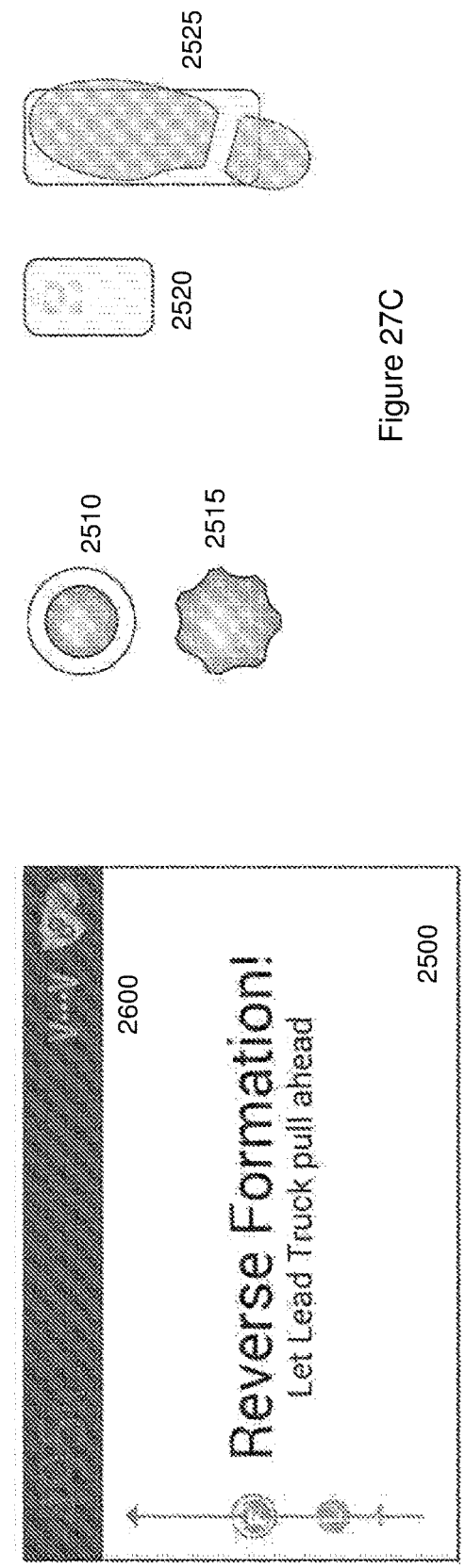
Figure 27A
RENDEZVOUS - Micro, Reverse Formation (robust DSRC connection)
Figure 27B
Figure 27C

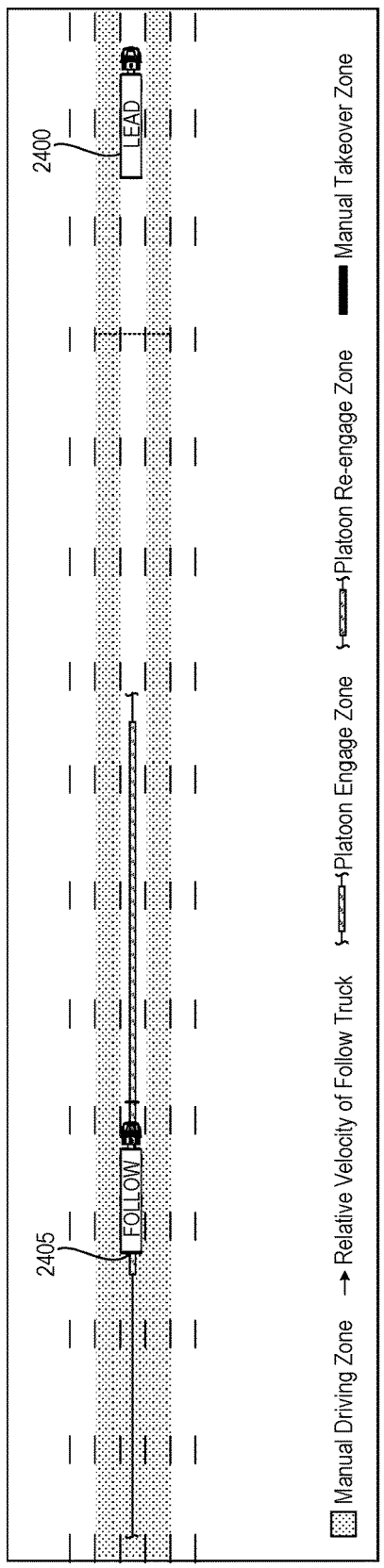
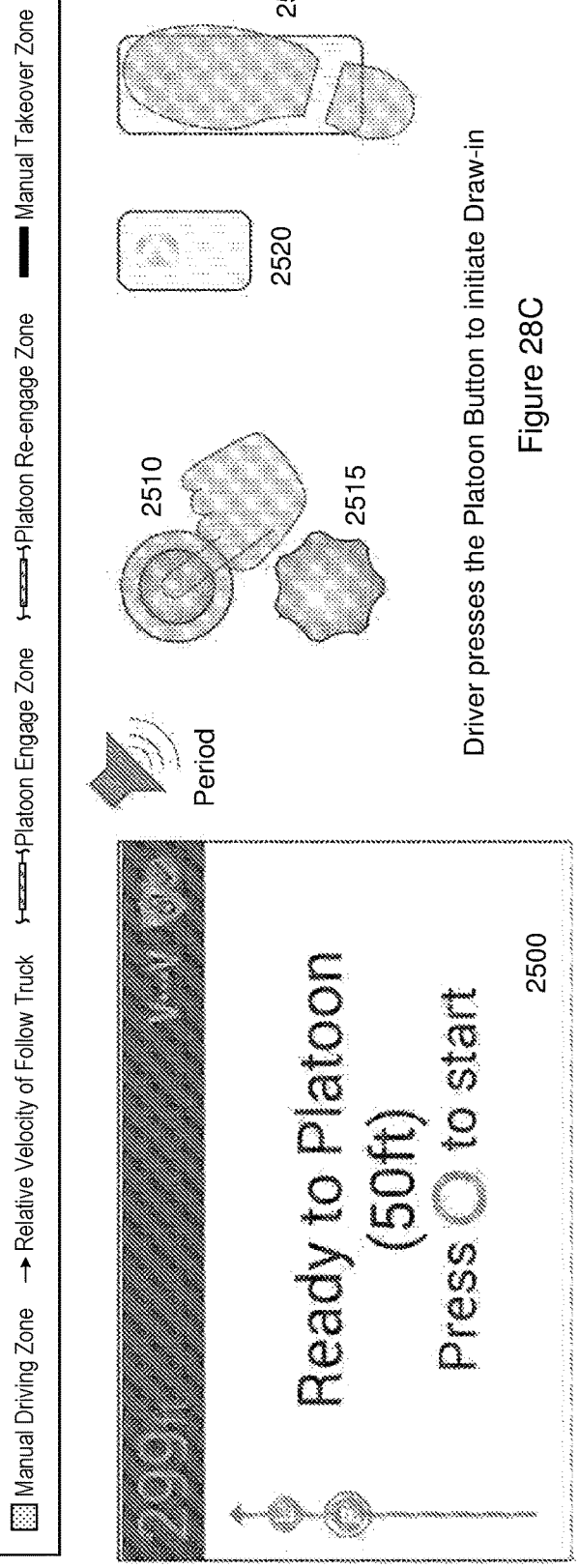
Figure 28A
READY TO PLATOON
Figure 28B
Figure 28C
Driver presses the Platoon Button to initiate Draw-in

DRAW IN

Driver can press the Platoon Button or brake at any time to cancel draw-in.

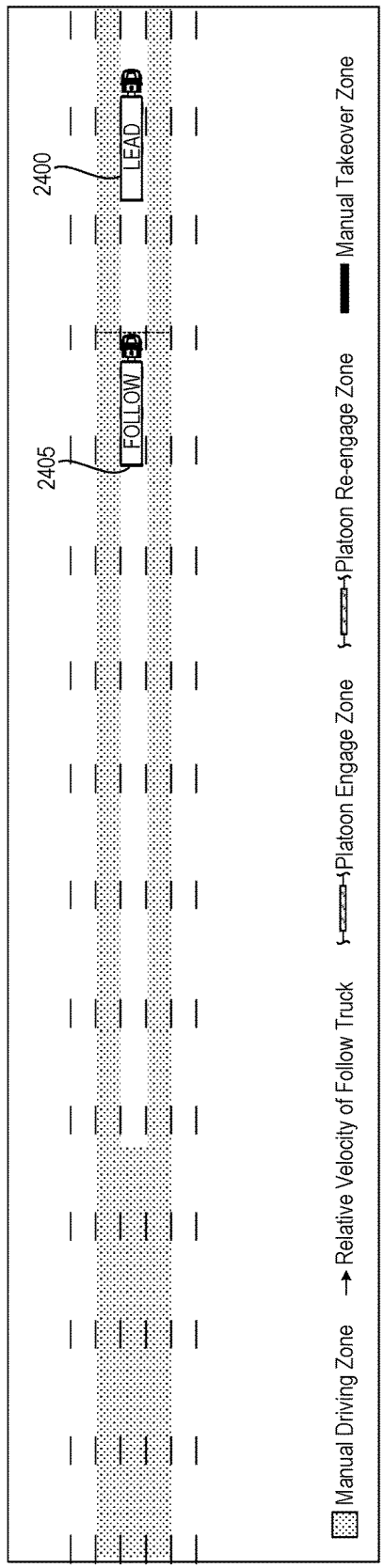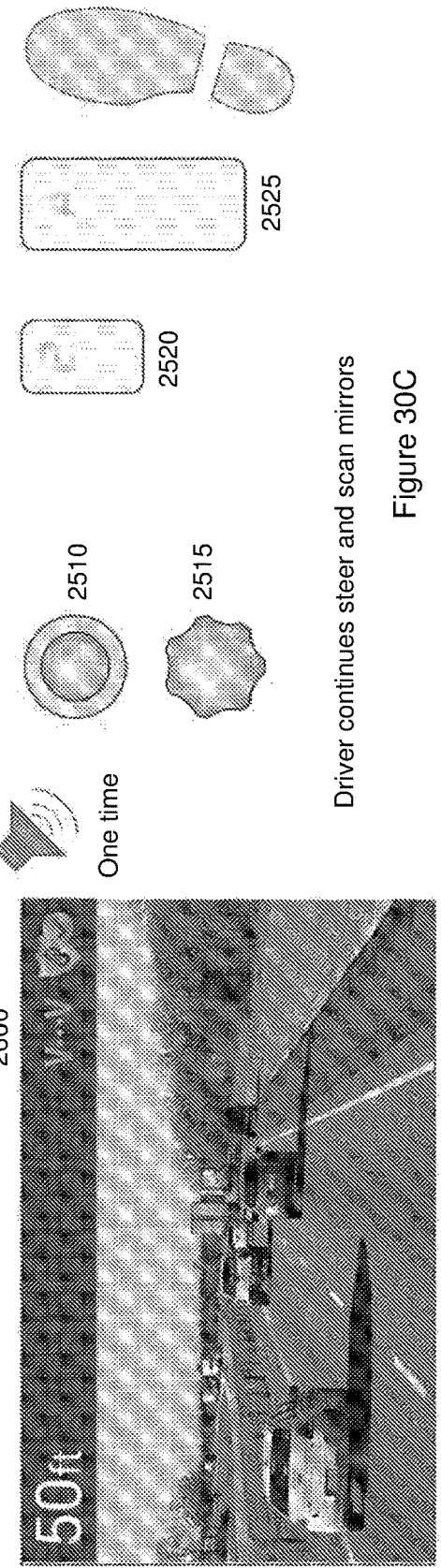
Figure 30A
PLATOONING - Steady State
Figure 30B
Figure 30C

Figure 31A
PLATOONING - Press Button or Brake Pedal to Begin Dissolve (End Platoon)
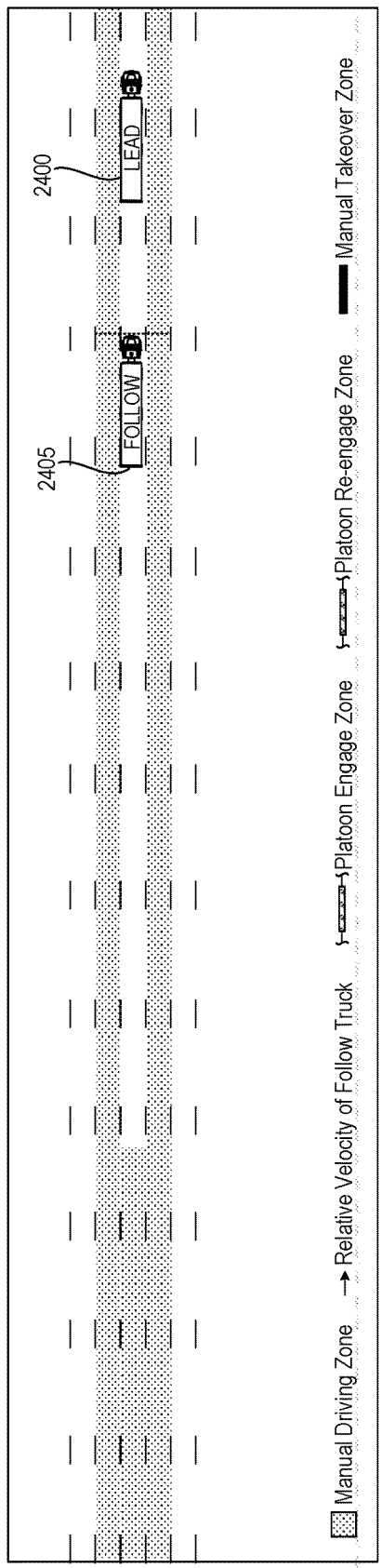
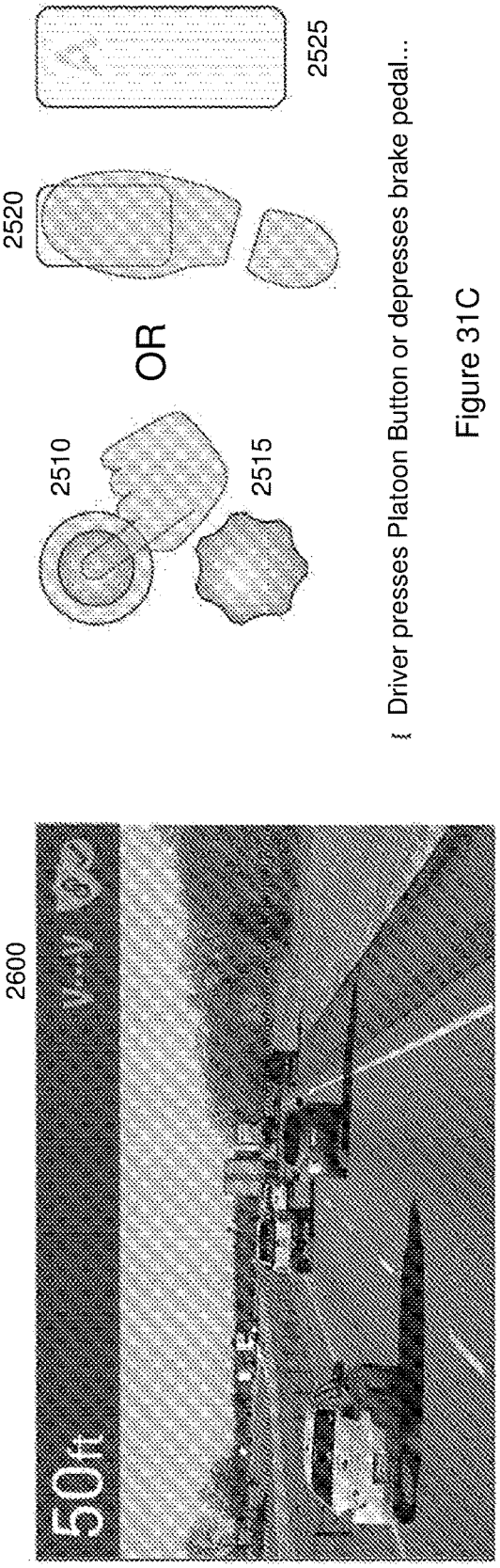
Figure 31B
Figure 31C

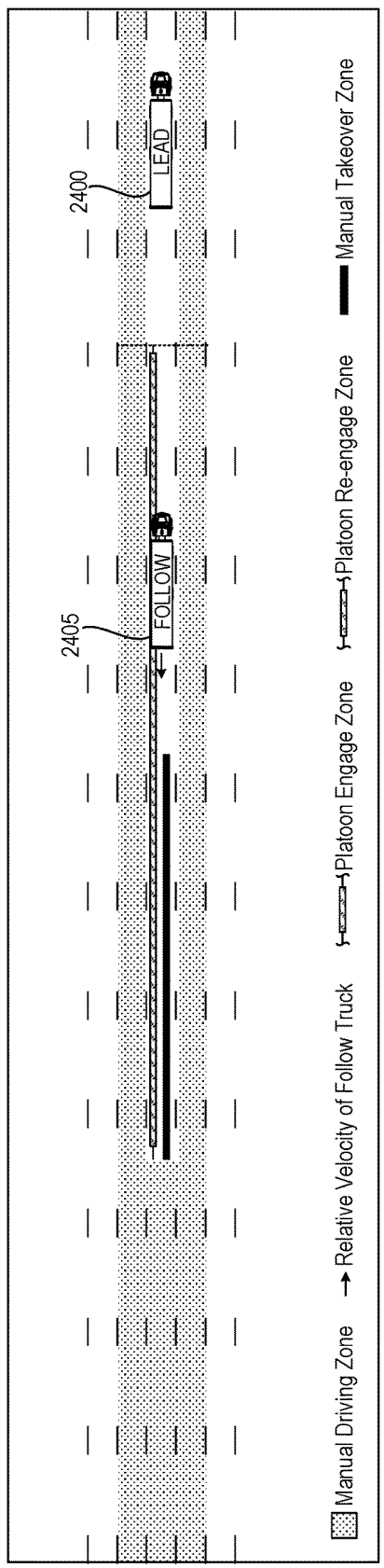
Figure 32A
DISSOLVE - Inside Green Light Zone
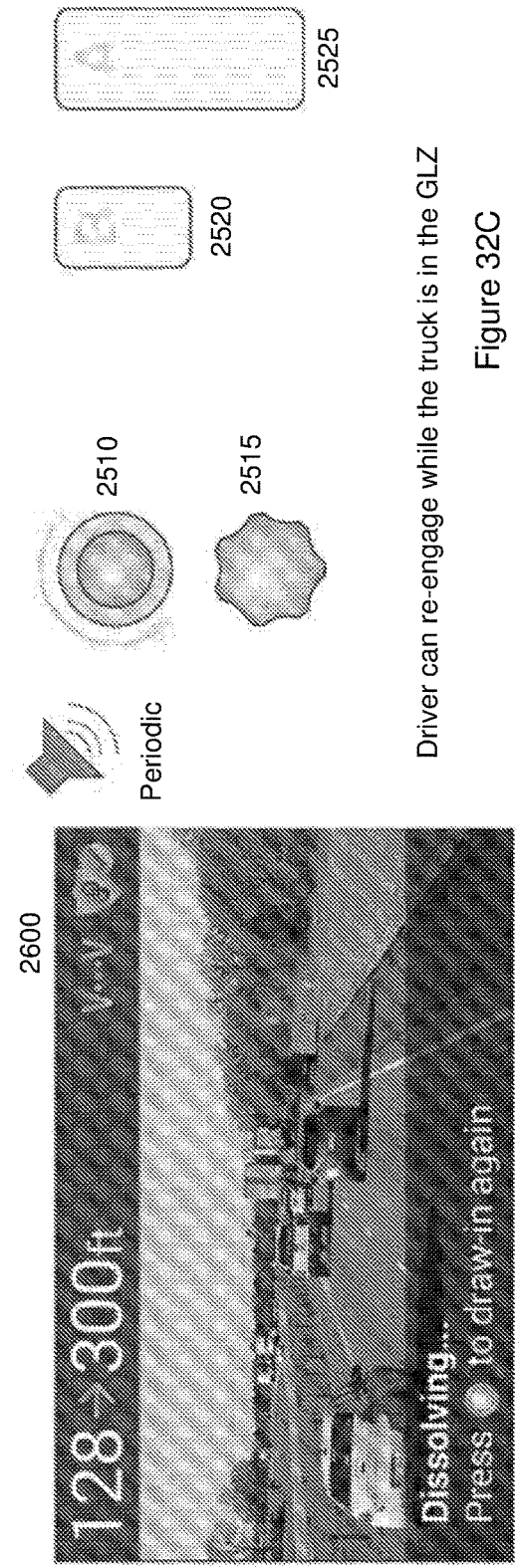
Figure 32B
Figure 32C
Driver can re-engage while the truck is in the GLZ Figure 33A
MANUAL TAKEOVER - Inside takeover AND Green Light Zone
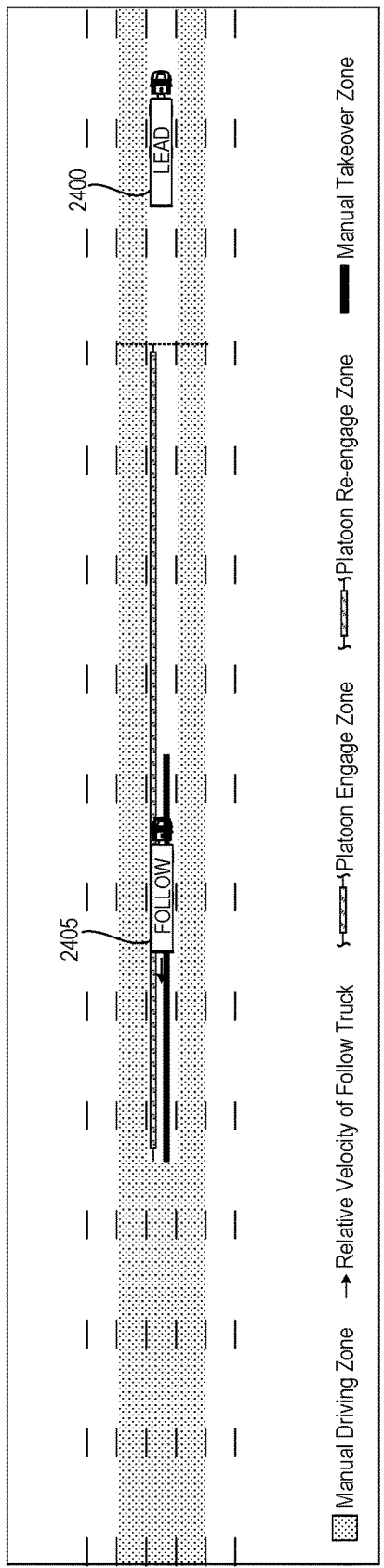
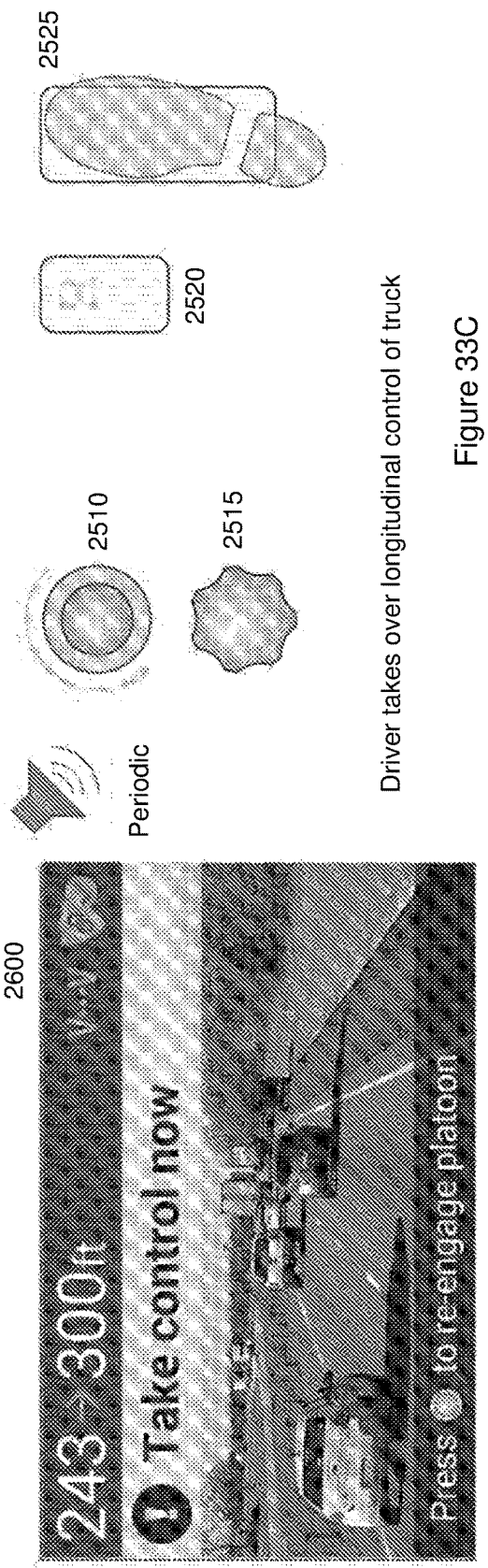
Figure 33B
Figure 33C
Driver takes over longitudinal control of truck

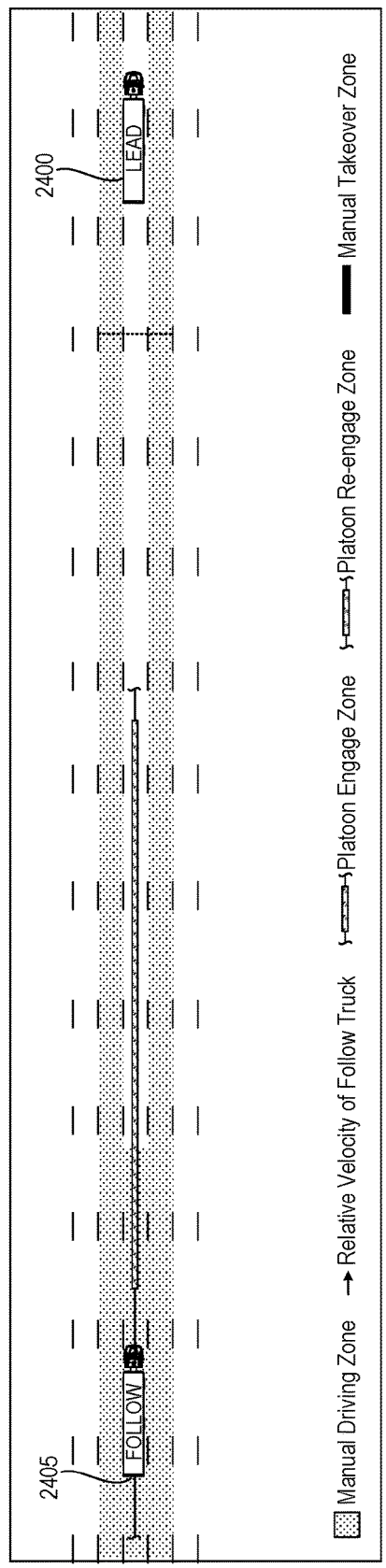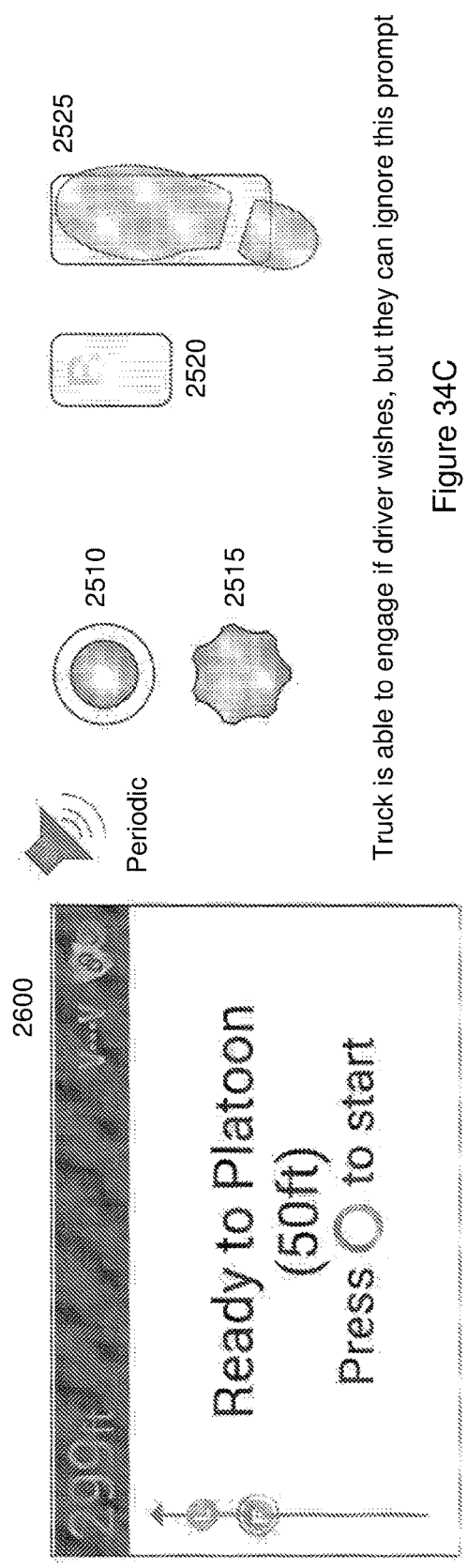

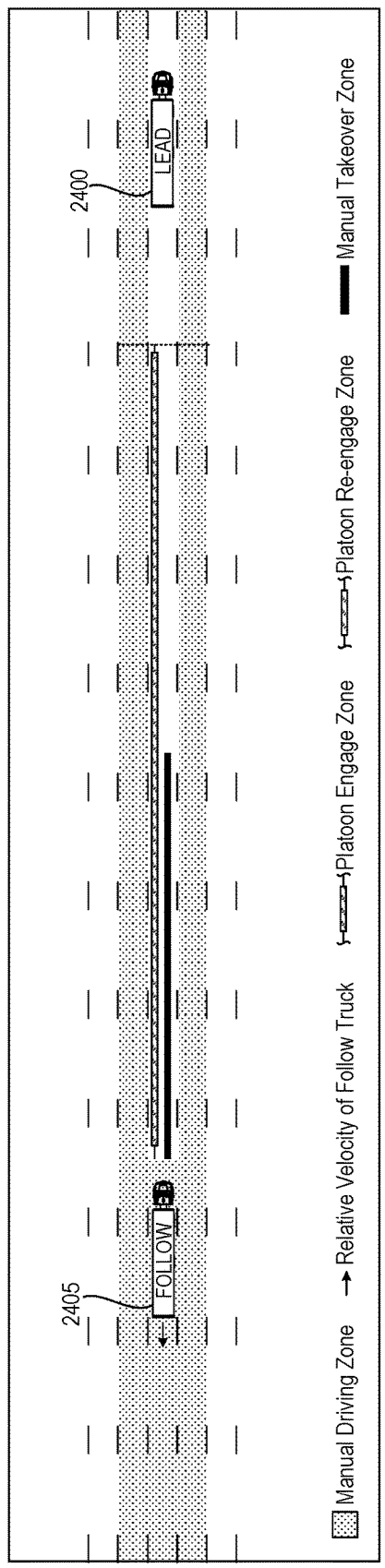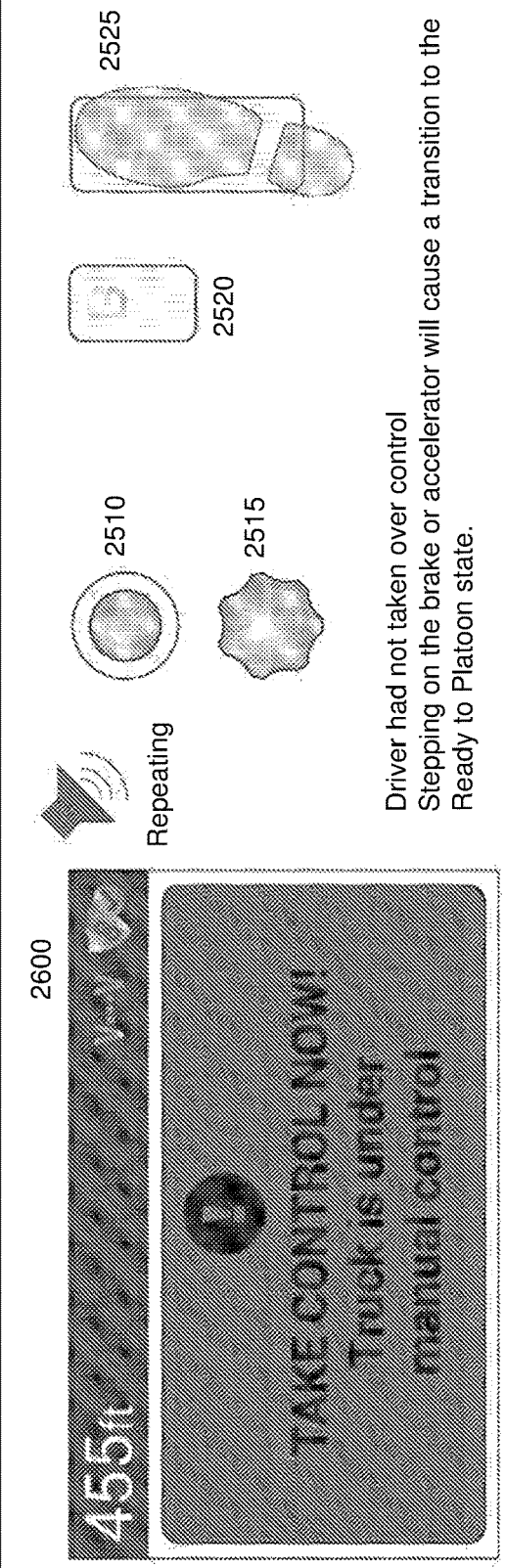
Figure 35A
MANDATORY MANUAL TAKEOVER - Past Safe Manual Following Distance
Figure 35B
Figure 35C

PLATOON CONTROLLER STATE MACHINE

CROSS-REFERENCE TO RELATED APPLICATIONS

The present application claims priority of U.S. Provisional Patent Application Nos. 62/343,819, filed on May 31, 2016, and 62/363,192 filed on Jul. 15, 2016, each of which is incorporated herein by reference in its entirety. The present application also claims priority of U.S. Provisional Application No. 62/377,970, filed on Aug. 22, 2016.

BACKGROUND

The present application relates generally to systems, methods and devices for enabling vehicles to closely follow one another safely using automatic or partially automatic control. More particularly, the invention relates to systems, methods and devices that permit vehicles to safely and efficiently initiate, maintain and dissolve vehicle platoons.

In recent years significant strides have been made in the field of automated vehicle control. One segment of vehicle automation relates to vehicular convoying systems that enable vehicles to follow closely together in a safe, efficient and convenient manner. Following closely behind another vehicle has the potential for significant fuel savings benefits, but is generally unsafe when done manually by the driver. One type of vehicle convoying system is sometimes referred to as vehicle platooning in which a second, and potentially additional, vehicle(s) is/are automatically or semi-automatically controlled to closely follow a lead vehicle in a safe manner.

The fuel efficiency advantages of platooning are particularly noticeable in fields such as the trucking industry in which long distances tend to be traveled at highway speeds. One of the on-going challenges of vehicle platooning is managing the platoon from the identification of the platoon partner(s), through initiating platoon control and drawing the participants together, maintaining the desired gap during platooning, and dissolving the platoon in a graceful manner when appropriate. Another challenge is reliably identifying circumstances in which platooning is not advised. The present application describes techniques for managing platooning and for identifying conditions suggesting that platoon control should not be initiated and/or suggesting dissolution of an existing platoon that platoon.

SUMMARY

A variety of methods, controllers and algorithms are described for controlling a vehicle to closely follow another vehicle safely using automatic or partially automatic control. The described control schemes are well suited for use in vehicle platooning and/or vehicle convoying applications, including truck platooning and convoying controllers.

In one aspect, a method of initiating a platoon between a host vehicle (which may be the trailing vehicle in the platoon) and a platoon partner (which may be the leading vehicle in the platoon) is described. In some embodiments, a particular handshaking protocol between the platoon participants is required before platoon control is established. After communications between the platoon participants has been established, the lead vehicle transmits a front system ready message to the trailing vehicle when its platoon controller is in a state that is ready to platoon. The platoon controller on the trailing vehicle determines whether it is in a state that is ready to platoon. When the platoon controller on the trailing vehicle is in a ready to platoon state, it sends a back system ready message to the lead vehicle. However the back system ready message can only be sent after the front system ready message has been received. After the back system is ready, the leading vehicle must then consent to the platoon. In systems in which the lead vehicle is under manual driver control, the driver consent must be obtained. After lead vehicle consent has been received, the driver of the trailing vehicle is informed that the platoon partner is ready to platoon. At that point, the driver of the trailing vehicle may initiate the platoon which initiates at least some automated control of the trailing vehicle—which typically includes at least control of torque and braking requests.

Preferably, each of the platoon participant must pass a number of platooning prerequisite checks before its system is deemed ready to platoon—although the specific checks may vary based on whether the platoon participant is designated the lead or trailing vehicle.

In other aspects a number of specific checks are described for determining whether a platoon controller on a host vehicle is ready to initiate platoon control of the host vehicle. In some embodiments, the checks include: verifying that the platoon partner is currently in a ready to platoon state; verifying that the platoon partner is within a designated range of the host vehicle; verifying that communications between the host and the platoon partner are stable; and verifying that a tracking unit on the host has a fix on the platoon partner.

In some embodiments, the checks further include one or more of: verifying that a current deceleration of the platoon partner does not exceed an designated deceleration thresholds; verifying that no cut-in vehicle has been detected between the host and the platoon partner; verifying that transitioning to platoon control at the current time would not cause generation of a braking request exceeding a designated braking request threshold; and verifying that at least two of platoon partner speed, host vehicle speed, and relative speed of the host vehicle relative to the platoon partner are within approved platooning limits.

In another aspect, a platoon controller for controlling a host vehicle's participation in a platoon is described. The platoon controller includes a state machine that determines the state of the platoon controller. In some embodiments, the available states of the state machine when the host vehicle is designated a trailing vehicle include: a rendezvous state; a back system ready state; a back ready to platoon state; a back maintain platoon control state; and a back dissolve platoon state.

In some embodiments, the state machine can only transition to the back ready to platoon state when a corresponding platoon controller on the partner vehicle is in a front ready to platoon state that requires a driver of the partner vehicle to affirmatively indicate that the driver is ready to platoon. In some embodiments, the state machine can only transition to the back system ready state when a multiplicity of platooning prerequisite checks, such as the platooning prerequisite checks described above are met. In some embodiments, a driver of the trailing vehicle must affirmatively indicate that the driver is ready to platoon for the state machine to transition from the back ready to platoon state to the back maintain platoon control state.

Preferably, the platoon controller is further configured to perform a multiplicity of platooning requirement checks when the state machine is in the back maintain platoon control state, and the failure of any of the platooning requirement checks causes the state machine to transition to the back dissolve platoon state.

In some embodiments, some of the platooning requirement checks are based on information received from the leading vehicles, as for example the identification of a vehicle of concern in front of the platoon partner (e.g., a slow vehicle ahead of the partner that is too close to the platoon partner) or the determination that reliable communications have not been received from the platoon partner for a designated period of time.

In some embodiments, available states of the state machine when the host vehicle is designated a leading vehicle include: a front rendezvous state; a front system ready state; a front ready to platoon state; and a front maintain platoon state.

In another aspect, a method for generating braking alerts to a driver of a vehicle while the vehicle is being at least semi-automatically controlled by a platoon controller as a trailing vehicle in a platoon is described. In some such embodiments, a desired braking level is determined based at least in part on information received from a platoon partner that is in front of the trailing vehicle. When it is determined that the desired braking level exceeds the maximum braking that can be commanded by the platoon controller and additional braking is deemed necessary, an alert is issued to the driver to manually apply brakes. Preferably the alert includes a spoken audio notification that indicates urgency for braking, as for example a spoken BRAKE NOW command.

BRIEF DESCRIPTION OF THE DRAWINGS

The invention and the advantages thereof, may best be understood by reference to the following description taken in conjunction with the accompanying drawings in which:

FIG. 3 shows a variety of communications links between platooning vehicles, ancillary vehicles, wireless transceivers, and a network operations center.

FIG. 6 illustrates in simplified form a variety of types of messages sent between the NOC and the vehicles, together with simplified architectures for the onboard system and the NOC.

FIG. 8A illustrates in greater detail the Platooning Supervisor Layer of FIG. 7A.

FIGS. 11A-11B illustrate a long range coordination aspect of the present invention, including a geofencing capability.

FIG. 12 illustrates in flow diagram form an embodiment of a process for coordination and linking in accordance with the invention.

FIG. 13 illustrates an embodiment of software architecture suited to perform the travel forecasting function that is one aspect of the present invention.

FIG. 14 illustrates an embodiment of a process architecture for a platooning system in accordance with the invention.

FIG. 15 illustrates in flow chart form an embodiment by which vehicles "pull in" to a platooning position, maintain a close platooning gap for a period of time, and then dissolve the platoon as appropriate.

FIGS. 18A-18C illustrates in flow diagram form various operating conditions detected by the system which cause a driver braking alert.

FIG. 20 shows an alternative process for selecting the speed of a platoon.

FIG. 24A illustrates an embodiment of various zones for managing the transition from unpaired to platooning and back to unpaired.

FIG. 24B illustrates a variation of FIG. 24A where the follow vehicle is gaining on the lead vehicle in anticipation of platooning.

FIG. 24C illustrates a variation of FIG. 24B where a platoon is being dissolved, such that the vehicles return to the unpaired state.

FIGS. 25A-25C illustrate the beginning state of a rendezvous between vehicles intending to platoon, where FIG. 25A shows the roadway, FIG. 25B shows the display the driver sees, and FIG. 25C shows the hand and foot controls the driver can actuate.

FIGS. 26A-26C illustrate, respectively, the roadway, display screen, and driver controls when the vehicles are relatively close to one another but pull-in (or draw in) for platooning is not yet engaged.

FIGS. 27A-27C illustrate, respectively, the roadway, display screen, and driver controls in a reverse formation, where the vehicle intended to be in the lead is behind the vehicle intended to follow.

FIGS. 28A-28C illustrate, respectively, the roadway, display screen, and driver controls when the vehicles are close enough to be ready to platoon.

FIGS. 29A-29C illustrate, respectively, the roadway, display screen, and driver controls when the vehicles begin draw in.

FIGS. 30A-30C illustrate, respectively, the roadway, display screen, and driver controls when the vehicles have formed a platoon, and represents a platooning steady state.

FIGS. 31A-31C illustrate, respectively, the roadway, display screen, and driver controls when the vehicles have formed a platoon and one of the drivers determines to end the platoon by actuating either hand or foot controls.

FIGS. 32A-32C illustrate, respectively, the roadway, display screen, and driver controls when the platoon is being dissolved and vehicles are moving apart.

FIGS. 33A-33C illustrate, respectively, the roadway, display screen, and driver controls after the platoon has been dissolved and the vehicles are sufficiently close that the platoon could be re-engaged, but also sufficiently far apart that manual take-over is permitted.

FIGS. 34A-34C illustrate, respectively, the roadway, display screen, and driver controls when the vehicles are sufficiently far apart that they have returned to the "Ready to Platoon" state.

FIGS. 35A-35C illustrate, respectively, the roadway, display screen, and driver controls when the vehicles are sufficiently far apart that each driver is required to take over control of their vehicle.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some cases, one or more alternatives. It will be apparent to those skilled in the art that the invention can be practiced without implementing all of the features disclosed herein. The features and advantages of embodiments may be better understood with reference to the drawings and discussions that follow.

The present invention relates to systems and methods for automated and semi-automated vehicular convoying. Such systems enable vehicles to follow closely behind each other, in a convenient, safe manner. For convenience of illustration, the exemplary vehicles referred to in the following description will, in general, be large trucks, but those skilled in the art will appreciate that many, if not all, of the features described herein also apply to many other types of vehicles and thus this disclosure, and at least some of the embodiments disclosed herein, is not limited to vehicles of any particular type.

Figure 1B:
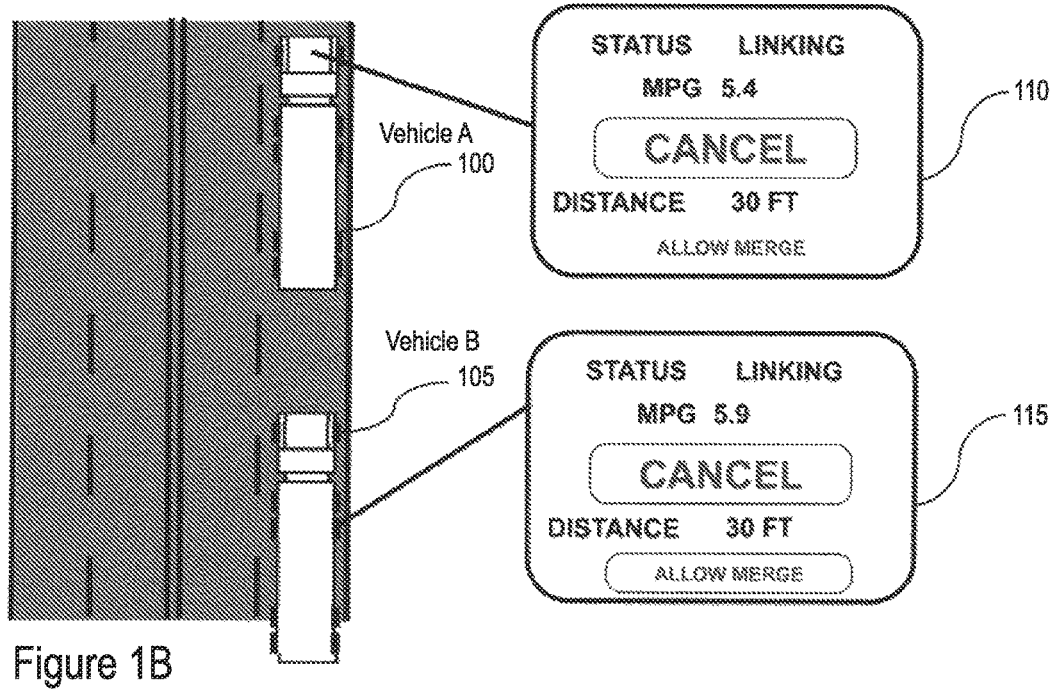
FIGS. 1A-1C show a lead vehicle and a following or trailing vehicle at the three stages of platooning: available, linking, linked.
Figure 1C:
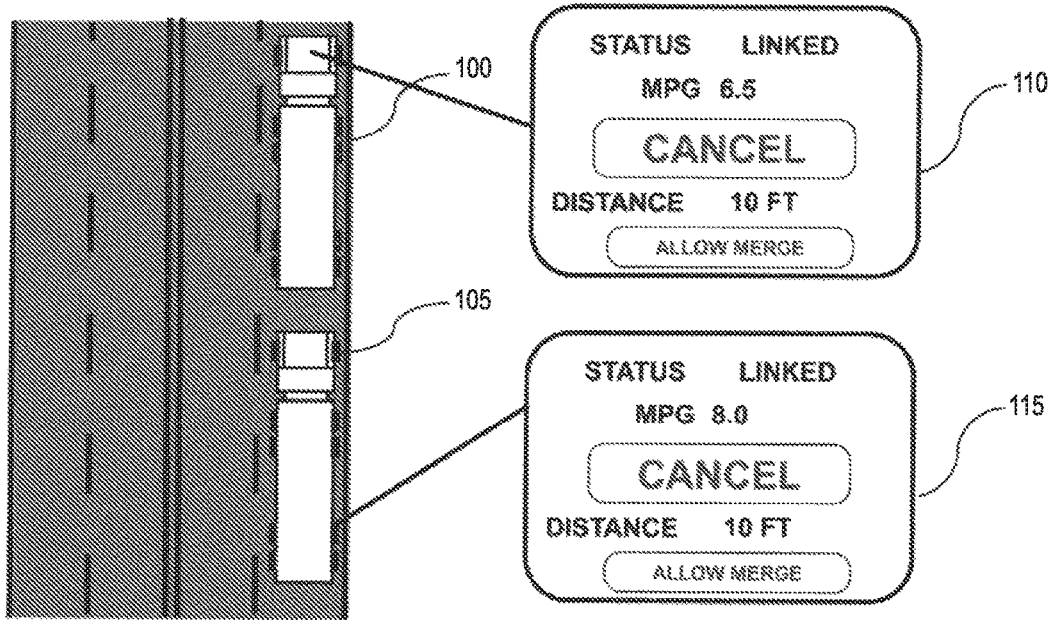
Figure 1A:
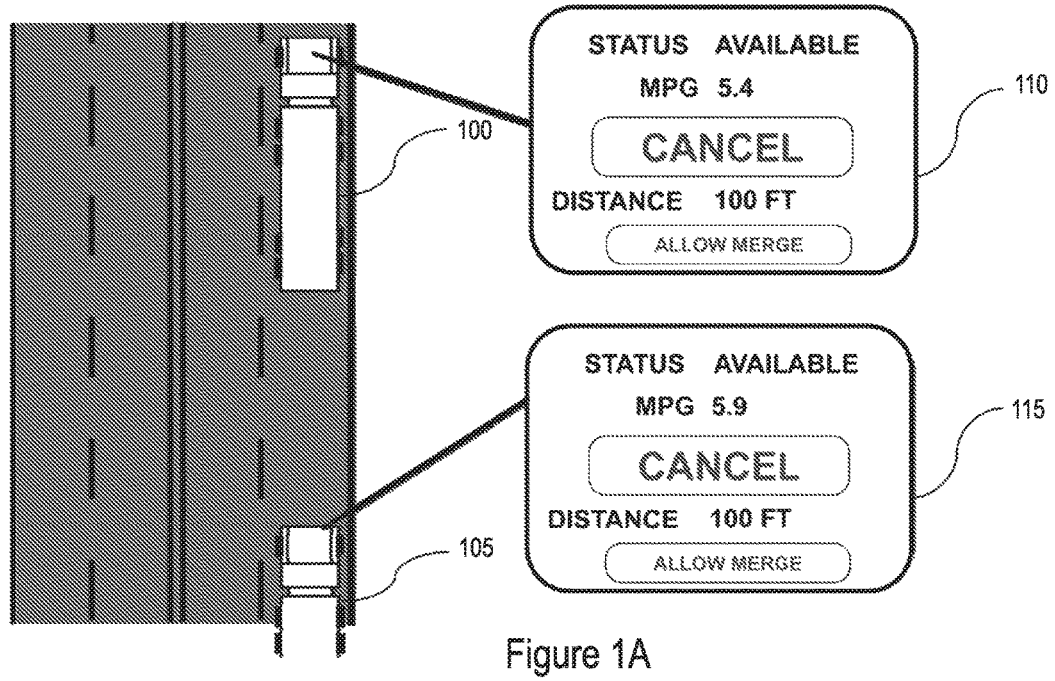

Referring first to FIGS. 1A-1C, three stages of a platoon can be appreciated. In FIG. 1A, vehicle A, indicated at 100, and vehicle B, indicated at 105, are operating independently of one another, but each is available for linking. In some embodiments, the displays shown at 110 and 115, for vehicles A and B, respectively, illustrate status, distance from a candidate partner vehicle, and fuel consumption, in some instances, although other data can also be displayed as will be better appreciated hereinafter. In FIG. 1B, vehicles A and B are sufficiently proximate to one another that linking, or a merge into a platoon, is allowed. As explained in greater detail hereinafter, candidates for linking are typically selected at a network operations center, such as, for example, a fleet management center if the vehicles are large trucks. In such an embodiment, the NOC sends to each vehicle a message identifying suitable candidates for linking, together with information to facilitate both drivers reaching a target rendezvous point at the same time so that they can form a platoon.

Thus, referring again to FIG. 1B, vehicles A and B have at this point been guided to a rendezvous point on a section of roadway suitable for platooning. As discussed in U.S. Pat. No. 8,744,666, incorporated herein by reference, and also as discussed in greater detail hereinafter, when the two vehicles are sufficiently proximate, a communications link is established between them, and a processing system resident in the front, or lead, truck, begins communicating with a similar processing system in the back, or follow, truck. In an embodiment, the lead truck then issues commands to the processing system of the follow truck to control, for example, the acceleration and braking of the follow truck and bring it into position at a close following distance behind the lead truck. In an embodiment, the processor in the lead truck also controls the acceleration and braking of the lead truck to ensure that the follow truck can be guided safely into position behind the lead truck but at a close following distance, for example in the range of 10 feet to 60 feet.

Once the follow truck has been guided into platooning position, the lead vehicle maintains control of at least the acceleration and braking of the following truck. At this point, the vehicles are linked, as shown in FIG. 1C. However, in at least some embodiments, the driver of the rear vehicle remaining in control of steering, such that the rear vehicle is operated only in a semi-automated manner In other embodiments, fully automated operation of the rear vehicle is implemented. It will be appreciated by those skilled in the art that semi-automated and automated are sometimes referred to as semi-autonomous and autonomous.

Figure 2:
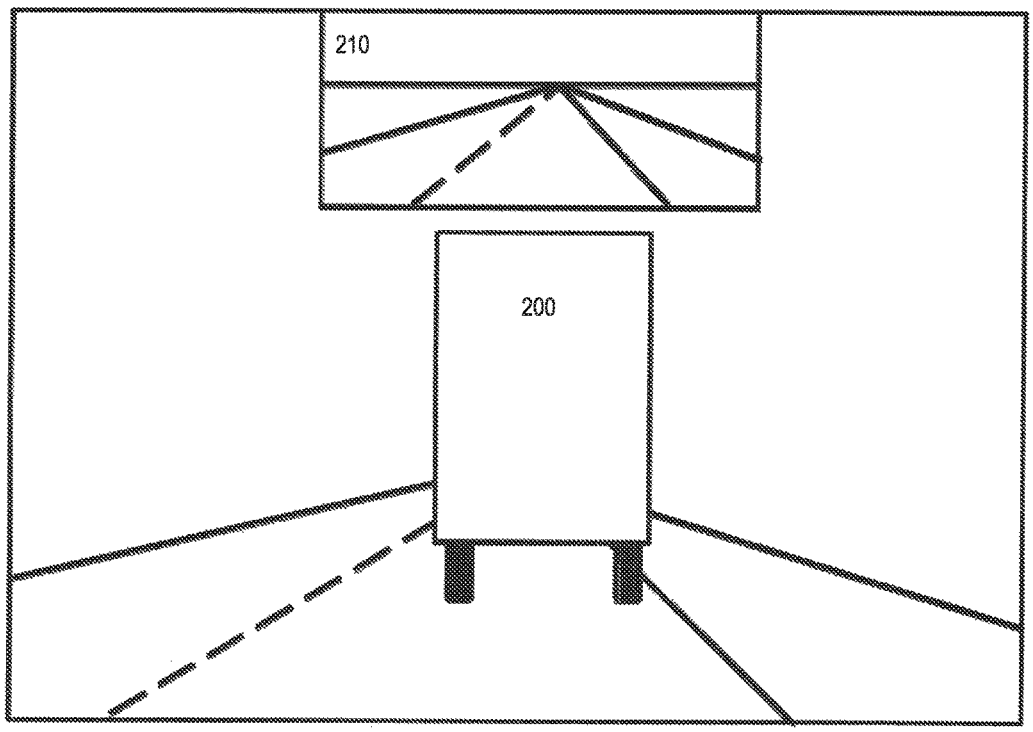
FIG. 2 shows an embodiment of the forward-looking view seen by the trailing vehicle.

When linked, the view from the front of the rear vehicle is as shown in FIG. 2, again using large trucks as an example for purposes of illustration only. The lead truck 200 is immediately in front of the follow truck, and a display 210 shows the view from a forward-facing camera mounted on the lead truck. In some embodiments, haptic or audio devices can be implemented to ensure that the driver of the follow truck stays substantially directly behind the lead truck while platooning. For example, should the driver of the follow vehicle veer out of the lane to the left, an audio signal on the left side can be activated to assist the driver in returning the vehicle to the proper alignment with respect to the lead vehicle. Similarly, should the driver of the follow vehicle veer out of the lane to the right, an audio signal on the right side can be activated. In some embodiments, which audio signal is activated can be reversed; that is, a veer to the left can activate the right audio signal, and vice versa. Should a haptic stimulus be preferred, a pair [right and left] of vibration sources can be implemented either in the steering wheel, or the driver's seat, or both. Alternatively, a single vibration source can be used in some embodiments.

When the vehicles are in platoon formation, a short range communications link such as DSRC is adequate for communicating messages between the processors of each truck, although other forms of wireless communication can be used, for example, cellular. However, even while in platoon formation, it is useful for the vehicles to maintain regular communication with the NOC. As will be discussed in greater detail hereinafter, a variety of data is sent from each truck to the NOC, including truck condition and performance, route changes, local weather, and other data. This permits the fleet operator to proactively manage truck maintenance and repair, adjust routing for weather problems or road construction, identify vehicle location in the event of an emergency, and manage a variety of other analytics.

FIG. 3 illustrates an embodiment of communications links for managing messaging in a system according to the invention. More specifically, FIG. 3 illustrates an embodiment using a variety of communications protocols for managing messaging among potential or actual platoon partners, one or more associated NOC's, a wireless access point which provides remote access to the NOC's. In instances where communication with the NOC is unavailable for a period of time, FIG. 3 illustrates an embodiment of a mesh network by which messages can be communicated between the NOC and a vehicle through intermediary vehicles. More particularly, vehicle 100 is in communication with platoon partner vehicle 105 via DSRC or other suitable wired or wireless technologies, as illustrated at 300. In addition, for most of vehicle 100's route, it is also in communication with NOC 310 via a cellular link 320. Similarly, vehicle 105 communicates with NOC 310 via a cellular link 320, absent a break in the wireless link.

However, cellular communication is not always possible, especially in vehicles driving long distances through varied terrain. Further, cellular is relatively slow for transfer of large amounts of data, such as may be stored on the vehicle if video recording or other high bandwidth functions are used. Thus, in some embodiments vehicles 100 and 105 are also equipped to access WiFi hotspots 330, which in turn communicate with the NOC through either a wireless link illustrated at 340, or wired channel illustrated at 350. Fixed WiFi hotspots are increasingly ubiquitous along the roadway, as well as at fleet operations centers. In addition, WiFi hotspots in vehicles based on 4G LTE or similar services have been introduced. Microcell and similar technologies can also provide a communications link in some instances.

In some embodiments a relay technique based on an ad hoc mesh network can be used. For example, suppose vehicle 100 is traveling east, and just passed through an area of good cellular connectivity to the NOC 300 but is now passing through a zone that has no wireless connectivity. Suppose, too, that vehicle X, shown at 360 is traveling west, and has been out of contact with the NOC for some period of time, but will regain wireless connectivity sooner than truck 100. In at least some embodiments, the NOC 310 knows with reasonable precision the location of each of the vehicles that it monitors based on travel forecasts, discussed in greater detail hereinafter, even when cellular or similar links are unavailable. Thus, if NOC 310 needs to send information to vehicle X, the NOC sends to vehicle 100 the message for vehicle X while vehicle 100 still has connectivity to the NOC. Then, when vehicle 100 and vehicle X are proximate, vehicle 100 relays the NOC's message to vehicle X. Similarly, if vehicle 100 needs to get data to the NOC, but is presently out of touch with the NOC, it can relay its data to vehicle X, and vehicle X retransmits the data to the NOC when vehicle X regains connectivity to the NOC.

It will be appreciated by those skilled in the art that, in some embodiments although possibly not in others, such wireless messaging will be encrypted for security purposes. With appropriate safeguards, vehicles not within the management of the fleet operation can also be used to relay messages. For example vehicles Y and Z, shown at 370 and 380, can receive messages from Vehicles A and B via link 390 and then relay them to NOC 310 if properly equipped for communication with the NOC, which can be by means of a standard protocol. In an environment having a sufficient quantity of vehicles equipped for wireless connectivity, a mesh network is created by which messages can be passed from vehicle to vehicle and thence to the NOC. Such a mesh network also permits the passing of status messages from vehicle to vehicle, so that, for example, the platoon of vehicles 100 and 105 is aware of the status of surrounding vehicles. For example, the platoon may be informed of where the car on the left needs to exit the roadway, which, for example, permits the platoon to avoid having that car cut in between vehicles 100 and 105 or otherwise behave in an unexpected manner. Likewise, emergency conditions can be communicated to the platoon, comprised of Vehicles A and B, well in advance, permitting increased operational safety.

Figure 4:
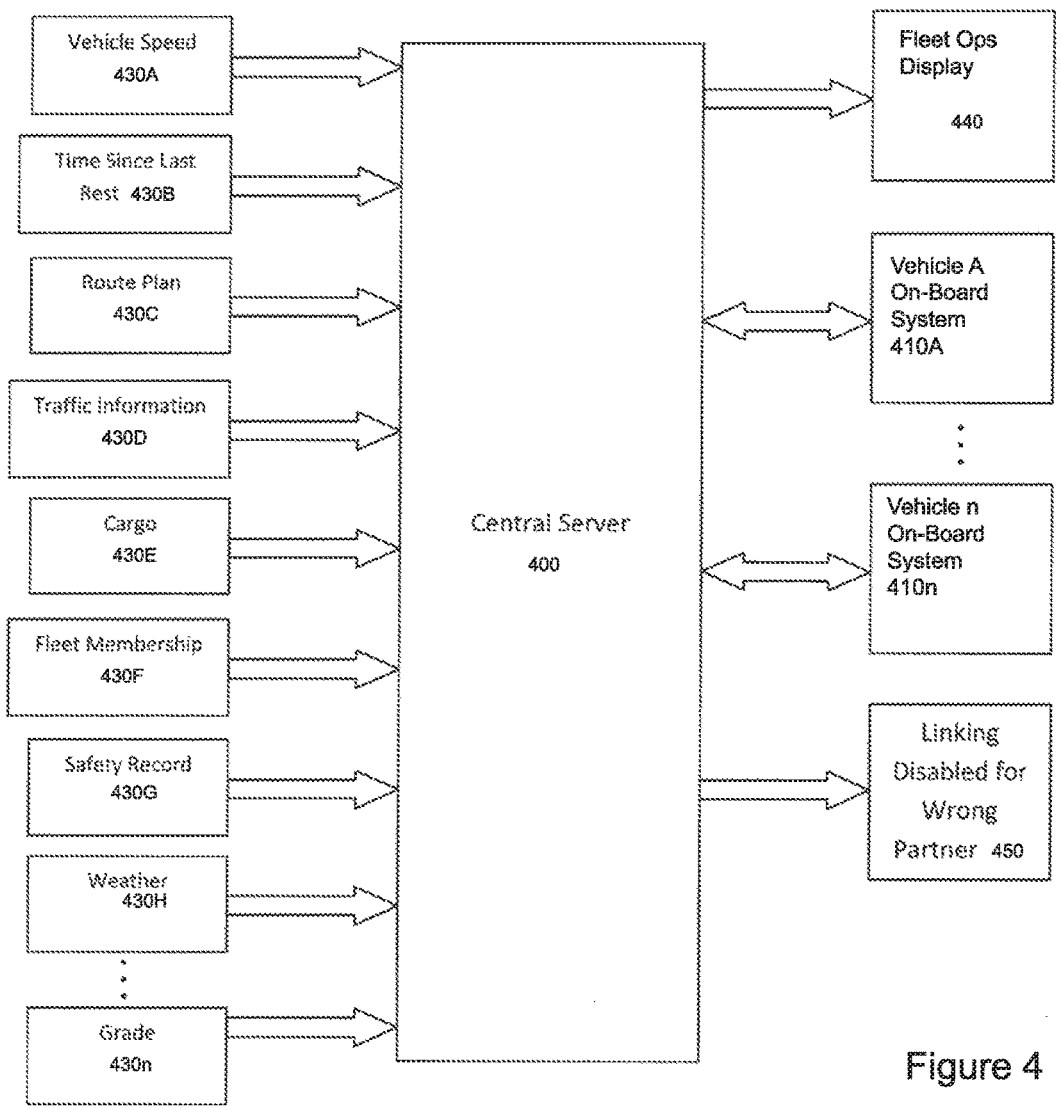
FIG. 4 illustrates a variety of factors that a central server, such as maintained at a NOC, might consider in determining candidates for linking.

With the foregoing understanding of platooning and communications across the network and from vehicle to vehicle, the operation of the central server that, in at least some embodiments, directs and monitors the vehicles 100, 105, etc., can be better appreciated. With reference next to FIG. 4, the central server and some of its inputs can be seen in simplified block diagram form. The central server 400, either alone or in combination with the system onboard each vehicle 410, 420, makes decisions and suggestions either for platooning or simply for improved operation, based on knowledge of one or more of vehicle location, destination, load, weather, traffic conditions, vehicle type, trailer type, recent history of linking, fuel price, driver history, and other factors, all as shown at 430A-n. The central server and the onboard systems both communicate with the driver through display 440. Those communications can involve linking suggestions, road conditions, weather issues, updated routing information, traffic conditions, potential vehicle maintenance issues, and a host of other data. In some instances, a linking opportunity may present itself independently of the central server. In such an instance, once the pairing is identified that potential pairing is communicated to at least the onboard system and, in most instances although not necessarily all, also communicated to the central server. It is possible that either the central server or the on-board systems will conclude that the pair is not suitable for linking, and linking is disabled as shown at 450.

As discussed in pending PCT application PCT/US14/30770, filed Mar. 17, 2014, linking opportunities can be determined while the vehicles are moving, but can also be determined while one or more of the vehicles is stationary, such as at a truck stop, rest stop, weigh station, warehouse, depot, etc. They can also be calculated ahead of time by the fleet manager or other associated personnel. They may be scheduled at time of departure, or hours or days ahead of time, or may be found ad-hoc while on the road, with or without the assistance of the coordination functionality of the system.

Figure 5A:
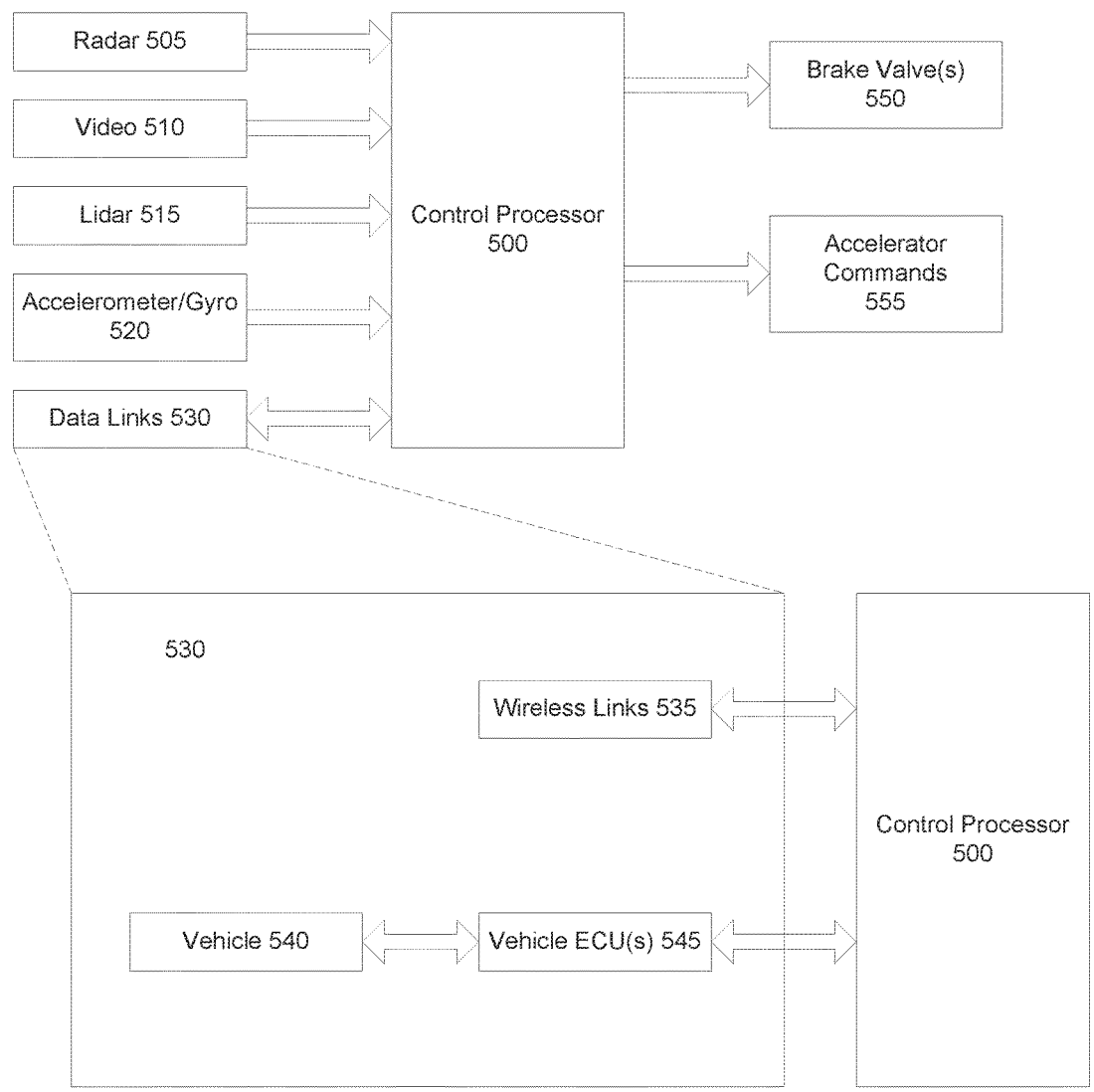
FIG. 5A illustrates in simplified form an embodiment of a control system onboard a vehicle for managing communications as well as monitoring and controlling various vehicle functions.

As noted above, much of the intelligence of the overall system can reside in either the central server, or in the system onboard each vehicle. However, the onboard system includes specific functions for controlling the operation of the vehicle. For example, for large trucks as well as for most vehicles, the onboard system receives a variety of inputs reflecting immediate operating conditions and, based on those plus relevant information received from the central server, controls the vehicle in terms of at least acceleration/velocity, and braking. Thus, as shown in FIG. 5A, an embodiment of an onboard system comprises a control processor 500 that receives inputs from, for example, an onboard radar unit 505, a video camera 510, and a lidar unit 515 via connection (a), typically but not necessarily a CAN interface. The control processor can configure each of these units and receive data. Connection (b) to inertial measurement sensors or gyros 520, which can be wireless, gives the control processor acceleration information in 1, 2 or 3 axes as well as rotation rate information about 1, 2 or 3 axes. In some embodiments, accelerometers can be substituted for gyros, although gyros are generally used for, for example, rotation rate. A plurality of data links 530, shown at (c) and expanded to show detail at the lower portion of FIG. 5A, provides information about relevant characteristics of the leading truck 100, including its acceleration, or is used to provide the same or similar information to the following truck 105. The brake valve and sensor 550, connected on bus (d), provides data on brake pressure, and is used to apply pressure via a command from the control processor 500. The accelerator command 555 is sent via an analog voltage or a communications signal (CAN or otherwise).

The control processor performs calculations to process the sensor information, information from the GUI, and any other data sources, and determine the correct set of actuator commands to attain the current goal (example: maintaining a constant following distance to the preceding vehicle). As shown there, the data links include one or more wireless links 535 such as cellular, DSRC, etc. The data links 530 also comprise inputs from the vehicle, shown at 540, which are typically transmitted via the vehicle's engine control unit, or ECU, indicated at 545 and typically provided by the vehicle manufacturer. Depending upon the embodiment, the control processor communicates bi-directionally with the various input devices.

Figure 5B:
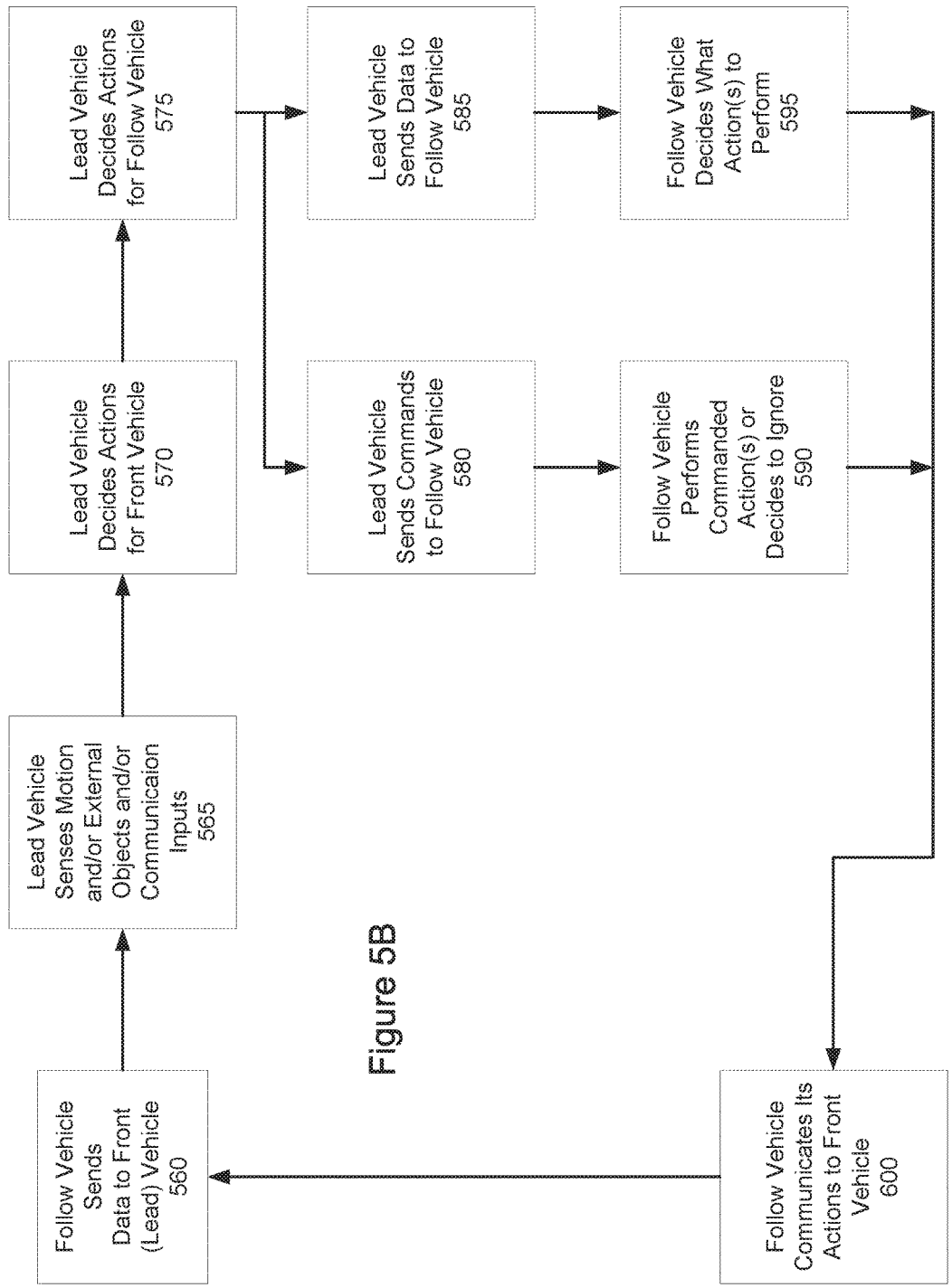
FIG. 5B illustrates in simplified form an algorithm, operating on the onboard control system of FIG. 5A, by which a lead vehicle issues commands to and receives data back from a proximately-located following vehicle.

The operation of the onboard system, or vehicle control unit, of the present invention can be better appreciated from FIG. 5B, which shows, for an embodiment, the general flow between the vehicle control units of two linked vehicles. Depending upon the embodiment, two modes of operation are typically implemented: in a first mode, the front trucks control unit issues commands to the back trucks control unit, and those commands are, in general, followed, but can be ignored in appropriate circumstances, such as safety. In a second mode, the front truck's control unit sends data to the second truck, advising the trailing truck of the data sensed by the lead truck and the actions being taken by the lead truck. The second truck's control unit then operates on that data from the front truck to take appropriate action. As shown at 560, the following or trailing truck sends data about its operation to the front or lead truck. At 565, the lead truck receives the data from the trailing truck, and senses motion and/or external objects and/or communication inputs. The lead truck then decides upon actions for the lead truck, shown at 570, and, if operating in the first mode, also decides upon actions for the back truck, shown at 575. Then, depending upon whether operating in first or second mode, the lead truck either sends commands (580) to the trailing truck (first mode), or sends data (585) to the trailing truck (second mode). If operating in the first mode, the second truck receives the commands and performs them at 590, with the caveat that the second truck can also chose to ignore such commands in some embodiments. If operating in the second mode, the second truck receives the data at 595, and decides what actions to perform. Because the control programs for both units are, in some embodiments, the same, in most cases the resulting control of the second truck will be identical regardless of operating mode. Finally, the second truck communicates to the front truck what actions it has taken, shown at 600, so that each truck knows the state of the other. It will be appreciated by those skilled in the art that the control programs need not be the same for both vehicles in every embodiment.

In at least some embodiments, the above process is repeated substantially continually, for example, once per second, to ensure that each truck has the current state of the other truck, and the NOC has current status for both, thus assisting in ensuring safe and predictable operation of each truck even when operating in close-order formation at highway speeds.

In addition to the foregoing inputs to the control processor of the onboard system, in some embodiments various warnings and alerts can be implemented as inputs to either the control processor or a separate warnings and alerts processor, as described in greater detail in PCT Application PCT/US14/30770, filed Mar. 17, 2014. Likewise, and also as described in the same PCT Application, a brake check process can be implemented both to ensure that the vehicle brakes are working correctly and to help determine which vehicle should lead, as the vehicle with the better brakes will usually be positioned as the follow vehicle, all other parameters being equal.

In at least some embodiments, reliably safe platooning involves a collaboration between the NOC and the onboard system. Thus, referring to FIG. 6, the interaction between the functionalities provided by the NOC and the operation of the onboard system can be appreciated at a high level. For purposes of establishing a platoon, the NOC 601, which resides in the cloud in at least some embodiments, comprises, in simplified terms, a link finder function 605, a link approver function 610, and a logger function 615. The outputs of the functions are conveyed through a communication gateway 620 to the onboard system 625. The onboard system 625 receives from the NOC 601 information about vehicle pairings that the NOC has determined to have linking potential, followed by linking authorizations at the appropriate time, indicated at 630. In addition, the onboard system receives hazard advisories, indicated at 635, which in general comprise hazards to the vehicle based upon the projected route of travel.

The onboard system 625 comprises, from a functional standpoint, one or more electronic control units, or ECU's, which manage various functions as more specifically described in connection with FIG. 7A. For the sake of simplicity of explanation, in FIG. 6 only a data ECU is shown, and it provides for message handling and communications management. It will be appreciated by those skilled in the art that the ECU function can be implemented in a separate device, or can be integrated into a ECU which also provides other functions. It will be appreciated that, in most instances, an ECU as described herein comprises a controller or other processor, together with appropriate storage and other ancillaries to execute program instructions of the type discussed in greater detail as discussed herein and particularly beginning with FIG. 7A. In an embodiment, the data ECU 640 manages the WiFi, LTE and Bluetooth interfaces, indicated at 645, 650 and 655, respectively, and in turn communicates bidirectionally with a platoon controller ECU function 660. The platoon controller ECU function in turn communicates bidirectionally with other platoon candidates and members via a DSRC link 665, and also outputs data to the driver's display 670.

In at least some embodiments, the onboard ECU function communicates with the vehicle's CAN bus 730 which provides connection to a platoon controller 675, log controller 680, driver interface 685. The ECU also provides back to the NOC reports of vehicle position and health, or "breadcrumbs", at a rate of approximately once per second, as indicated at 697. In addition, when a data link with suitable high bandwidth and low cost is available, such as WiFi, the ECU dumps its log to the NOC, as indicated at 699. Depending upon the embodiment, the log can comprise all data, including video information, or can comprise a subset of that data. For example, in an embodiment, the log dump can comprise some or all CAN bus data including SAE J1939 data, some or all radar, LIDAR and video data, some or all GPS data, some or all DSRC data, and some or all status data for both radio systems. It will be appreciated by those skilled in the art that not all such data is transmitted on the CAN bus, and instead may be communicated via an Ethernet connection, a point-to-point connection, or other suitable communications link.

Figure 7A:
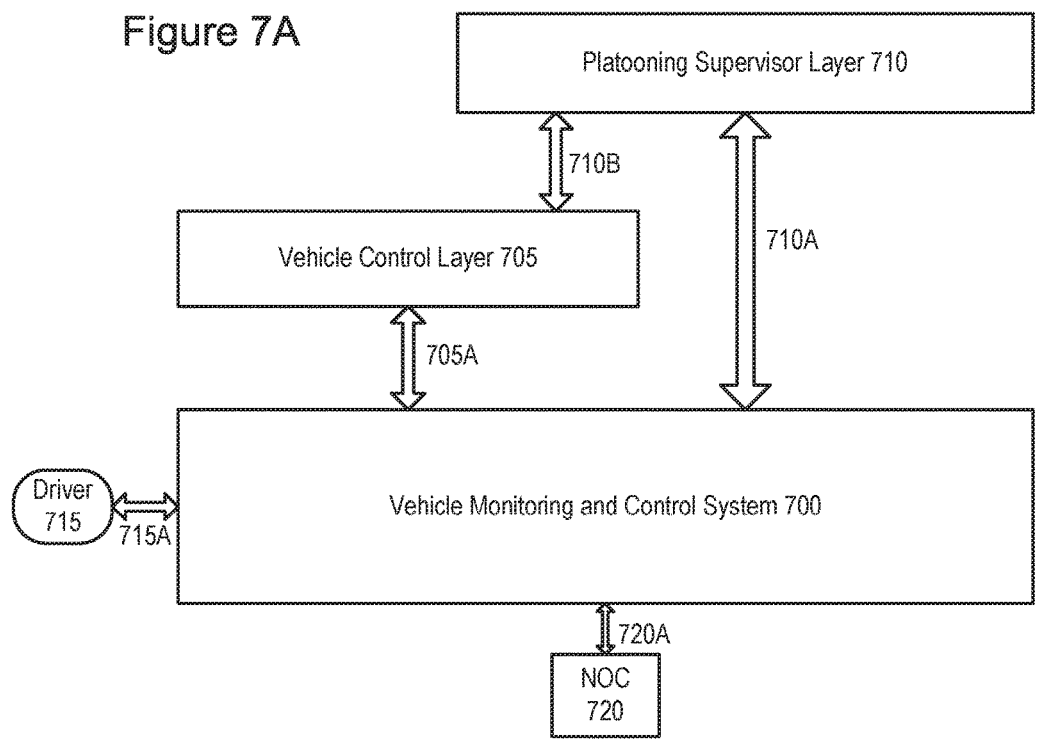
FIG. 7A illustrates in block diagram form the operation of a platooning supervisor system, comprising a vehicle monitoring and control system in combination with one or more software layers, in accordance with an embodiment of the invention.

Referring next to FIG. 7A, an embodiment of a system in accordance with the invention is shown in a simplified form of schematic block diagram showing a hardware layer and the software layers that cause the hardware layer to perform the inventive functions. In particular, Vehicle Monitoring and Control System 700 comprises one or more processors and related hardware as further described in connection with FIG. 7B et seq. The System 700 provides data to and executes instructions from Vehicle Control Layer 705 via channel 705A and also provides data to and executes instructions from Platooning Supervisor Layer 710 via channel 710A. In addition, Platooning Supervisor Layer 710 also communicates with the Vehicle Control Layer 705 via channel 710B. It will be appreciated by those skilled in the art that layers 705 and 710 are software layers, executing on the hardware of the hardware layer shown as System 700.

Figure 7B:
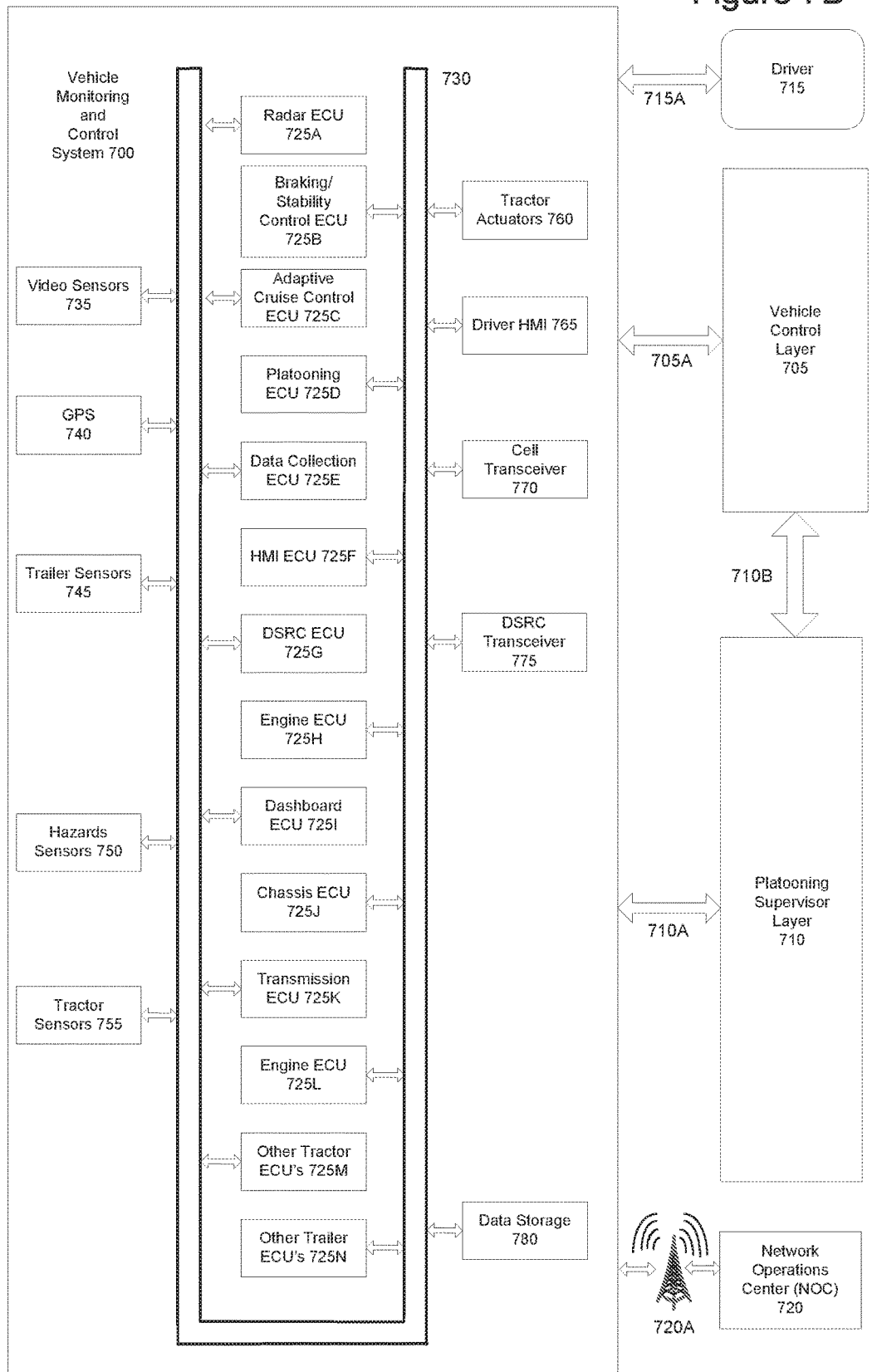
FIG. 7B illustrates in greater detail an embodiment of the processors, sensors and actuators of the vehicle monitoring and control system of FIG. 7A, together with the associated software layers.

The hardware components that comprise the Vehicle Monitoring and Control System 700, and their interoperation with software layers 705 and 710, can be better appreciated from FIG. 7B. More specifically, in an embodiment, the Vehicle Monitoring and Control System comprises one or more Electronic Control Units (ECU's) that receive inputs from various sensors and provide outputs to various actuators and other devices comprising, for example, the driver HMI and cell and DSRC transceivers, under the control of the Vehicle Control Layer 705 and Platooning Supervisor Layer 710. The System 700 also communicates with the Driver 715 over a connection 715A. The System 700 also communicates with a NOC 720, usually over a wireless link such as shown by cell tower 720A.

While a single ECU can perform all of the functions necessary in at least some embodiments of the invention, most modern vehicles have a plurality of ECU's, with each being assigned a specialty. Thus, as shown in the embodiment illustrated in FIG. 7B, a plurality of ECU's 725A-725N comprise the core of the System 700 and communicate with one another on bus 730 which can be, in at least some embodiments, a CAN bus although, depending upon the particular device being linked, the bus 730 can be a different type of bus or even a point-to-point connection. In an embodiment, the ECU's 725A-725N, which are merely representative and are not intended to represent an exhaustive list, receive inputs from video sensors 735, GPS device(s) 740, trailer sensors 745, hazard sensors 750, and tractor sensors 755. Depending upon the embodiment, fewer, more or different sensors can be used. The bus 730 also permits the ECU's to transmit control signals to tractor actuators 760, to provide data to and receive inputs from the driver via HMI 765, and to manage Cell and DSRC transceivers 770 and 775, respectively. Further, the bus 730 provides a link by which data from the various sensors and ECU's can be stored on Data Storage 780. The various ECU's 725A-N can comprise, among others, Radar ECU 725A, Braking/Stability ECU 725B, Adaptive Cruise Control ECU 725C, Platooning ECU 725D, Data Collection ECU 725E, HMI ECU 725F, DSRC ECU 725G, Engine ECU 725H, Dashboard ECU 725I, Chassis ECU 725J, transmission ECU 725K. Other tractor ECU's can also be implemented, as shown at 725M, and other trailer ECU's can similarly be implemented as shown at 725N. It will be appreciated by those skilled in the art that the software comprising the vehicle control layer and the platooning supervisor layer can be distributed across one, some, or all such ECU's.

Referring next to FIG. 8A, the Platooning Supervisor Layer and its interaction with the Vehicle Monitoring and Control System 700 can be appreciated in greater detail. Except for the System 700, FIG. 8A illustrates various software functionalities of an embodiment of the present invention. The Driver HMI functionality, indicated at 765, interacts directly with the vehicle driver, and presents to the driver information from the System 700 as well as the Platooning Supervisor Layer as well as serving as the input mechanism for the Driver's commands and choices, for example, selections of a linking partner, or acceptance by the driver of an offered link.

The NOC Communications Manager 800 establishes and maintains a secure communication link between the vehicle and the NOC, and provides the mechanism for passing messages reliably to and from the NOC. The NOC Communications Manager receives inputs from the Vehicle Monitoring function 805, the Hazards Monitoring function 810, the Software Update Management function 815, and the NOC itself.

The Vehicle Monitoring functionality 805 samples and filters the vehicle state from any of the sources connected to the bus 730, based on requests from the NOC 720. The NOC 720 specifies what information is to be provided, and at what interval, or frequency, and also specifies how the data is to be processed before being communicated back to the NOC. Alternatively, local processing can replace the NOC. The Hazards Monitor 810 "listens" on the Bus 730 for vehicle faults and communicates relevant vehicle faults to the NOC. The Hazards Monitor 810 also receives hazard alerts from the NOC, and, based on its inputs including vehicle status and environmental conditions, makes a local determination on whether to override a platooning authorization. The Hazards Monitor provides an Authorization Override to Authorization Management function 820, and also sends a hazards warning to the driver via HMI Services function 840. The Software Update Manager 815 responds to version queries and provides the mechanism by which software on the vehicle can be remotely upgraded.

The Hazards Monitor can locally override a linking authorization from the NOC in the event a condition is detected which either negates a planned linking, adjusts the platooning distance, or otherwise alters the conditions on which the authorization is based. Such conditions typically include vehicle status problems, or adverse environmental conditions. If the Hazards Monitor override is based upon a vehicle fault or other status issue, that fault or issue is also communicated to the NOC so that the NOC can take it into consideration when evaluating future linking involving the vehicle. Other conditions leading to a Hazards override can result from issues external to the vehicle itself, such as weather, traffic or road conditions detected by other vehicles. Depending upon the embodiment and the particular condition, the information about the external issue can be communicated to the NOC by another vehicle, and then sent to the vehicle receiving the linking authorization, or the information about the external issue can be communicated from the other vehicle directly to the vehicle receiving the linking authorization. In either case, the onboard system passes the hazard information to the Hazards Monitor, which takes appropriate action to either cancel or modify the authorized linking.

In the absence of an override from the Hazards Monitor, the Authorizations Manager 820 receives and interprets authorization packets from the NOC, via the NOC Communications Manager 800, in combination with absolute position, speed and heading information from the Vehicle Position Tracking function 825 [in turn received from the System 700] to help determine the proximity of the platooning partners proposed by the NOC, as discussed in greater detail hereinafter. The Authorizations Manager sends to the System 700 a link authorization status message together with a time to transition, i.e., a time at which the platooning partner is proximate and linking can begin. The Authorizations Manager also sends an identification of the selected platooning partner to Inter-vehicle Communications Management function 830, and, in some embodiments, sends to an Approach Guidance function 835 information regarding the selected platooning partner, its position, and guidance for linking.

The Inter-vehicle Communications Manager 830 manages the mutual authentication of the platooning partners by providing security credentials to the System 700, typically communicated over a DSRC [Digital Short Range Communications] link. In embodiments having approach guidance, the Approach Guidance function 835 operates in two modes. When the partner vehicle is outside DSRC range, it provides approach guidance directly from the NOC, if such guidance is available. Then, once a secure communications link with the platooning partner has been established, over a DSRC link in at least some embodiments, the Approach Guidance function provides local approach guidance independent of the NOC, using position and speed information provided by the partner vehicle together with local vehicle tracking information, such as radar tracking status received from System 700 and data from Vehicle Position Tracking function 825. Depending upon the embodiment, the guidance can comprise supplying the driver with none, some, or all of mapping, video and radar inputs, lane alignment, and any other data available from the system. In some embodiments, the driver manually uses such data to position the vehicle for platooning, at which point the platooning controller engages and brings the vehicles to the desired platooning gap.

The HMI Services function 840 provides the semantic layer for interaction with the driver of the vehicle, and converts status information from the vehicle, including the software layers, into relevant messages to the driver. In addition, the HMI Services function processes inputs from the driver. The HMI Services module provides presentation data to the Vehicle Hardware for display to the driver on the Driver HMI, typically a touchscreen display to permit easy entry of driver commands, choices, and other inputs. For the driver of the following vehicle, the display typically includes a video stream of the forward-looking camera on the lead vehicle.

Figure 8B:
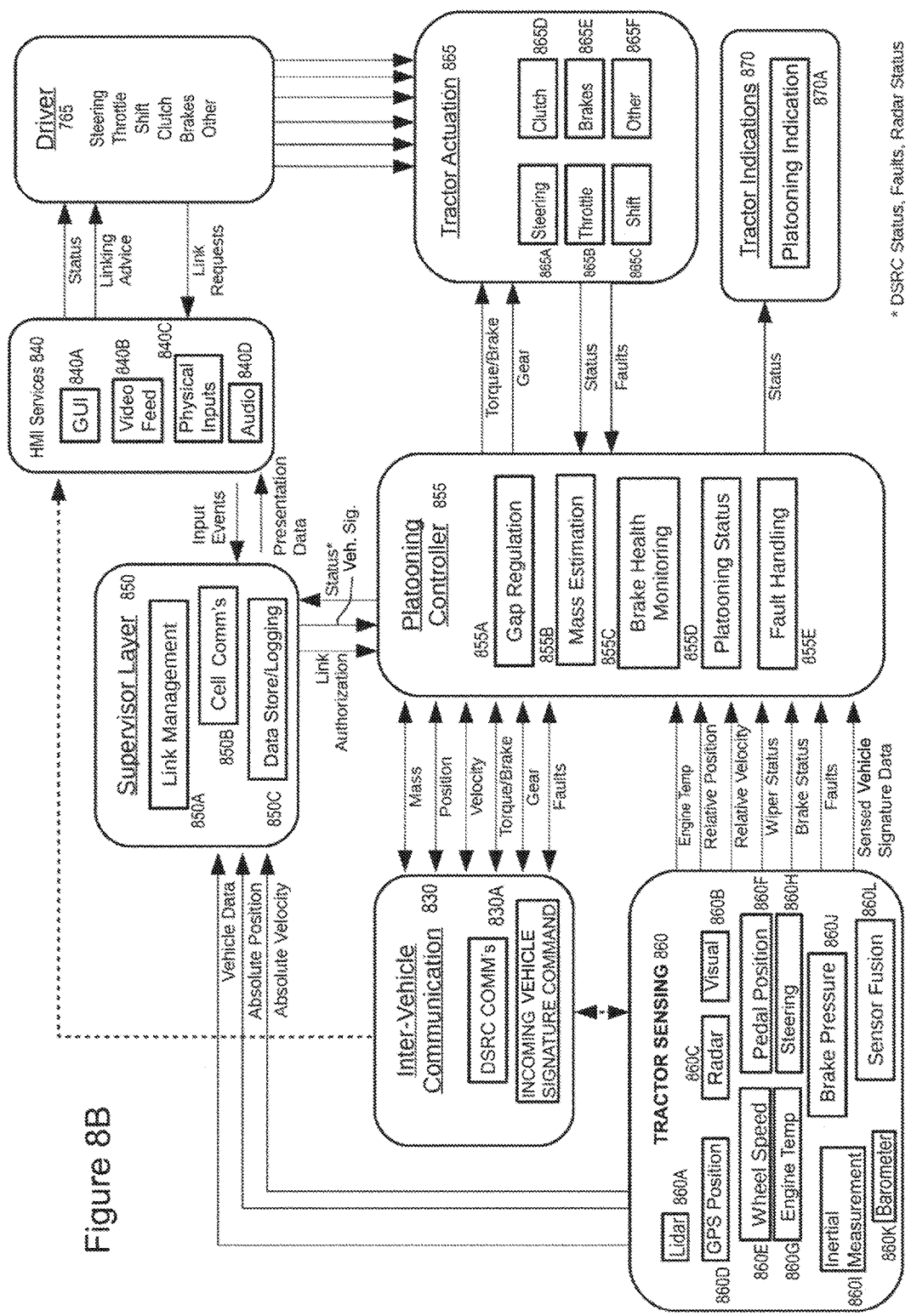
FIG. 8B illustrates, from a software functionality perspective, the operation of an embodiment of the vehicle control system of the present invention.

Referring next to FIG. 8B, the software functionalities described above can be appreciated in the context of the software functions of the system as a whole. As in FIG. 8A, the Inter-vehicle Communications function 830, which includes management of DSRC Communications and Incoming Vehicle Signature Commands, discussed hereinafter at FIG. 17A et seq., sends messages to HMI Services function 840, which provides an interface to the Driver function shown at 765. Inputs from the driver interface 765 include link requests based on the driver's selection of a platoon partner. It will be appreciated that multiple potential platoon partners will exist on many routes, thus giving the driver multiple options. However, in some embodiments and for some fleets, the platoon partner choices will be determined at fleet operations, for example where multiple trucks routinely follow the same route to the same or nearby destinations. In such instances the driver's options are either to accept the link or to reject it.

The HMI Services function also provides to a Supervisor Layer 850 input events received from the driver, and receives from the Supervisor Layer presentation data. The HMI Services function comprises, in an embodiment, a GUI 840A, video feed 8408, physical inputs 840C, and audio inputs and outputs 8400. The Supervisor Layer includes a Link Management function 850A, cellular communications management 850B and data store and logging 850C.

The Supervisor Layer also sends Link Authorizations and Vehicle Signature commands and data to a Platooning Controller function 855, and receives from that controller status messages including DSRC status, faults, and radar status. The Platooning Controller 855 comprises various functions, including Gap Regulation 855A, Mass Estimation 855B, Brake Health Monitoring 855C, Platooning Status 8550, and Fault Handling 855E. Gap regulation can involve setting a distance from the lead to the follow vehicle, or can involve setting a time headway from the back of the lead vehicle to the front of the follow vehicle. In either event, the objective is to ensure that the distance provides acceptable fuel economy benefits while at the same time ensuring the safety of both vehicles.

To perform the foregoing functions, the Platooning Controller receives inputs from the tractor representing status of various tractor functions, shown generally at Tractor Sensing 860. In an embodiment, those functions include Lidar data 860A, Visual data 860B, radar 860C, GPS position 860D, wheel speed 860E, pedal position 860F, Engine Temperature 860G (sensed either from the block, from the engine bay, or other suitable location), steering 860H, inertial measurement 8601, brake pressure 860J, barometer and related weather sensing 860K, and combinations of such sensed data indicated as sensor fusion 860L. Other data, such as fuel level or remaining driving range, as well as Sensed Vehicle Signature Data (discussed hereinafter at FIG. 17 et seq.) is also provided in some embodiments. In some embodiments, the Tractor Sensing function communicates bi-directionally with the Inter-Vehicle Communication module, in particular where some processing of the data related to vehicle signature occurs within the ECU's associated with the Tractor Sensing functions.

The Platooning Controller communications bi-directionally with the Inter-vehicle Communication module 830 regarding mass, position, velocity, torque/braking, gear and faults. More specifically, the Controller 855 receives, via the DSRC link, data about the other vehicle including mass, position, velocity, torque/brake status, gear, and faults. The Platooning Controller uses these inputs to provide the status data to the Supervisor Layer, as mentioned above, and also provides torque and brake commands, and gear. In the absence of a gear sensor, gear selection can be calculated for manual transmissions based on engine speed and tire rotation speed. Gear on automatic transmissions can be sensed directly from the Transmission ECU.

The Platooning Controller 855 also receives status and fault information from a Tractor Actuation function 865, which, in an embodiment, comprises the functions 865A-865F of steering, throttle, shifting, clutch, and braking as well as other driver-controlled actions such as a jake brake, etc. In at least some embodiments, the driver [function block 765] can provide all of such inputs to the tractor actuation block 865, although both braking and throttle are under the control of the platooning controller 855 during linking and while linked as a platoon. In some embodiments, a Tractor Indication function 870, comprising a Platooning Indication 870A, is also provided, and controls a physical indicator positioned on the tractor and visible to other vehicles proximate to the platoon. The physical indicator is typically enabled when a platoon is formed, and can also be enabled during the linking process.

Figure 9:
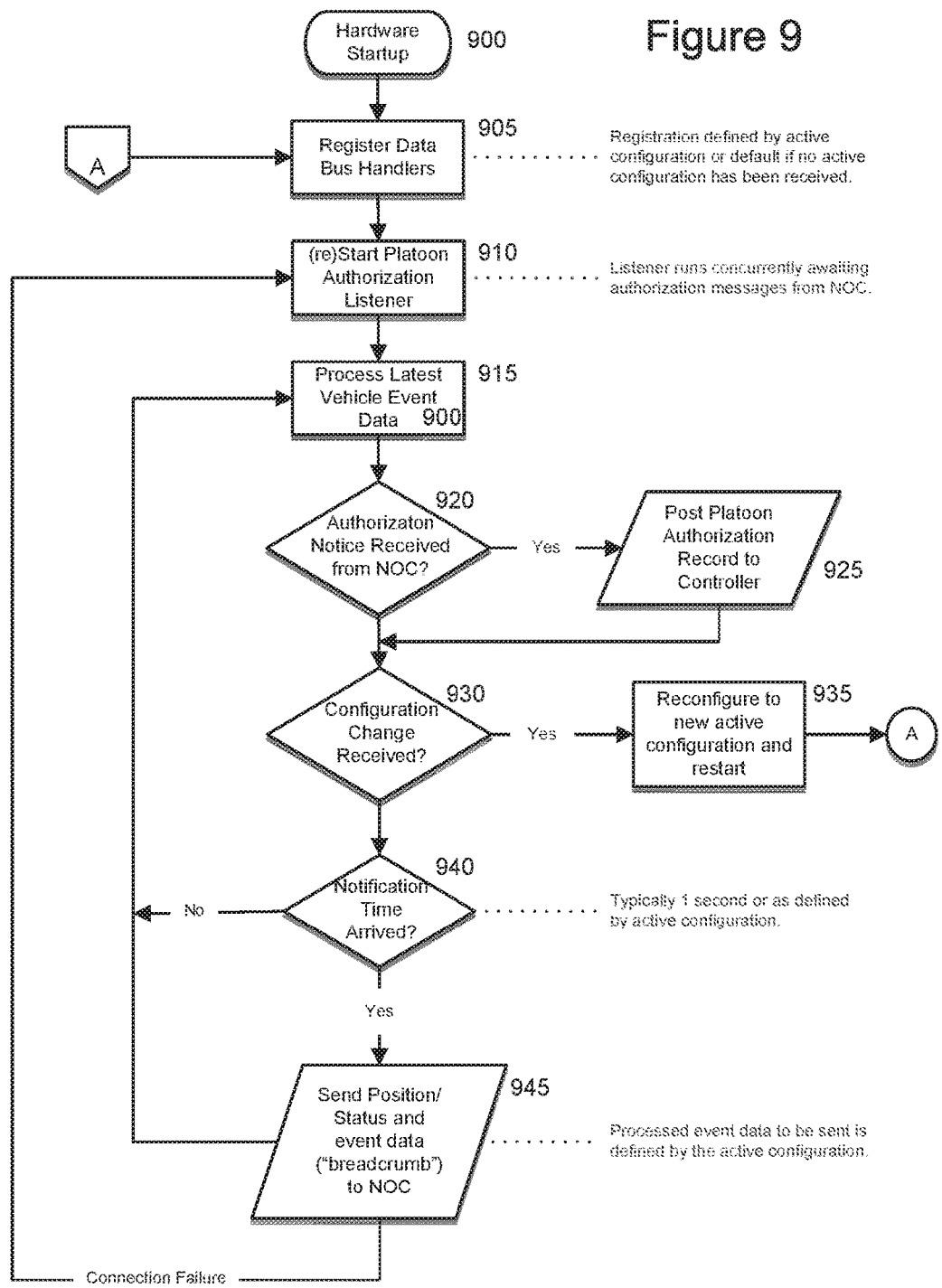
FIG. 9 illustrates in flow diagram form an embodiment of a vehicle data processing main loop in accordance with the invention.

Turning next to FIG. 9, the data processing which occurs on the vehicle can be better appreciated. When the vehicle is started, the hardware starts up as shown at 900. The Data Bus handlers are registered with the system at 905, using either a default configuration or, if a configuration has been received from the NOC and is active, using that active configuration. At 910 a platoon authorization "listener" is started, whose function is to listen for platoon authorization messages from the NOC.

Next, at step 915 the latest vehicle event data is processed, after which a check is made at 920 to see whether a platoon authorization notice has been received from the NOC. If so, at 925 the authorization record is posted to the controller by a software interface such as an API. If no platoon authorization has been received, a check is made at step 930 to determine whether a configuration change has been received from the NOC. If so, the new configuration is implemented and alters what data is collected from the vehicle and reported to the NOC in a "breadcrumb" message, and a restart signal is sent to cause a loop back to step 905 where the data bus handlers are re-registered in accordance with the new configuration.

If no new configuration has been received, the process advances to step 940, where a check is made to see if sufficient time has elapsed that position and status information are due to be sent to the NOC. If not, the process loops back to step 915. If so, the position and status information, or "breadcrumb" message, is sent to the NOC. The frequency at which such breadcrumb messages are sent to the NOC is, in at least some embodiments, defined by the configuration parameters received from the NOC, which parameters also define the event data that is to be sent to the NOC as part of the message. In at least some embodiments, the "breadcrumb" message is reported to the NOC regularly, for example once per second. In addition, when appropriate, an "I am available for platooning" message is also sent regularly to the NOC.

Figure 10:
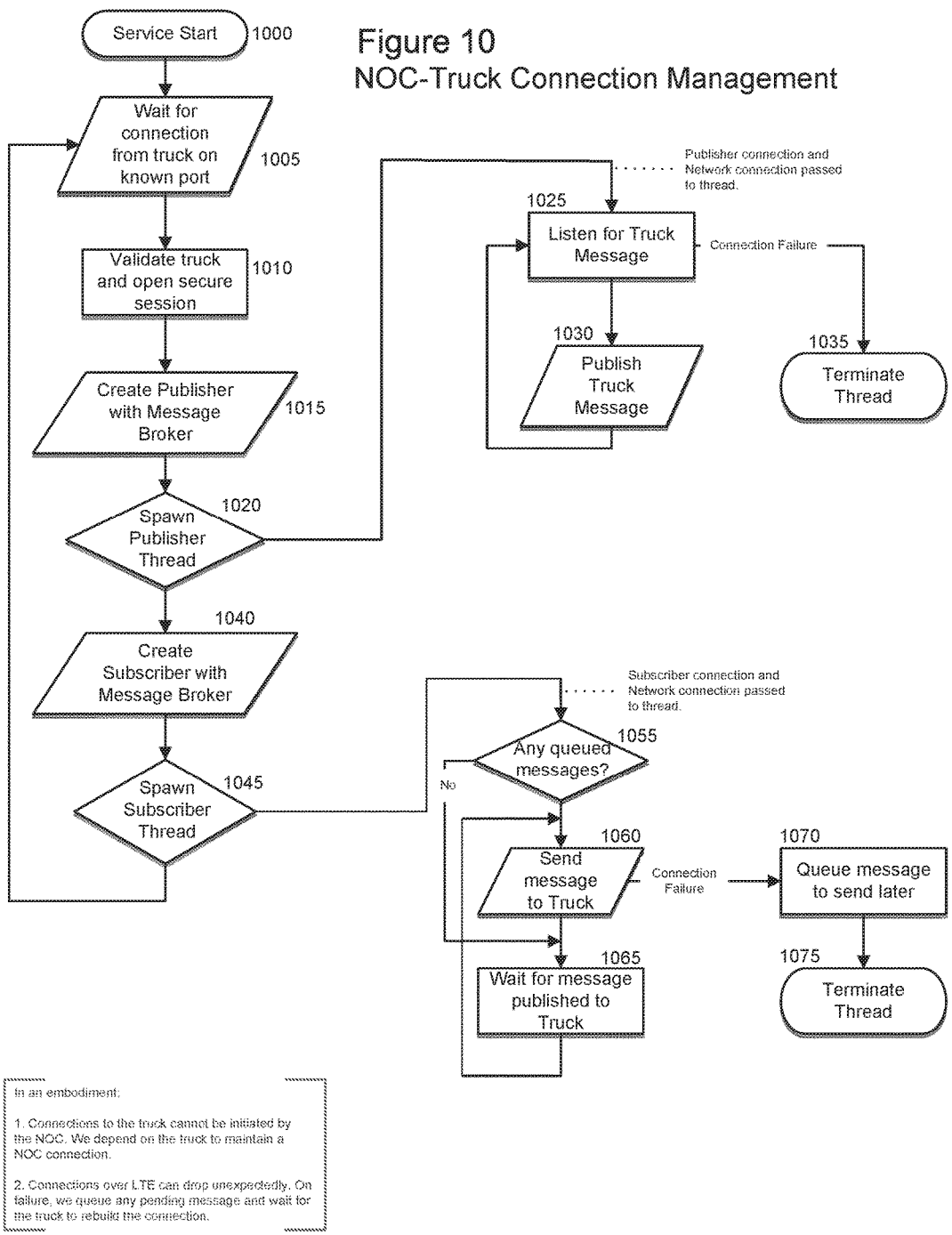
FIG. 10 illustrates in flow diagram form an embodiment of NOC-vehicle communications management.

FIG. 10 illustrates an embodiment of the process by which connections between the NOC and the vehicle are managed. Service at the NOC starts as shown at step 1000, and the NOC waits for a connection from a vehicle on a known port, shown at 1005. The NOC then validates the truck and opens a secure session, shown at 1010, followed by creating a publisher message with a message broker functionality as shown at step 1015. A publisher thread is then spawned at 1020, at which point the publisher connection and the network connection are passed to the thread. The thread listens for a message from the vehicle, for example a 'breadcrumb' message or an "I'm available for platooning" message, shown at step 1025. Once a message is received from the vehicle, shown at step 1030, the process loops and the NOC returns to listening mode at step 1025. If no message occurs within a given time window, the thread terminates as shown at step 1035.

Following the spawning of the publisher thread, and essentially in parallel with the execution of that thread, the process creates a subscriber message with a message broker as shown at 1040. A subscriber thread is then spawned at step 1045, and the subscriber connection and network connection are passed to the subscriber thread as shown at 1050. A check is made for queued messages at 1055, and any queued messages are sent to the vehicle at 1060. If there are no queued messages, or if the queued messages have been sent, the process advances to step 1065 and waits for the message to be published to the vehicle. The process then loops back to step 1060. In the event that the message could not be sent to the truck at step 1060, typically as the result of a connection failure, the messages are queued at step 1070 and the thread terminates at step 1075.

Referring next to FIGS. 11A and 11B, one can better appreciate the process of coordination and linking to form a platoon. FIG. 11A shows one embodiment of the coordination and linking functionality, indicated generally at 1100. After the process starts at step 1101, a set of platoon-capable pairings is received. The set of pairings is, in at least some embodiments, received from the NOC and comprises a list of potential platoon partners. Depending on the availability of other vehicles, or on the fleet's priorities, the driver may be presented with only a single platooning choice that is either accepted or rejected. Alternatively, in some embodiments and for some vehicles the identification of platoon-capable partners can be generated locally. In either event, authentication keys are provided to enable secure communications between linking partners. Thereafter, at step 1110, either the driver or the system identifies a vehicle available for coordination as a platooning partner, and a platooning offer is communicated as shown at 1122, indicated in some embodiments by a self-acceptance message. In either approach, the other vehicle (the "far" vehicle) can then accept, step 1124, meaning that the pair has agreed to coordinate for possible linking as shown at 1130. Depending on vehicle positioning, weight of load, vehicle equipment, and other factors, a vehicle within linking range may be identified as a Following Vehicle Available for Linking 1142 or a Leading Vehicle Available for Linking 1144. If neither of these is the case, the system returns to coordination mode. Once a Following Vehicle Available for Coordination has Accepted the link, 1152, and the Self Vehicle also accepts the link, 1153, (in any order), the link is initiated. Upon completion of the link, the vehicles are now linked 1162. Similarly, once a Leading Vehicle Available for Coordination has Accepted the link, step 1154, the Self Vehicle then also accepts the link, step 1155, initiating the link. Upon completion of the link, the vehicles are now linked as shown at step 1164.

To properly determine not only which vehicles are appropriate for linking, but also which vehicle should be the lead vehicle and which the follow, certain vehicle characteristics are important. One aspect is shown in FIG. 11B, where the characteristics of engine torque and acceleration are collected internally to the vehicle at step 1165, and vehicle mass is calculated at step 1170. That information, which can be processed locally or at the NOC, is then used to adjust the gap between the vehicles, or to modify the algorithm, as shown at step 1175. In addition, the data can be used to choose whether to link or not, step 1180, although other factors can also be considered in at least some embodiments. Other factors can include, for example, the proposed distance of the platoon, time duration, time of day, hours of service and related restrictions, fuel level and driving range, refueling possibilities, service level agreement issues, the need for the vehicle to be at a destination at a given time for further use or maintenance, driver meals and relief breaks, driver satisfaction, driver pay, traffic rules and regulations, etc. If a link is to be made, one or more of the factors can assist in informing the decision on which vehicle should lead, step 1185.

Before a platoon can be formed, and even before potential platooning partners can be identified, the route for a vehicle available for platooning must be known at least in part. This can be accomplished by generating a vehicle travel forecast, as shown in FIG. 12. The process there starts by receiving position information for a vehicle, designated Vehicle A, at step 1200. The position information can comprise longitude/latitude information, or a coordinate pair plus speed and heading, or a series or trail of coordinate pairs. A GPS device, as described in the foregoing figures, is suitable for providing such information.

The process of FIG. 12 continues by checking at step 1205 to determine whether Vehicle A's route is known. In many instances, vehicles such as large commercial trucks travel routes that are repeated frequently, or are set by a fleet manager or other supervisor. As a result, in many instances a particular vehicle's route is known and stored in a database, typically maintained at a NOC and, in at least some instances, also available locally. If, however, Vehicle A's route is not known, a search is made at step 1210 for nearby routes that would be acceptable for platooning in a manner discussed in U.S. Patent Application Ser. 62/249,898, filed Nov. 2, 2015 and incorporated herein by reference.

After the search at step 1210, a check is made at step 1215 to determine if at least one platoonable route, suitable for use by Vehicle A, is found. If not, the process stops for the time being, as shown at step 1220. However, in most instances at least one platoonable route will be identified. In such cases, a determination is then made as to where and when it is feasible for Vehicle A to join the platoonable route, as shown at step 1225. Then, at step 1230, Vehicle A's route start location and time is used together with Vehicle A's expected speeds, to calculate, in the NOC or in the Vehicle Monitoring and Control System 700, minimum and maximum times for Vehicle A's arrival at specific waypoints on the identified route. Based on those calculations, a travel forecast for Vehicle A is then generated in either a local or remote process, as shown at step 1235. In addition to the factors discussed above for developing a travel forecast, one or more of the factors discussed in connection with FIG. 11B, above, are also considered in formulating the travel forecast for some embodiments. The travel forecast, which is stored at the NOC in at least some embodiments, can then be used to search for potential platooning partners, as discussed in connection with FIG. 13.

If Vehicle A's route is known, the route information is fetched from the database of known routes. Vehicle A's position is then compared to the known route, as shown at step 1245. If Vehicle A is off route, a determination is made at step 1250 as to where and when it is feasible for Vehicle A to rejoin the expected route. If rejoining is determined feasible, as shown at step 1255, the process loops back to step 1230 to provide Vehicle A with appropriate guidance for rejoining the route, followed by generation of a travel forecast. If it is not feasible for Vehicle A to rejoin the route, the process terminates, for the time being, at step 1260. A termination at either step 1220 or step 1260 is temporary, since platooning possibilities change as Vehicle A's position on its route changes and, in at least some embodiments, vehicles report their changed position via breadcrumb messages.

Once a travel forecast has been generated for Vehicle A, it is possible to search for potential platooning partners. One embodiment for such a search and linking process is shown in FIG. 13, which can be seen to elaborate in some respects on the process shown in FIG. 11A. The process of FIG. 13 begins with the receipt of a platoon request from Vehicle A The request, shown at step 1300, is received at a processor, located in the NOC in at least some embodiments but potentially located elsewhere such as on board one or more vehicle in other embodiments. A travel forecast such as results from the process of FIG. 12 is then either generated or retrieved, as shown at step 1305. At step 1310, a search of the travel forecasts stored in a database at the NOC, shown at 1315, is made to identify other stored forecasts with similar routing. Based on those similar routings, a list of potential platoon partners is generated in the processor.

Occasionally, no potential platoon partners will be identified by the search, in which case a check made at step 1320 results in a "no." In such an event, Vehicle A's travel forecast is added to the database 1315 if not already stored, and the driver is informed that no platooning possibilities currently exist. In most cases, however, one or more potential platooning partners will be identified, such that a "yes" results from the check at step 1320. If so, a list of potential partners is sent to Vehicle A, as shown at step 1330. Depending upon the embodiment, a platoon offer can also be sent concurrently to the identified potential partners, $B_1, \ldots, B_n$, as shown at step 1335. In some cases, and as shown at step 1340, the driver selects from the list provided in step 1330, and a platooning offer is sent only to those partners selected by the driver of Vehicle A. In some embodiments, the fleet operator determines the potential pairings and the driver receives only one choice, which can either be accepted or rejected. At step 1345, Vehicle A's selection is retrieved, typically indicated by a manual or audible command from the driver. The responses from the potential partners, for example Vehicle $B_1$, are shown at step 1350. A check for acceptance of the platooning offer is made at step 1355. Should there be no acceptances, Vehicle A's travel forecast is added, if not already stored, to the current travel forecasts database as shown at step 1325.

In most cases, Vehicles A and $B_1$ agree, in which case the process advances to step 1360. As shown at step 1360, in most cases platoon approval is sent by the NOC, as discussed above in connection with FIG. 8A-8B, together with advice for the respective rendezvous actions to be taken by Vehicles A and $B_1$. In addition, as shown at step 1365, the travel forecasts for Vehicles A and $B_1$ are removed from the database of current travel forecasts, since neither is currently available for platooning. In some embodiments, platoons of more than two vehicles are permitted, in which case the travel forecasts of Vehicles A and $B_1$ are maintained in the database of current travel forecasts.

Following approval of the platoon, the positions of vehicles A and $B_1$ is monitored by the NOC, including during formation of the platoon and thereafter. In addition, the NOC monitors road and other conditions such as traffic, weather, construction, and so on, to identify conditions relevant to the platoon of Vehicles A and $B_1$ provides alerts to both drivers as well as providing relevant data or commands to the onboard systems for each vehicle. Such monitoring continues at least until the platoonable routing is completed, step 1380, or one of the drivers disengages, step 1385, after which the process stops at 1390.

The process of operating vehicles as a platoon, i.e., semi-automatically (or, in some embodiments, automatically/autonomously) within a relatively close distance to one another, comprises several phases, as discussed generally above. While the present invention is described, for clarity, as involving platoons of two vehicles, it will be understood by those skilled in the art that the present invention is not limited to platoons of two vehicles, but instead can be any number of vehicles operating cooperatively in accordance with the processes and systems described herein. More specifically, the initiation of the platoon involves pull-in, or bringing the vehicles, operating at speed, into close proximity to one another until they are separated by a target gap distance. Once pull-in is completed, their joint movement as a platoon is maintained during normal operation, which can involve either maintaining the same gap distance or adjusting the gap distance for specific operating conditions. In addition, normal operation is also subject to various alerts, some of which may cause the platoon to be dissolved. Dissolution of the platoon involves increasing the gap distance sufficiently to permit independent operation of the vehicles, including ending semi-automatic operation and, in at least some instances, having the driver take over operation of the vehicle. In other embodiments, fully automatic operation is permitted and no driver take-over is required.

While various processes used by the platooning system of the present invention have been discussed in detail previously herein, including both hardware and software perspectives, FIG. 14 shows, in a generalized flow diagram, an embodiment of the interaction of the various processes involved in during pull-in, normal operation, and dissolution of a platoon. In particular, a user interface 1400 receives driver inputs and provides driver outputs. Input processes can include partner selection and start/stop commands for either initiating or dissolving a platoon. Output processes include displaying video or other data, in addition to alerts or warnings either in the form of lights or sounds. In addition, as shown in block 1405, various processes involve vehicle-to-vehicle [V2V] communication, primarily getting data from the front vehicle to the back vehicle (or vehicles), and sending data from the vehicles following the lead vehicle to the front or other vehicles in the platoon. As discussed in greater detail, above, the data can comprise, for example, engine and brake status, sensor data, such as speed, radar, or GPS, user input from the front driver, and video/voice communications. Data sent from the following vehicles to the other vehicles in the platoon can comprise all of the foregoing, including specifically whether the speed controller is on or off, plus video/voice data from the follow vehicle(s).

The main process is shown in block 1410, which receives inputs from the user interface processes 1400 and the V2V processes 1405. The main process 1410 also receives, through V2V block 1405, data from a sensor processes block 1415 and a front truck tracker process block 1420. In addition, the main process block also receives commands from speed and gap controller process 1425, which also receives data from the front truck tracker process 1420. The speed controller process 1425 is part of the platooning controller 855 shown in FIG. 8B in at least some embodiments, and can act to achieve a desired gap between vehicles, a desired relative speed between the vehicles, or a combination of the two at different times during a maneuver. It outputs torque and braking commands, and other actuator commands as needed to achieve the desired gap or relative speed as well as, in some embodiments, transmission gear selection. The processes managed by the sensor process block 1415 comprise detecting all vehicles in front of the back vehicle, which can include the front vehicle or other vehicles in the platoon, as well as vehicles not part of the platoon, such as vehicles that cut in between the platooning vehicles. In addition, the sensor processes can include determining location, such as by means of a GPS process.

The front truck tracker processes 1420 comprise identifying the back end of the front vehicle, for example the back of the trailer of the front truck where the vehicles are combination tractor-trailers. As discussed previously, such identification comprises, in at least some embodiments, fusing data from the sensors of both trucks, determining gap size and relative lateral position of the platooning vehicles, and detecting other vehicles between the platooning vehicles or otherwise proximate enough to be of concern. Not all of these functions are needed in every embodiment, as, for example, lateral position detection may not be necessary, nor may detection of proximate vehicles. The speed and gap controller processes 1425 comprise determining engine and brake commands based on instructions received from main processes 1410 together with data from the front truck tracker process 1420. Those instructions include, for example, closing the gap distance between the vehicles ("gap"), maintaining the gap, and increasing the gap. In addition, the speed controller processes can include sending engine torque and engine retarder commands to the engine control ECU of the vehicle, as well as sending brake commands to the brake ECU of the vehicle. In an embodiment, each of those commands goes through the main process. The main process 1410 includes control system processes including monitoring system components, processing user inputs, and turning the associated speed controller on or off. Further, if the speed controller is on, the main process block can request that the speed controller processes generate various commands, including closing the gap, maintaining the gap, or increasing the gap, which can comprise dissolving or ending the platoon.

Referring next to FIG. 15, an implementation of the processes shown generally in FIG. 14 can be appreciated in greater detail. The system starts at step 1500, and at step 1505 advances through selection of a platooning partner in the manner discussed previously. The vehicles then prepare to platoon, shown at 1510, beginning with a check to ensure that all platooning conditions are met, shown at 1515. If not all conditions are met, the process loops back to step 1510. However, if they are met, the process advances to step 1520 and approval to begin to platoon. If the drivers are ready to platoon as indicated by the one or more of the drivers taking an action such as pressing a button, checked at 1525, the process begins the pull-in process, shown at step 1530. If the drivers are not ready, the process loops to step 1515. In some embodiments, for example for autonomous vehicles, no driver exists and the process can proceed automatically.

As shown at step 1530, the pull in process involves closing the gap between the platooning vehicles, until they reach the target gap for normal platooning operation. Pull-in is discussed in greater detail hereinafter. In an embodiment, the target gap is typically about 30 feet for long haul trucks, but can range from less than 20 feet to more than 50 feet for such large vehicles, and can vary significantly from that range for other types platooning vehicles. Calculation of safe gap distance preferably takes into account vehicle speed and braking capability, and can also take into account weather, road conditions, and other factors external to the vehicle. Once pull-in begins, a check is made at step 1535 to determine whether the vehicles have closed to the target platooning gap. If yes, the platoon is maintained at that distance as shown at step 1540. If not, a check is made at step 1550 to determine whether there is a request to dissolve the platoon, for example for one or more of the reasons described in connection with FIGS. 18A-C. If no request to dissolve the platoon has occurred, the process loops to step 1530 and the pull-in process continues. The tests performed at step 1535 occur frequently, as part of the realtime control loop of the system, typically significantly faster than once per second, for example, ten times per second or more frequently, and so the loop of steps 1530-1530-1550 will typically occur many times before the vehicles move close enough that they are at target gap distance. It will be appreciated by those skilled in the art that, for some embodiments, operation of the active cruise control (ACC) and collision mitigation systems (CMS) of some vehicles will be modified in accordance with the present invention to permit the platooning vehicles to close to the desired gap distance.

Requests to dissolve the platoon can also be identified through a check at step 1545, also performed regularly, again typically significantly faster than once per second as noted above. If a request to dissolve is received from either step 1545 or step 1550, those requests are mux'ed at step 1555 and a dissolve platoon process is initiated at step 1560. The dissolve platoon process essentially involves gradually increasing the gap by decreasing the speed of the rear vehicle relative to the front vehicle. Once a suitable distance is achieved, where the braking and other safety benefits of the present system are no longer needed, driver take-over is enabled as checked at step 1565. If the gap is not yet sufficient for driver take-over, the check at step 1565 yields a no and the dissolve process loops to step 1560. If step 1565 yields a yes, the dissolve process continues at step 1570 by signaling to the driver that he is to take over operation of the vehicle. Of course, in the event of an emergency, the driver can terminate the platoon immediately either by pressing on the brake or simply turning off the platoon authorization, either of which generates a dissolve request as checked at steps 1545 and 1550.

Following driver take over as shown at step 1570, a check is made at 1575 to determine whether the dissolve process is complete. A yes can occur in different scenarios. In some instances, a platoon is dissolved because road conditions, traffic, a cut-in by another vehicle, or other events, makes platooning inappropriate for a short period of time, but the routing and partner selection still are acceptable for platooning once the unacceptable condition is resolved. The dissolve process can also end following take-over by the drivers, for example because of an emergency. Thus, if the check at 1575 yields a yes, the process can loop through mux 1585 back to step 1510 to see if further platooning is acceptable. If step 1575 yields a "no", the process advances to step 1580 to determine whether the driver has successfully taken over. A "no" loops to step 1570 while a yes is muxed at 1585 with a yes from step 1575, and loops back to step 1510. It will be appreciated that operation of the ACC and CMS of the vehicle may operate normally when the platoon is dissolved.

Figure 16A:
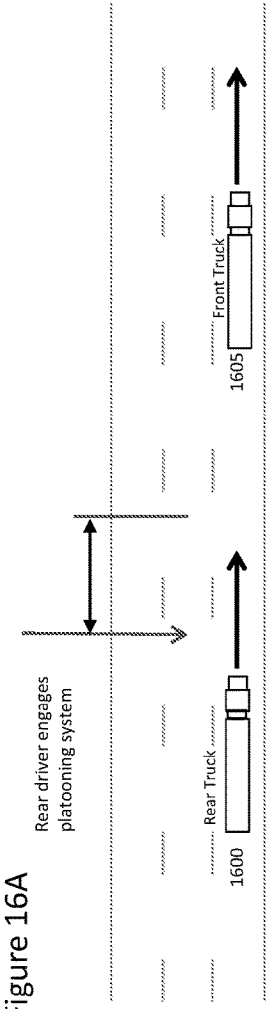
FIGS. 16A-C illustrate engagement of a pair of vehicles during the pull-in stage of forming the platoon.
Figure 16B:
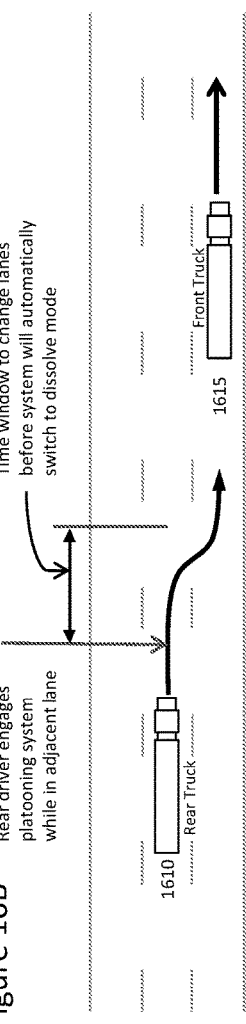
Figure 16C:
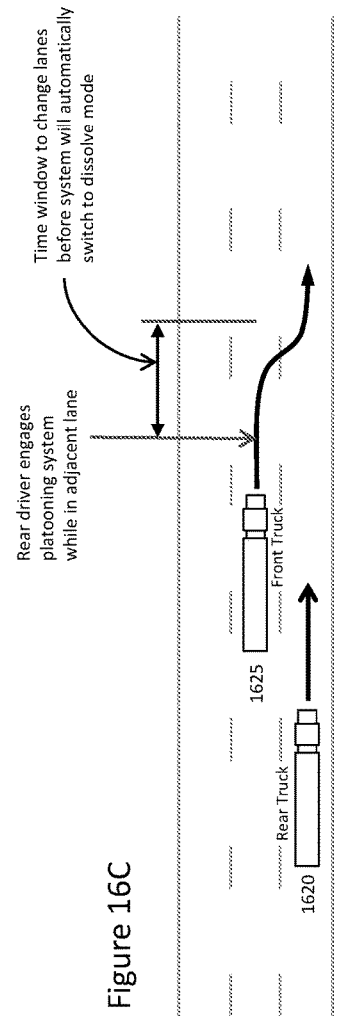

Referring next to FIGS. 16A-C, various scenarios for pull-in are shown. More specifically, in FIG. 16A, rear vehicle 1600 is in the same lane as front vehicle 1605. Once the rear driver engages the platooning system, and assuming platooning is otherwise approved as shown in FIG. 15, pull-in begins by advancing the rear vehicle toward the front vehicle until the desired gap distance is achieved. A methodology for managing that pull-in process is discussed in connection with FIGS. 17A-17B. This pull-in process in the same lane can be challenging, because it involves the rear truck having a higher velocity than the front truck, and thus having a longer stopping distance. This puts constraints on the operation to ensure safety, as discussed below. Alternatively, the rear truck may be in a lane adjacent the lane of the lead vehicle, but behind the lead vehicle, as shown by vehicles 1610 and 1615 in FIG. 16B. Finally, the lead vehicle may be in a lane adjacent to the rear vehicle, but the front vehicle will need to overtake the rear vehicle, as shown by vehicles 1620 and 1625 in FIG. 16C. In accordance with an embodiment of an aspect of the system, a limited time window is imposed by the system for completing the lane changes required in the scenarios of FIGS. 16B and 16C. The time window starts when the driver engages the platooning system, and is set by the system. In an embodiment, the time window is, for example, set to allow overtaking of non-platooning vehicles, but to be short enough that drivers do not platoon in adjacent lanes for an extended period of time.

In the scenario of FIGS. 16B and 16C, the vehicle needing to change lanes can move to the desired gap distance relative to the other, and change lanes while maintaining speed, all without requiring any complimentary speed adjustment from the other vehicle. However, for safest operation, that will not be true for the scenario of FIG. 16A, where both vehicles are in the same lane and pull-in involves bringing the rear vehicle to the target gap from the front vehicle. In such a scenario, which also may apply to the scenarios of FIGS. 16B and 16C if the lane change is not made at the correct distance from the other vehicle, a range of safe operation exists, and it can be preferable to slow the lead vehicle slightly to improve the safety margin. This can be better appreciated with reference to FIGS. 17A-B. In FIG. 17A, closing speed, or the relative velocity between the rear vehicle and the front vehicle, is plotted on the vertical axis, while gap, or distance, between the front of the rear vehicle and the rear of the front vehicle is plotted on the horizontal axis. The target gap, non-zero in this embodiment is as indicated. A larger gap permits greater relative speed, such that the triangular area indicated by cross-hatching represents the region of safe operation. From this, it can be seen that, if the rear truck speeds up relative to the front truck, in order to close the gap, the increased distance between the vehicles necessary for safe operation extends the time needed for the vehicles to reach the target gap distance.

Figure 17B:
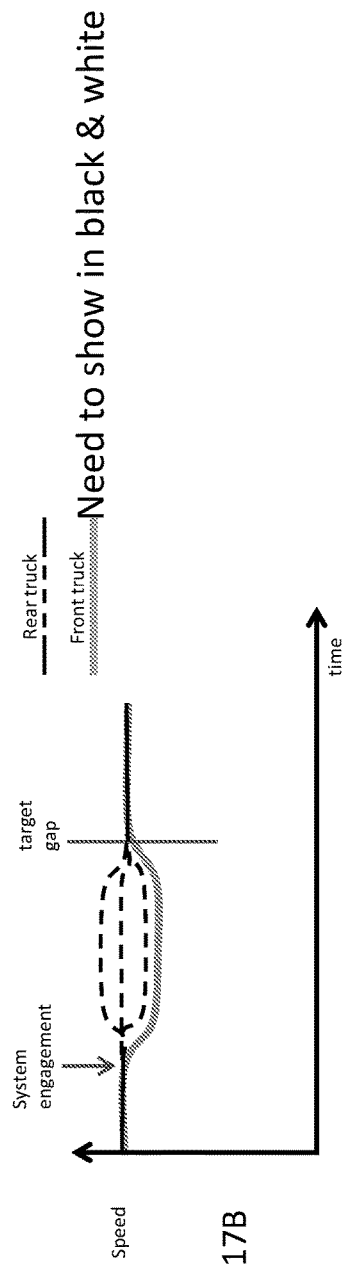
FIG. 17B plots speed versus time for a pair of vehicles during pull-in, or system engagement, until the target gap between vehicles is achieved.
Figure 17A:
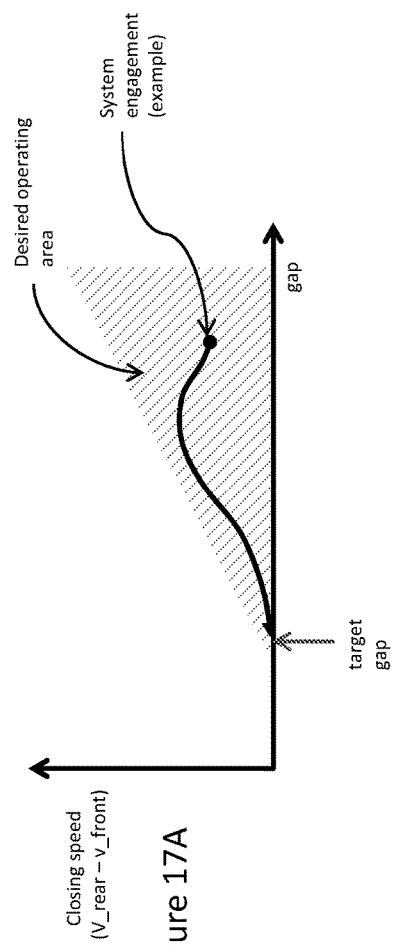
FIG. 17A plots closing speed of the rear vehicle relative to the front vehicle versus gap distance to confirm that the nascent platoon is operating within a safe region.

With reference to FIG. 17B, it can be seen that, by slowing the lead truck slightly, a smaller gap is acceptable during pull-in. Once gap distance is achieved, both vehicles can accelerate under the control of the platooning system, so that both return to the desired platooning speed. As shown by the dashed line in FIG. 17B, the rear vehicle may be commanded to maintain speed, or commanded to speed up, or commanded to slow down somewhat less that the amount by which the speed of the lead vehicle is reduced. In each of these scenarios the slowing of the lead vehicle will still allow the platooning vehicles to reach the desired gap distance more quickly and safely than if the lead vehicle maintained speed.

Figure 18A:
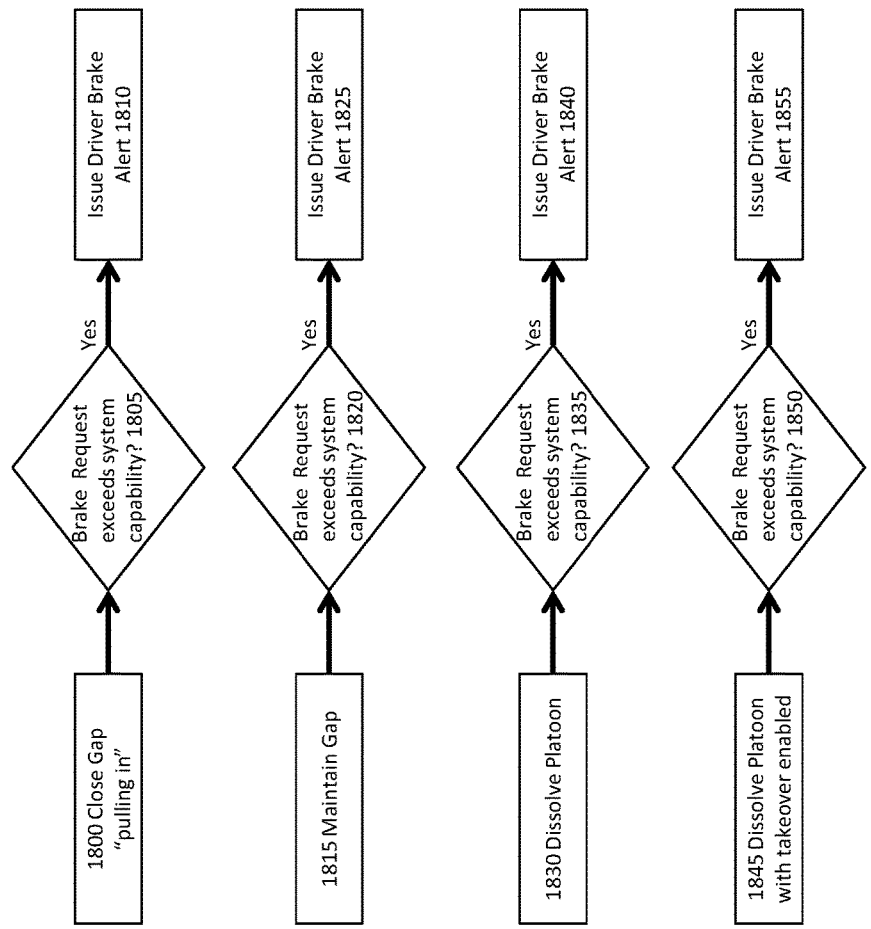

Referring next to FIGS. 18A-18C, various alternatives for managing driver alerts in response to potential braking issues will be described. Many vehicles, including larger trucks have braking controllers that control the brakes. In addition to being responsive to driver braking inputs (e.g. pressing the brake pedal), some such controllers can receive braking commands from electronic systems (e.g. the platoon controller, an ACC or CMS system, autonomous vehicle controllers, etc.) Currently most such braking controllers limit the amount of braking that can be commanded by an electronic system. This limitation is often based on safety concerns and the belief that a driver may be better able to judge the appropriate response to potential braking emergencies than the electronic controllers. As such, it is common for the driver to be able to command more braking by stomping on the brake pedal than will be implemented in response to commands from various automated control systems.

When the platoon controller utilizes a braking controller that is subject to such limitations it may be desirable to generate braking alerts to the driver that warn the driver of situations in which manual braking or manually assisted braking may be desirable. In general, a braking alert can be activated any time that the platoon controller determines (or conditions otherwise indicate) that more braking may be required or desired than can or will be implemented in response to a command from the platoon controller and/or braking controller.

The braking alert may be conveyed to the driver in a variety of different manners including audio alerts, tactile signals (e.g., vibrations on a steering wheel, etc.), screen displays etc. However, braking alerts are preferably only generated when immediate driver action is believed to be needed. Therefore, it is preferred that the message be conveyed in a manner likely to be immediately perceived, understood and acted on by the driver. Many advanced vehicle control systems generate alerts for a variety of conditions in the form of auditory sounds and dashboard displays. Although such alerts work well in many circumstances, it has been found that for emergency braking alerts of the type contemplated herein—spoken (verbal) alerts conveyed with a sense of urgency tend to be perceived better and responded to more quickly than other types of alerts—as for example actuation of a buzzer, horn or other alarm type sound. Thus, in some preferred embodiments, a verbal (voice based) warning such as "BRAKE NOW" is emitted—preferably loudly in a voice that conveys a sense of urgency. If appropriate, the verbal warning may be repeated multiple times. In some embodiments, visual alert signals and/or other alerts may be displayed or activated in parallel with the verbal warning. In various embodiments, the verbal warning may be a prerecorded warning message or a computer generated message or it may be created in any other appropriate manner.

Braking alerts can be seen to correlate with the different operating conditions associated with platooning. FIG. 18A shows separate process flows for managing braking alerts occurring while closing the gap, maintaining the gap, dissolving the platoon, and dissolving the platoon with driver take-over, as shown by steps 1800 through 1855. Each of the braking alerts occurs where conditions require a brake request that exceeds the capability of the braking system. In some embodiments, predictive assessments of operating conditions and system capability are made, such that, if the predicted or anticipated operating conditions will exceed braking or other system capabilities, adjustments can be made automatically or the driver can be alerted. FIG. 18B consolidates the process flow to have only a single check of the braking threshold, shown at 1860, and only a single step for issuing a driver brake alert, shown at step 1865. In FIG. 18C, a still further variation is shown, where an instruction to dissolve the platoon, with driver take-over, generates an alert 1870 immediately, without needing to compare the request to the system's capability.

Figure 19:
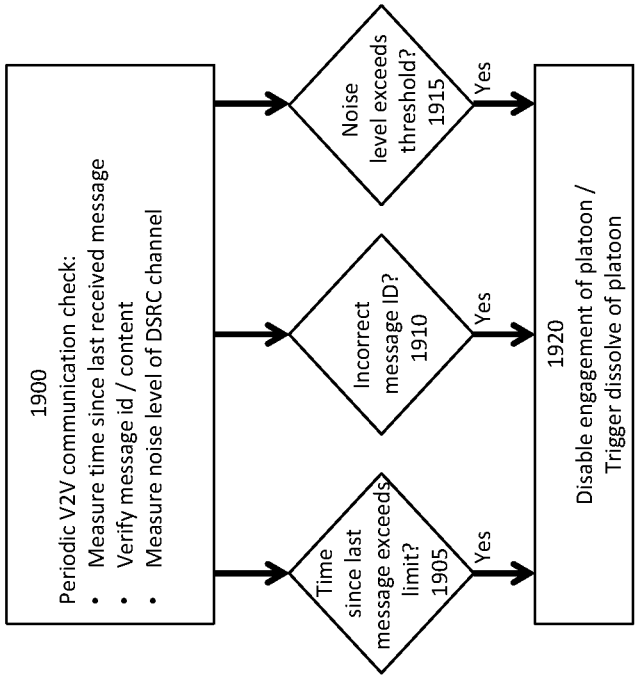
FIG. 19 illustrates in flow diagram form a process for confirming proper operation of a vehicle-to-vehicle communications link.

Referring next to FIG. 19, another safety check involves verifying substantially continuous, reliable V2V communication. The V2V communication, typically a DSRC link as previously described but other protocols of similar quality and reliability are also acceptable, is continuously monitored by the system. Redundant V2V links are preferably provided, including links using different protocols or modalities such as, for example, LTE, WiFi, or a modulated light transmitter/receiver pair. Techniques for measuring distance from the front of the back vehicle to the back of the front vehicle that do not rely on DSRC can include radar, camera, lidar and ultrasound. Brake actuation by the front truck can be detected, independently of DSRC, by a camera mounted to the front of the following vehicle. In an embodiment, if a problem with V2V communication is detected, platooning is disabled until the communications problem is resolved. Thus, either a platoon cannot be engaged, or, if already engaged, the platoon will be dissolved. It will be appreciated by those skilled in the art that, in some embodiments, multiple communications links will be implemented, in which case the failure of one or more, but with enough still operational that accuracy is assured, will not result in disabling the platooning function. The verification process, shown in FIG. 19 at steps 1900-1920, involves one or more, and in some cases all, of: (a) measuring the time since the last received message and comparing to the expected time between messages; (b) verifying message ID and content; (c) determining whether the noise level of the communications channel exceeds a predetermined threshold. For the embodiment shown in FIG. 19, a failure of any of the three stops further platooning, as shown at step 1920.

FIG. 20, steps 2000-2025, illustrates an alternative processing for selecting the speed of the platoon. In most embodiments, the lead vehicle sets the speed of the platoon. However, in some instances, for example uphill grades, allowing the rear vehicle to set the speed of the platoon can be beneficial. Thus, FIG. 20 illustrates two options by which the rear vehicle can set the speed of the front vehicle, and thus the speed of the platoon. In the first option, the Main Process block and speed controller block determine the target speed for the front vehicle, and communicates that target speed to the front vehicle via the V2V communications link. The front truck thereafter adjusts its speed accordingly. In the second option, the rear vehicle only sends data to the front vehicle, which then determines its target speed and implements accordingly. Data used to determine optimal platooning speed include: Engine performance and gearing data of both tractors, loading of both trucks, grade information of current and upcoming road segments, and gap. It will also be appreciated that, in some embodiments, the system may not control the speed of the front vehicle. In such embodiments, the desired speed can be communicated to the driver of the front vehicle, and adjusted accordingly.

Figure 21A:
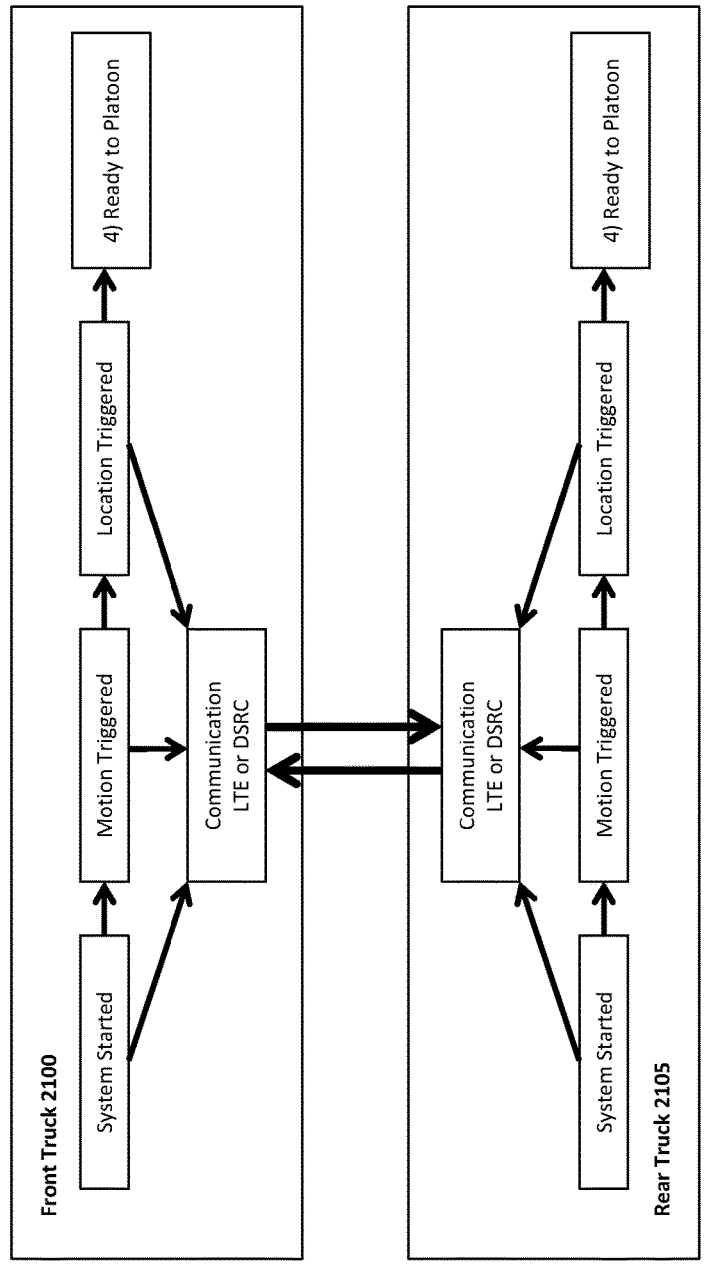
FIG. 21A illustrate a process for coordination of departing vehicles.
Figure 21B:
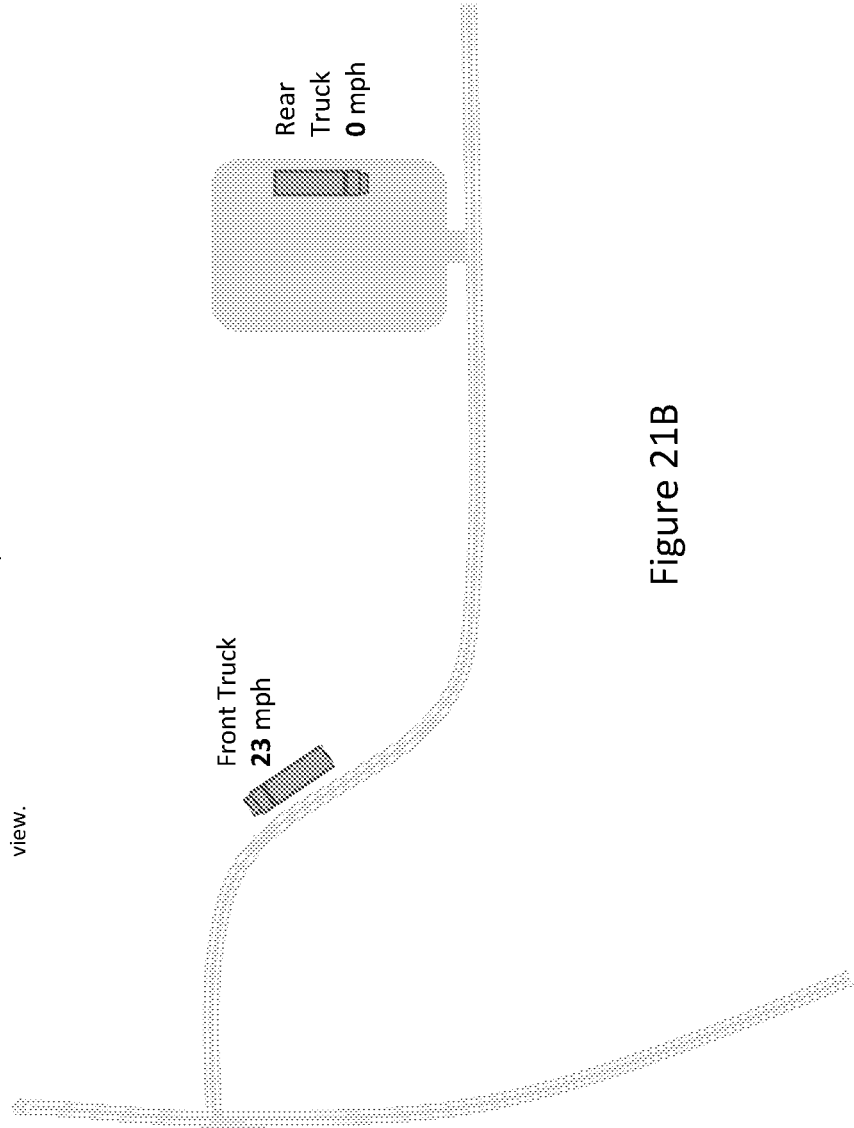
FIG. 21B illustrates in map form the relative physical locations of the departing vehicles being coordinated by the process of FIG. 21A.

Referring next to FIGS. 21A-21B, an additional aspect of the present invention can be better understood. In particular, it is sometimes desirable for vehicles to be organized into platoons from when one or both vehicles is stationary, such as at their point of origin, a rest stop, or other similar circumstances. For example, some long haul trucks are organized into platoons at their fleet location, while in other cases both or multiple vehicles will proceed concurrently such as after a meal or other break. In such instances, it is desirable to coordinate vehicle departures. FIG. 21B shows the relative locations of two trucks leaving a yard. The first truck is already moving, albeit fairly slowly, while the second truck is not yet moving. In such an instance, platooning is facilitated by prompt sharing of information until both vehicles have reached the ready-to-platoon state. That typically requires that the platooning system on both vehicles is initialized and operational, that both vehicles are either moving or ready to move, and that the vehicles are at acceptable relative locations. Such coordination can be achieved by the process shown in FIG. 21A, steps 2000-2025, where the upper block illustrates the process steps taken by the first vehicle, and the lower block illustrates the process steps taken by the second vehicle. Communication between the vehicles then occurs via DSRC, LTE, WiFi, or other suitable protocol such as a modulated light source/receiver pair.

Figure 22:
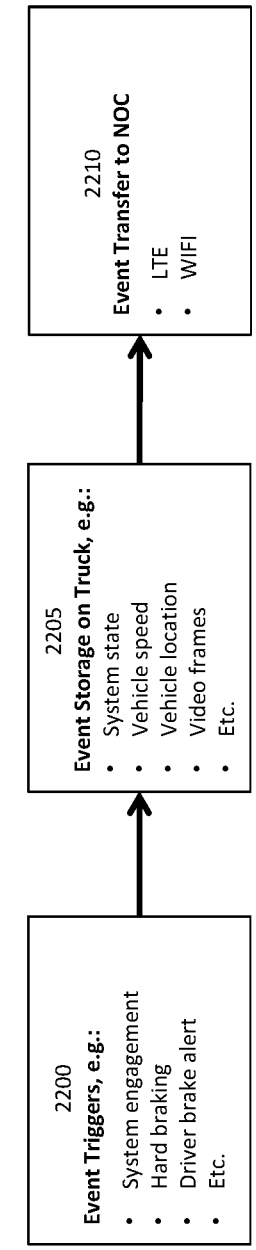
FIG. 22 illustrates a general process flow for event data logging and data transfer.

Referring next to FIG. 22, an embodiment of a data logging process in accordance with an aspect of the invention can be better appreciated. Event triggers, shown in block 2200, are stored on the vehicle at 2205 and then, at a convenient time, transferred to the NOC via a suitable protocol as shown at 2210. The event triggers include system engagement, hard braking, driver brake alerts, and so on as discussed previously in connection with the sensors shown in FIGS. 7A-8B.

Figure 23:
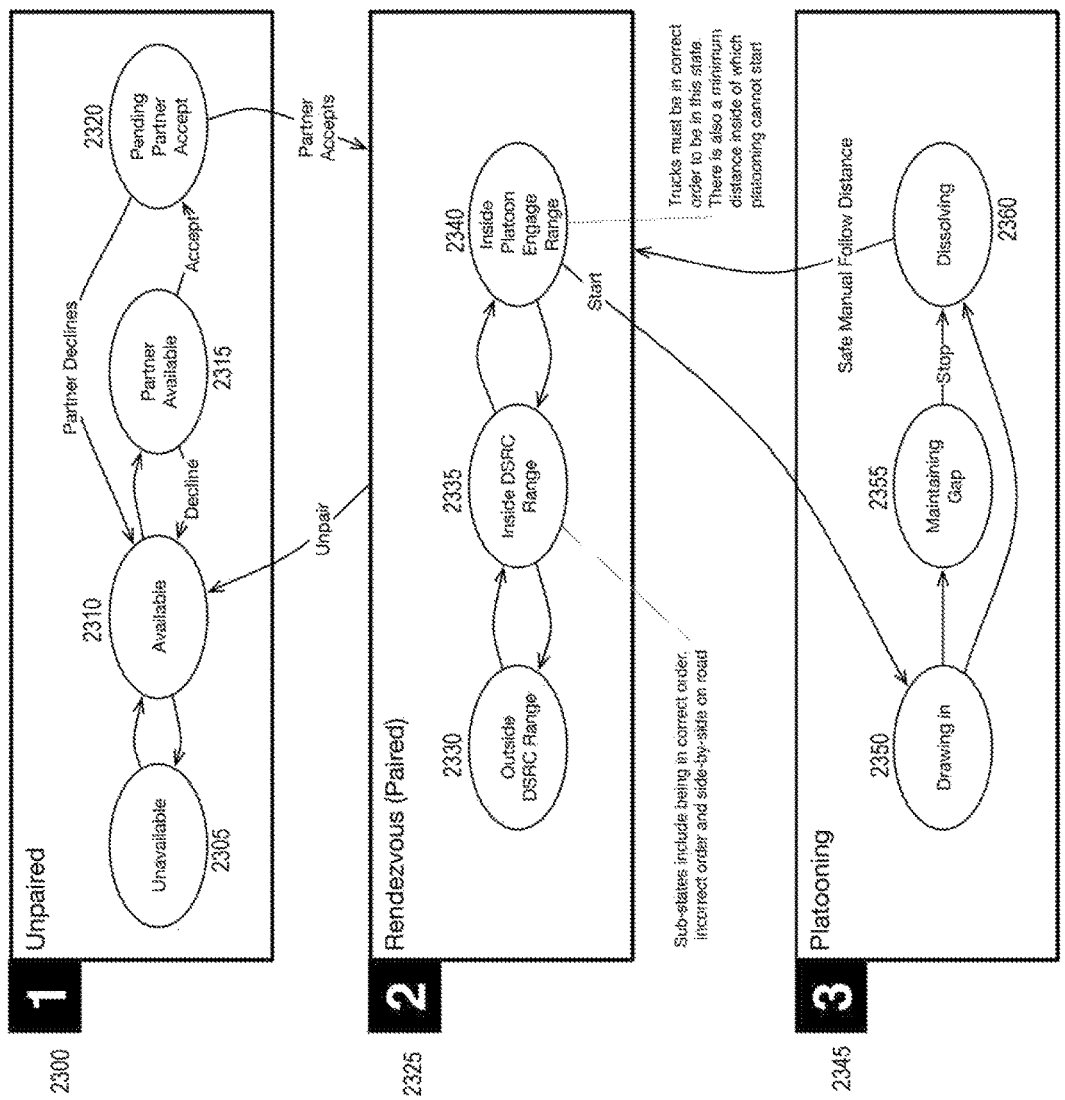
FIG. 23 illustrates in state machine form an embodiment of the transitions of vehicles from unpaired to platooning, as perceived by a driver.

The foregoing description provides an understanding of the operation of the system in terms of the hardware and software that combines to manage the sense and control of the vehicle. An additional important aspect is the user interface and the associated user experience. While the user interface is explained generally in the foregoing teachings, an exemplary embodiment of the UI and UX can be better appreciated from the following description although those skilled in the art will recognize that the teachings provided here are not intended to be limiting. Referring first to FIG. 23, a state diagram shows three stages of operation of a vehicle in accordance with an aspect of the invention, consistent with system description hereinabove. More specifically, the first stage 2300 shows a vehicle initially in an "unavailable for platooning" state 2305, from which it can move to "available for pairing" state 2310. As discussed above, if a platooning partner vehicle is available, as shown at 2315, either of the vehicles can decline and the state returns to "available". But, upon mutual acceptance, the state changes as shown at 2320. In some instances, for example in the case of autonomous vehicles, formation of a platoon may involve more than two vehicles, while in other instances a platoon may comprise only two vehicles, either initially or perhaps throughout the existence of the platoon. In either case, once at least two vehicles accept, formation of a platoon begins as shown at Stage 2, 2325, even though the vehicles may still be some distance apart, as discussed in greater detail hereinafter. For purposes of clarity, platoons of only two vehicles will be used for exemplary purposes, although platoons of greater than two vehicles are also within the scope of this disclosure.

The states depicted in Stage 2 of FIG. 23 reflect the transitions that occur as the two vehicles move closer together. In at least some instances, the vehicles begin the process of their platooning rendezvous when they are too distant for DSRC communications, as shown at 2330. Once the vehicles move close enough to be within DSRC range, the state changes to 2335. Of course, if the vehicles then move farther apart, the state changes back to 2330. DSRC communications range still involves distances greater than used for platooning, and the vehicles continue to move closer to one another while in state 2335. While in state 2335, the vehicles maneuver to end up in the same lane, in the proper order. Once the vehicles are sufficiently close to one another that they can begin platooning, the state switches to 2340, "inside platoon range".

Stage 3, shown at 2345, starts at that point. Stage 3 represents the time period during which operation of the vehicles is at least partially automated, and comprises pull-in, or "drawing in", shown at 2350, maintaining the gap, shown at 2355, and dissolving the platoon, shown at 2360. The system operation of each of these states has been described in detail hereinabove, including particularly in connection with FIG. 15. It will be appreciated that, in some instances, a platoon will be dissolved while the vehicles are still in the pull-instate, and thus a transition directly from state 2350 to 2360 can occur. In addition, the end of the dissolve state transitions back to state 2340, in Stage 2, where the vehicles are within platoon range but are not under automated control. It will also be appreciated that a transition from any of the Stage 2 states can transition back to state 2310 in the event that either or both drivers decide to unpair.

The physical distances between the vehicles during each of the states can be represented as a series of zones are in FIGS. 24A-24C, together with activities in accordance with the present invention that are possible within each of those zones. It will be appreciated by those skilled in the art that the numerical distances for each of these zones can vary depending upon the vehicle's speeds, road conditions, environmental conditions, communications quality, network policies, fleet management policies, and other factors as discussed herein. For example, the correlation between speed and safe distances during pull-in is discussed in connection with FIGS. 17A-17B, above. FIGS. 25A-25C through 35A-35C then display the relevant zones, the visual display seen by the driver of the follow vehicle, and the physical inputs available to the user at each state. For simplicity and clarity, FIGS. 25A-35C reflect the perspective of the follow vehicle, but those skilled in the art will appreciate from the following discussion that the displays for the lead vehicle are analogous and readily ascertained.

Referring first to FIG. 24A, a lead vehicle 2400 and a follow vehicle 2405 proceeding in the same lane on roadway 2410. The right-pointing arrow in front of follow vehicle 2405 indicates that the follow vehicle is proceeding at a relatively higher speed than lead vehicle 2400, in order to close the distance between them, although in many instances both vehicles are moving at substantially highway speeds as discussed elsewhere in this specification. A zone 2415 designates the distance, measured from the back of the lead vehicle (for these examples, all zones are measure from the back of the lead vehicle), over which robust DSRC communications exists between the vehicles. It will be appreciated that, for this example, DSRC communications are assumed, but any suitably reliable communications protocol of adequate bandwidth can be substituted for, or used in addition to, DSRC. Zone 2420 shows the distance over which the vehicle's Collision Mitigation System ("CMS") of warnings and Automated Emergency Braking ("AEB") may be enabled to intervene during normal and non-platooning operation. Zone 2425 shows the distance over with Cooperative Adaptive Cruise Control operates. Zone 2430 shows the commanded gap distance during which the torque and braking, and thus the speed, of the vehicles 2400 and 2405 operate under the control of the systems of the present invention when the platoon is operating normally in state 2355. Zone 2435 illustrates a platooning tolerance zone, which represents a variable distance over which the commanded gap may vary while the platoon continues to operate in state 2355. For simplicity and improved clarity, Zone 2435 is omitted from FIGS. 24B-24C.

FIG. 24B augments FIG. 24A by adding zones that are relevant when the vehicles have begun engagement of a platoon, or states 2335 through 2355 of FIG. 23. Thus, a zone 2440 illustrates the distance during which engagement of a platoon is an option for both drivers or, in the case of fully automated vehicles, for the command program operating the vehicles. Further, zone 2445 illustrates an "engagement green light zone" or preferred distance during which the vehicle operators or command program can initiate platooning and thus transition from state 2340 to state 2350 of FIG. 23. It will be appreciated that the green light zone 2445 may be identical to or nearly identical to zone 2440, depending upon the implementation, especially for fully autonomous vehicles.

FIG. 24C augments FIG. 24A by adding zones that are relevant when the platoon is being dissolved, i.e., state 2360 of FIG. 23. During dissolve, as discussed previously herein, the vehicles separate and the distance between them increases, for example until the gap between them is sufficient for the drivers to resume manual control of the speed of the vehicles. Thus, FIG. 24C shows a left-pointing arrow behind follow vehicle 2405 to indicate that the relative speed between them is increasing and, correspondingly, the distance is increasing. In addition, FIG. 24C includes a platooning re-engagement zone 2450, or a distance during which the drivers/command program are permitted to re-engage the platoon. FIG. 24C also illustrates a re-engagement green light zone 2455, which, in at least some embodiments, is a somewhat smaller distance, separated from the end of the zone 2450 nearest the lead vehicle by a hysteresis distance or gap 2460 and separated from end of the zone 2450 farther from the lead vehicle by a policy distance or gap 2465. The hysteresis gap allows for comparatively slight variation that occurs with the latency of the system, human response time, and so forth. The policy gap is an arbitrary safety factor. It will be appreciated that, in some embodiments, the gaps 2460 and 2465 can be zero or approximate zero, particularly for autonomous operation. In addition, FIG. 24C includes a manual takeover zone 2470, which depicts the distances that are sufficient to permit the driver to control the vehicle manually, but are still within there-engagement distance. If the distance extends beyond the manual takeover zone, re-engagement is no longer permitted and manual takeover is required, such that the driver is in primary control as shown at 2475.

Referring next to FIGS. 25A-25C, an appreciation of the system's operation when in state 2330, from the perspective of the driver, can be better appreciated. In the example shown in FIG. 25A, follow vehicle 2405 is about 1.2 miles behind lead vehicle 2400, which, for purposes of this example is assumed to be outside zone 2415, such that robust DSRC communications between the vehicles is not yet reliably available. It will be appreciated that the actual distance for robust communications may be less than or greater than the exemplary distance shown here. Then, as shown in FIG. 25B, the visual display 2500 in the follow vehicle shows the distance to the lead vehicle and provides to the driver the system's instruction to proceed at the speed limit. In addition, icon 2505 at the upper right of the display shows that a pairing has been accepted by both drivers. It will be appreciated that, at this point, the display for the lead vehicle is instructing the driver of the lead vehicle to slow down to allow the follow vehicle to catch up, consistent with the speed differences illustrated in FIG. 17A. In at least some embodiments, the display for the lead vehicle will typically show the distance between the vehicles as a negative value. FIG. 25C shows platooning engagement/disengagement controls 2510 and 2515, and also shows the driver's brake pedal 2520 and accelerator pedal 2525. The controls 2510 and 2515 are inactive, and the driver operates the vehicle's braking and torque/speed. The engagement/disengagement controls can be located at any convenient location in the vehicle, for example either on the dash, on a stalk adjacent the driver's seat, on a console between seats, overhead, or on the steering wheel. The preference is, generally, to ensure that the driver has easy access to the controls, without having them in a location where they can be accidentally pressed. It will also be appreciated that, in some embodiments, the engagement/disengagement controls can be a single control with different functions depending upon the state.

Turning next to FIGS. 26A-C, reflecting state 2335, the follow vehicle is now within robust DSRC [or other as discussed above] communications range. Thus, the display now shows a distance between the vehicles of 495 feet, with system instructions to the driver to close the gap to 300 feet. The distance of 300 feet is exemplary only, and not intended to be limited, with the objective being that the distance is selected to be large enough to permit a gradual, reliable and safe pull-in. In addition, the display shows with icon 2600 that Vehicle-to-Vehicle communications is active. The controls 2510 and 2515 remain inactive, and the driver is responsible for operating both the accelerator and brake pedals.

Referring next to FIGS. 27A-27C, a different operational environment can be appreciated. In this instance, while the vehicles are paired, and V-to-V communications is available, the intended lead vehicle is still catching up to the intended follow vehicle, and needs to overtake the follow vehicle. In this case, the display 2500 indicates to the follow vehicle that the lead vehicle is −495 feet behind the intended follow vehicle. The system instructs the operator of the follow vehicle to let the lead vehicle pull ahead. Depending upon the implementation and the operating conditions of both vehicles, the system can instruct the drivers of one or both vehicles to adjust speed as appropriate to permit them to reach platooning position within a reasonable time. Both drivers operate the brake and accelerator pedals during this state.

State 2340, from the driver's perspective, is shown in FIGS. 28A-28C. In this state, vehicle 2405 is now within zone 2445, as shown in FIG. 27A, and the display 2500 of FIG. 27B show a distance of less than 300 feet. The display provides to the driver the system's authorization to begin platooning by pressing engagement control 2510, which can be illuminated in at least some embodiments. Until the engagement control 2510 is pressed, the driver continues to operate both brake and accelerator pedals. An audible signal, indicated at 2800, can be used to inform the driver that he has the option of engaging at this point.

Figure 29A:
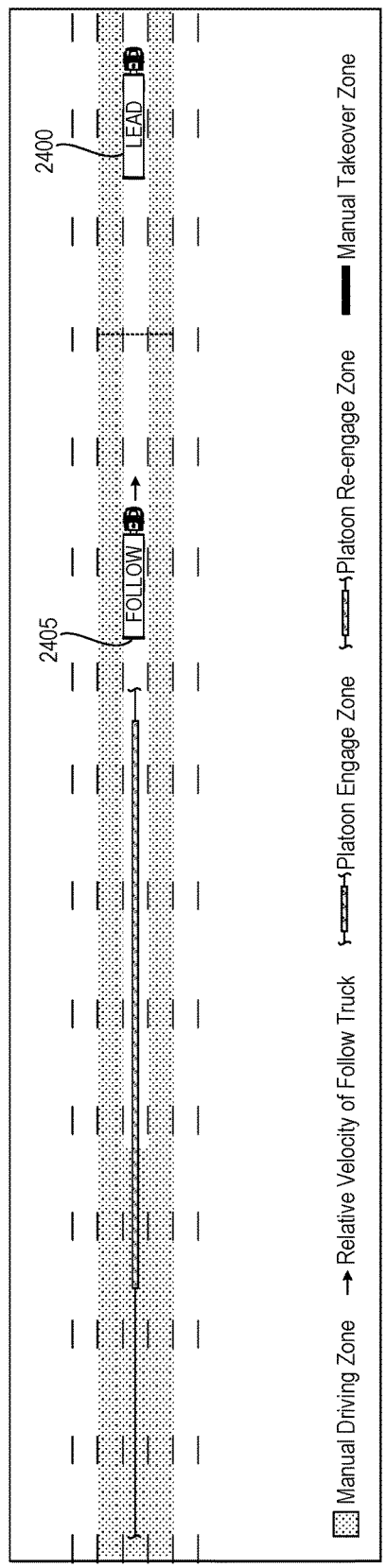
Figure 29C:
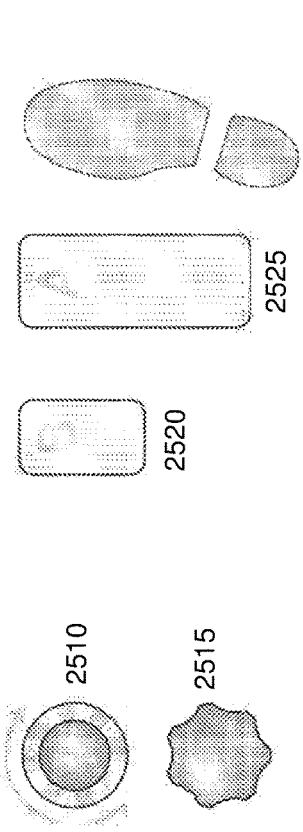
Figure 29B:
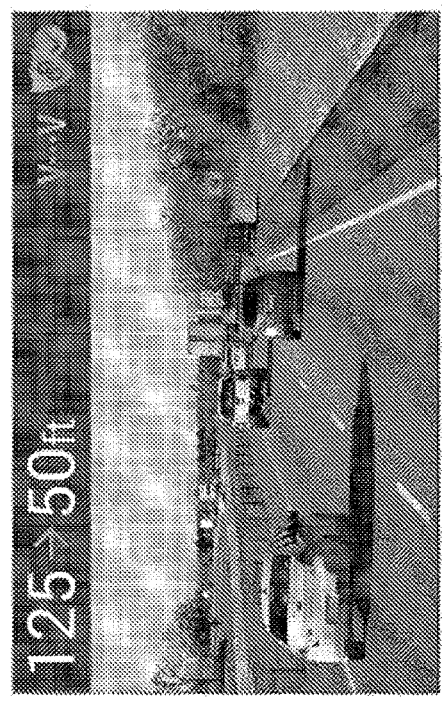

Next, as shown in FIGS. 29A-29C, state 2350 from the driver's perspective can be appreciated. The engagement control (or the appropriate program command for autonomous vehicles) has been activated and the pull-in or draw-in has begun. The driver no longer has control of the accelerator, but could terminate pull-in by depressing the brake pedal 2520 or the disengagement control 2515. For the example of FIG. 29B, the display 2500 illustrates a reduction of the gap from 125 feet to 50 ft, and further displays the view seen by the forward-facing camera of the lead vehicle. The engagement control 2510 can, in some embodiments, be illuminated differently than in FIG. 28C to differentiate the initiation of platooning from the pull-in state. In some instances an audible alert can be used.

When the vehicles reach the commanded gap, shown as zone 2430 in FIG. 30A, the state transitions from 2350 to 2355, where the system described herein operates both braking and torque to maintain the commanded gap. The platoon is thus operating in steady state, and, in most instances, will continue in this state for an extended period of time. Entry into this state can be signaled by an audible alert, again indicated at 2800. In addition, the illumination on the engagement control 2510 can change to indicate steady state operation. The display 2500 shows the gap distance, and continues to show the view seen by the forward-looking camera of the lead vehicle. As before, either driver can terminate the platoon by depressing the brake pedal or the disengagement control, or, in some embodiments, the engagement control, as shown in FIGS. 31A-C. This transitions the state from 2355 to 2360, dissolve.

FIGS. 32A-32C illustrate state 2360, dissolve, in which the gap between the vehicles is increased until manual takeover by the drivers is safe. The display 2500 shows the increasing distance. The zone 2450 is illustrated in FIG. 32A, with a left-pointing arrow by follow vehicle 2405. The engagement control 2510 is illuminated, in some embodiments differently than for other states, for example by a counter-clockwise progression of lighting. The system retains control of both torque and braking, although the driver can depress the brake pedal to brake more quickly. The display 2500 continues to show the view from the forward-facing camera of the lead vehicle. In addition, the display 2500 provides a status display of "dissolving" and also informs the driver to push the engagement control to pull-in again. V-to-V communication also remains robust. An audio signal can also be initiated.

Once the gap between vehicles reaches the re-engagement green light zone, manual takeover is permitted as well as re-engagement, as shown in FIGS. 33A-C. The display 2500 continues to show the increasing gap, and a warning advising the driver to take control, or to press the engagement control to re-engage the platoon. There-engagement control continues to be illuminated as in FIG. 32C, but the driver is able to take control of the accelerator pedal. As the gap continues to increase, for example beyond 300 feet, the option to re-engage no longer exists, as shown in FIGS. 34A-C. Instead, at this point, the state reverts essentially to state 2340, shown in FIGS. 28A-C, where the vehicles are ready to platoon, but are beyond the minimum safe manual following distance. The driver has control of the accelerator, and the display is the same. However, the distance between vehicles can be greater than shown in FIGS. 28A-C.

As the distance continues to increase beyond platooning engagement distance, shown in FIGS. 35A-C, manual takeover is required. The display provides the distance, and an urgent warning to the driver to take over control of the vehicle, and an audible warning can also be initiated. From FIGS. 25A-35C, the progression of a platoon in an exemplary embodiment, from the perspective of the operator of the vehicle, can be fully appreciated.

There are several potential states for platoon controller. In some embodiment the available states include (but are not limited to) (1) available, (2) rendezvous, (3) platooning, and (4) dissolve. Very generally, in the available state, the system is active in the sense that the platoon controller is active and available for communication with one or more external systems, although no specific platoon partner has been identified. In the rendezvous state, a platoon partner has been identified, but platooning control is not active in the sense that it is automatically controlling either of the platoon partners in any way. In the platooning state, the platoon controller is configured to facilitate at least partially automated control of at least one of the platoon partners. In the dissolve state, the platoon controller attempts to at least partially automatically control at least one of the platoon partners in a manner appropriate for returning such vehicle to control by something other than the platoon control, e.g., manual control or control by another system. In various embodiments, any of these states can be subdivided into multiple distinct states. For example, platooning may include separate pull-in, gap control and velocity control states that are appropriate for use in different circumstances.

As will be appreciated by those familiar with the art, the U.S. Department of Transportation's National Highway Traffic Safety Administration (NHTSA) has defined five different levels of autonomous driving. In several of the embodiments described herein, the driver of the lead vehicle is expected to be in full control of the lead vehicle. Level 1 automation (as defined by the NHTSA) is contemplated for the trailing vehicle. That is, the driver of the trailing vehicle actively steer the vehicle (e.g., provide all steering control). As such, the trailing vehicle driver is expected to remain alert and actively engaged throughout platoon control. The availability of an alert driver can greatly simplify the platoon controller design since there are a number of driving conditions that human drivers may perceive more readily than the controller and can therefore sometimes react more readily or quicker to a situation of concern than the platoon controller.

Figure 36:
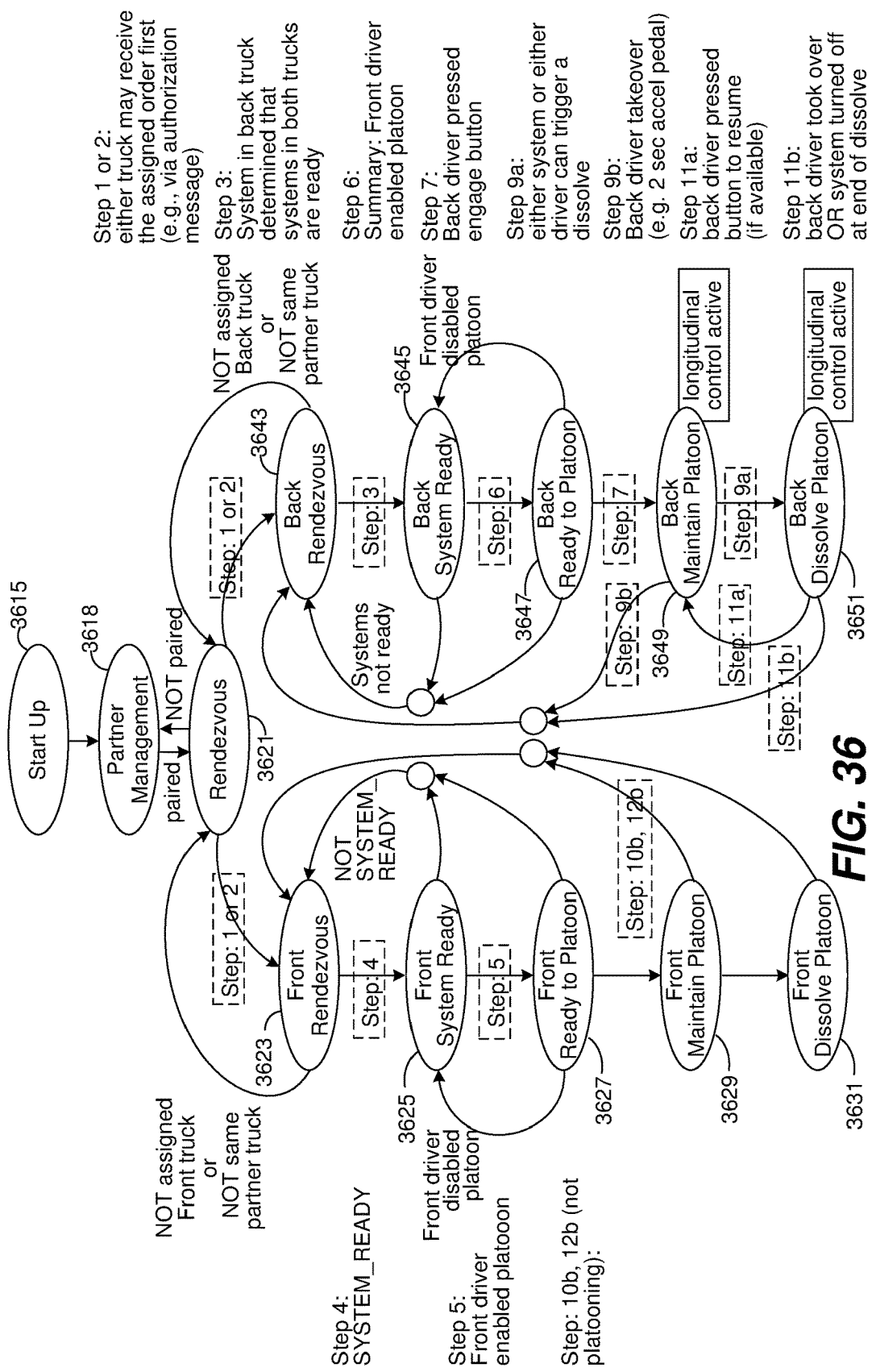
FIG. 36 is a state diagram illustrating a set of platoon controller states and transition triggers between the states in accordance with an embodiment.
Figure 37:
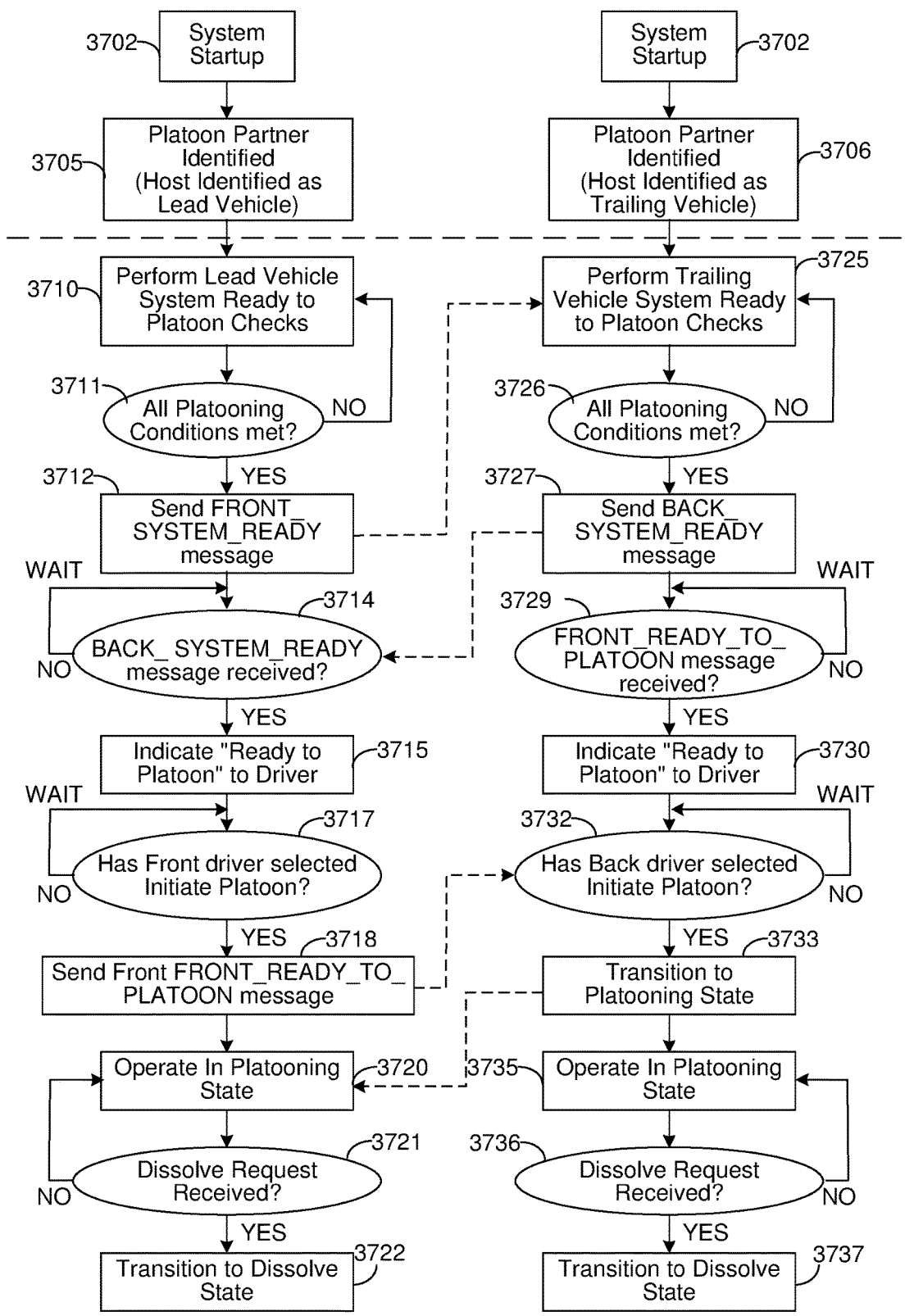
FIG. 37 is a flow chart illustrating an embodiment of a handshaking process for orchestrating a transition to a platooning state.

Referring next to FIGS. 36 and 37, a platoon control state machine and a handshaking based method for initiating a platoon that are suitable for managing the transitioning from manual operator control to platoon control (e.g., Level 1 automated platoon control) of the trailing vehicle will be described. The described state machine and platoon management or variations thereof may be used in conjunctions any of the embodiments described herein.

Figure 41:
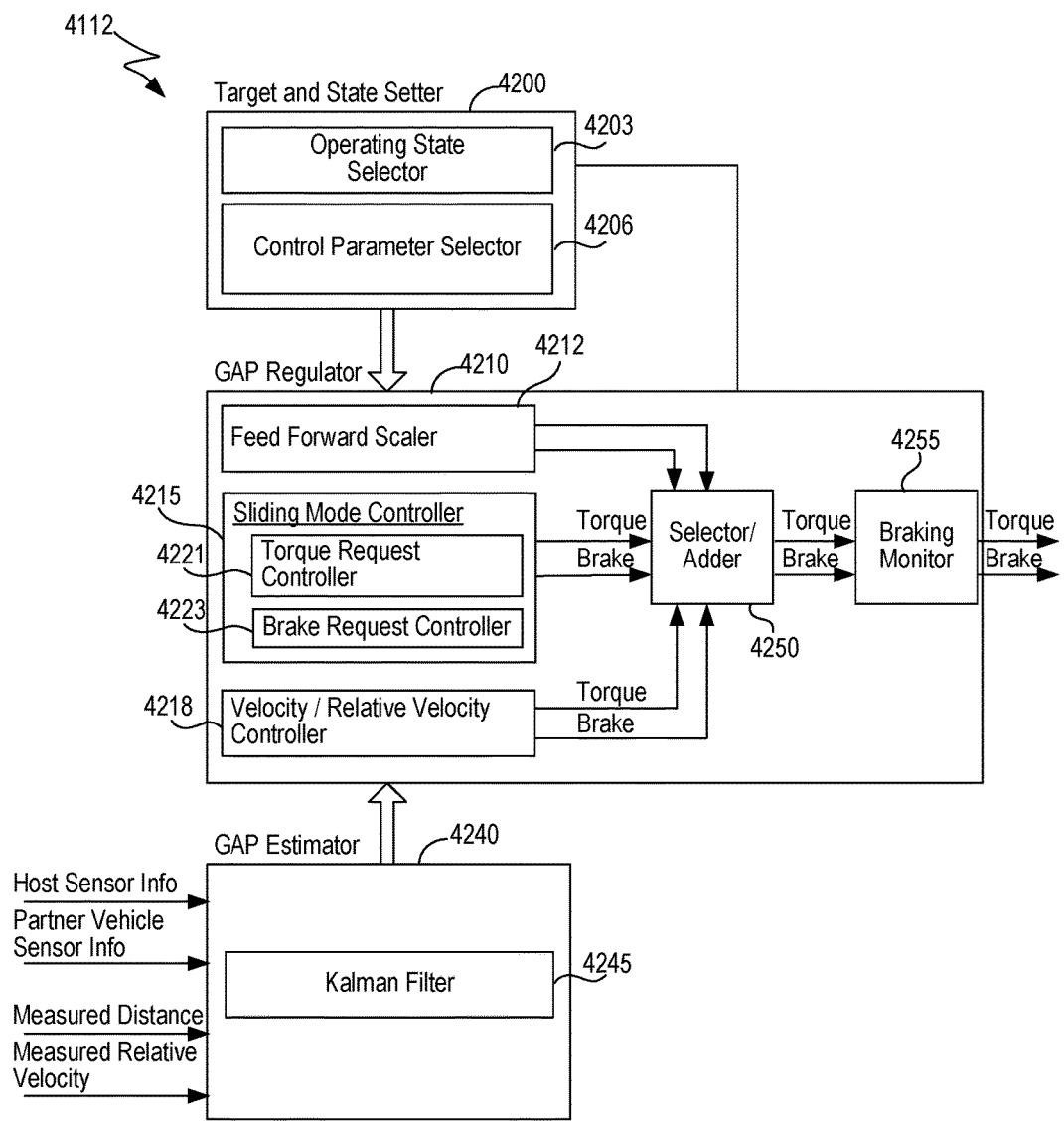
FIG. 41 is a block diagram of a gap controller in accordance with one embodiment.

FIG. 36 is a state diagram indicating a number of potential states of the platoon controller state machine in accordance with a particular embodiment. In the illustrated embodiment, the states include an Initialization or Start-up state 3615, a Partner Management state 3618 which generally corresponds to the available state, a Rendezvous state 3621, and a number of states that are specific to whether the host is designated the front/lead vehicle or the trailing/back vehicle. It should be appreciated that the host vehicle may be designated as either the lead or trailing vehicle in any particular platoon and that the tasks for any particular state will often vary based on whether the host is designated as the front or back vehicle. Therefore, the possible states include a set of platoon controller states in which the host is designated as the front vehicle, and a corresponding set of platoon controller states in which the host is designated as the trailing vehicle. In the illustrated embodiment, the front vehicle states include a Front Rendezvous state 3623, a Front System Ready state 3625, a Front Ready to Platoon or Driver Ready to Platoon state 3627, a front Maintain Platoon state 3629 and a Front Dissolve state 3631. The back vehicle states include a Back Rendezvous state 3643, a Back System Ready state 3645, a Back Ready to Platoon or Back Driver Ready to Platoon state 3647, a Back Maintain Platoon state 3649 and a Back Dissolve state 3651. In some embodiments, the Back Maintain Platoon state 3649 may be subdivided into control states such as Pull-In, Gap Control and Relative Velocity Control. In the embodiment of FIG. 41, the Pull-In and Gap Control states are combined under the control of sliding mode controller 4215 and the Relative Velocity Control state is executed under the control of velocity controller 4218. Of course, in other embodiments, other control states may additionally or alternatively be employed as part of or in place of the Maintain Platoon state.

A representative flow and triggers for transitioning between these various states in the context of a particular implementation is discussed with reference to FIG. 37 which also illustrates a particular handshaking protocol that may be used to coordinate the transitions of each of the controllers from their respective Rendezvous states to their respective Platooning states.

Preliminarily, the platoon controllers for each of the platoon partners are initialized (state 3615) as illustrated in step 3702. Generally, the platoon controllers can each be started in response to any trigger(s) deemed appropriate by the system designer, as for example, a vehicle key-on event, in response to an activation of the platoon system by the respective drivers or at any other time deemed appropriate by the system designer. After startup, the platoon controllers transition to the Partner Management state 3618 which generally involves basic management of the associated controller when the vehicle has not been assigned to any particular platoon. Since no platoon has been assigned, the activities of the respective platoon controllers to this point would generally not be coordinated with each other in any way.

At some point the vehicle may be assigned to a platoon. In general, the platoon partner can be assigned by a central system such as the NOC or in systems where ad hoc platooning is permitted, may be identified by the vehicles themselves based on communications between nearby vehicles indicating a desire to platoon.

When the host vehicle is paired with another vehicle its platoon controller transitions to a Rendezvous state 3621 in which the controller begins preparations for platooning with its assigned partners. The same transition occurs in both of the platoon partners. At some point, one of the vehicles is identified as the lead vehicle and the other is identified as the trailing vehicle as represented by steps 3705 and 3706 respectively. The order may be assigned at the same time that the partner is assigned or at a later stage. A variety of different factors can be utilized in determining which vehicle will lead and which will follow—as for example, the respective weights and/or performance capabilities of the participants (which is particularly important when the platoon is composed of large trucks), the relative locations of the vehicles when the pair is identified (e.g., which vehicle is currently ahead), agreement between the drivers or any other appropriate factors. In some trucking implementations, when one of the trucks is significantly heavier than the other, the heavier truck is designated the lead truck since its braking distance may be expected to be longer than the lighter truck.

In the Rendezvous state, the vehicle controllers begin communicating with one another. If either of the controllers ever determines it is communicating with a vehicle other than its intended partner or that the pairing is not mutual, then its associated controller reverts to Partner Management state 3618.

When the position order is assigned, the platoon controller for the lead vehicle transitions to the Front Rendezvous state 3623, and the platoon controller for the trailing vehicle transitions to the Back Rendezvous state 3643. If either of the controllers determines at any time that it is in the wrong state, is communicating with a vehicle other than its partner or that it should not be in its assigned position for any reason, the partner vehicle is so informed and the controllers revert to Rendezvous state 621.

Before platooning begins, the systems on each participant must verify that they are ready to participate in the platoon. In the embodiment illustrated in FIG. 37, a handshaking protocol is used to verify that both controllers and both drivers are affirmatively ready to platoon before platoon control is initiated. While in the Front Rendezvous state, the platoon controller on the front vehicle performs a set of checks to verify that the front vehicle is in a condition suitable for platooning (step 3710). Some representative checks that may be performed by the front platoon controller are described below after the description of FIG. 38. If any of the required platooning conditions are not met, the systems waits until they are met as represented by the "no" branch of decision block 3711. If and when all of the required platooning conditions are met, the front platoon controller has effectively determined that it is ready to participate in an active platoon, and sends a FRONT_SYSTEM_READY message to the trailing vehicle (step 3712). In parallel, the front platoon controller transitions to the Front System Ready state 3625.

The front platoon controller continues to run its platoon suitability checks while it is in the Front System Ready state 3625. If any of those checks fail at any time while the controller is in the Front System Ready state, the front controller informs the trailing vehicle that it is no longer ready for platooning (e.g., by sending a NOT SYSTEM_READY message) and transitions back to Front Rendezvous state 3623.

Meanwhile, the trailing vehicle platoon controller also performs a series of checks to verify that the trailing vehicle is in a condition suitable for platooning (step 3725). Some representative checks that may be performed by the back platoon controller are described below with reference to FIG. 38. If any of the required platooning conditions are not met, the system waits until all conditions are met as represented by the "no" branch of decision block 3726. If and when all of the required platooning conditions are met, the back platoon controller effectively determines that it is ready to participate in an active platoon, and it sends a BACK_SYSTEM_READY message to the lead vehicle (step 3727). The BACK_SYSTEM_READY message is sometimes referred to herein as an "all green" message. In parallel, the back platoon controller transitions to the Back System Ready state 3645. The back platoon controller continues to run its platoon suitability checks while it is in the Back System Ready state 3625 and if any of those checks fail at any time, the back controller informs the lead vehicle that it is no longer ready for platooning (e.g., by sending a NOT SYSTEM_READY message) and transitions back to Back Rendezvous state 3643.

In the illustrated embodiment, one of the required checks for the back platoon controller is to verify that the lead vehicle is in its ready to platoon state. Therefore, the back platoon controller can only transition to Back System Ready state 645 (and send the BACK_SYSTEM_READY message) only if and when the front platoon controller is in the Front System Ready state 3625. That is, after it has received a FRONT_SYSTEM_READY message that has not been cancelled.

After the front system is ready, it waits to receive the BACK_SYSTEM_READY message as represented by step 3714. When the BACK_SYSTEM_READY message is received, the driver of the front vehicle is notified that the system is ready to platoon (step 3715). That notification can be delivered using any desired alerting system and/or user interface, as for example by one or more of: lighting a manual platooning button a particular color to signify that the system is ready to platoon; displaying an appropriate message on a screen; providing an audio signal or message; etc. The driver of the lead vehicle must then affirmatively indicate that s/he is ready to platoon as represented by step 3717. This driver consent can be communicated to the system using any interface deemed appropriate by the system designer. As suggested above, one suitable interface is a platooning button that may be pressed to indicate that the driver is ready to platoon. Once the driver of the lead vehicles indicates s/he is ready to platoon, the driver should operate the vehicle as if platooning, although platoon control preferably will not be established yet at that stage. Rather, the lead vehicle platoon controller sends a FRONT_READY_TO_PLATOON message to the trailing vehicle (step 3718) and transitions to the Front Ready to Platoon state 3627. The FRONT_READY_TO_PLATOON message is sometimes referred to herein as an "all clear" message.

After the Back Platoon controller sends the BACK_SYSTEM_READY message, the Back Platoon controller waits in Back System Ready state 3645 to receive the FRONT_READY_TO_PLATOON message as represented by step 3729. Upon receipt of the FRONT_READY_TO_PLATOON message, the trailing vehicle platoon controller transitions to the Back Ready to Platoon state 647 and notifies the driver of the trailing vehicle that the system and the lead vehicle driver are both ready to platoon (step 3730). Again, the driver notification can take any desired form including, but not limited to, any of the notification schemes discussed above with respect to the front vehicle. After receiving the FRONT_READY_TO_PLATOON message, the driver of the trailing vehicle must affirmatively initiate the platoon as represented by step 3732. Again, this consent can be entered using any interface desired by the system designer, such as pressing the platooning button on the trailing vehicle. Once the trailing vehicle driver initiates the platoon, the back platoon controller transitions from the Back Ready to Platoon state 3647 to the platooning state (Back Maintain Platoon state 3649) and so informs the front platoon controller which also transitions to its platooning state (Front Maintain Platoon state 3629). This notification may take the form of an ACTIVE_PLATOON message.

It is expected that neither of the vehicle drivers will consent to platooning unless and until they believe that conditions are appropriate for platooning. Thus, if they see anything that makes them believe that platooning is not advised, they won't press the initiate platoon button (or otherwise initiate the platoon). The described handshaking process ensures that both systems are ready for platooning before either driver is offered the opportunity to participate in a platoon. It further requires both drivers to consent before platooning begins and gives final authority for initiating the platoon to the driver of the trailing vehicle which is the primary vehicle controlled during the platoon.

Even after a driver has given consent to platoon, that consent can be withdrawn/rescinded at any time. Such a rescission is treated as a disable platoon command can be communicated by pressing the platooning button a second time or through any other appropriate user interface. The system's reaction to a driver initiated disable platoon command will depend somewhat on the state that they system is in when the disable platoon command is entered. If the front driver enters rescinds platoon authorization, a DISABLE_PLATOON is sent to the back vehicle. If a DISABLE_PLATOON command is received while the back system is in the Back Ready to Platoon state 3647, the back system will transition back to the Back System Ready state 3647. In this state the driver of the front vehicle must again affirmatively initiate platoon authorization and the remainder of the handshaking protocol described above must be repeated before a platoon can be initiated. If either of the drivers decides to terminate the platoon by pressing the disable platoon button after platooning has begun, the systems will transition to the dissolve state as discussed below.

Beginning with the rendezvous state, the platoon controller repeatedly checks to verify that conditions are appropriate for platooning and the Front and Back System Ready states 3625 and 3627 cannot be entered unless or until all appropriate conditions are met. Even after the System Ready states are entered, the platoon controllers continue to make the appropriate checks. The frequency of the checks can vary, but in general it is preferred that they be performed repeatedly and often. By way of example at rates of every tenth of a second (10 Hz) or quicker—and potentially much quicker. If it is determined at any time after the System Ready state is entered but before platooning control begins, the affected system(s) revert back to their respective Rendezvous states.

Appropriate checks preferably continue even after platooning begins to help ensure that conditions remain appropriate for platooning. If it is determined at any time that conditions are no longer suitable for platooning, then a dissolve is requested, as represented by steps 3721 and 3736. Either driver can also initiate a dissolve at any time—as for example by pressing a disable/dissolve platoon button. When a dissolve is requested, the controllers transition to the Front and Back Dissolve Platoon states 3631, 3651 as represented by steps 3722 and 3737. In the dissolve state the trailing vehicle is controlled in a manner such that it can be safely transitioned to manual control or control by another automated or autonomous control system as previously discussed. In some embodiments, the driver to the back vehicle may also trigger a dissolve by pressing the brake pedal.

If the conditions are appropriate for platooning after a dissolve has been triggered, but before the dissolve is completed, the back driver may attempt to reinitiate platoon control by again pressing the platoon button. Such a selection will transition the back platoon controller from Back Dissolve Platoon state 3651 to Back Maintain Platoon state 3649. However, it should be appreciated that platooning cannot be resumed if any of the platooning checks fail or the front driver disabled the platoon—unless or until such check is resolved or the front driver re-enables the platoon.

The driver of the trailing vehicle can also take manual control of the vehicle at any time during either platooning or a dissolve. The specific actions that trigger the back platoon controller to relinquish control to the driver from either the platooning or dissolve state may vary. In some embodiments, one way for the driver to takeover is to press the accelerator pedal. In general, the platoon controller may be configured to respond to accelerator pedal commands that unless such a command is perceived as a significant safety risk. In some embodiments, the system may be configured to relinquish control if/when the back driver pressing the accelerator pedal for at least a threshold period of time (e.g., 2 seconds—although longer or shorter threshold periods may be utilized as desired). In other embodiments, the system may be configured to relinquish control any time that the rear driver hits the accelerator pedal. A disadvantage of relinquishing control any time the driver touches the accelerator pedal is that there is an increased risk that an inadvertent touching of the accelerator pedal will trigger an unwanted dissolve. On the other hand, it is desirable to allow the rear driver to take control without undue delay by simply taking command (e.g., by actuating the accelerator pedal in a normal driving manner).

The response of the back platoon controller to driver initiated inputs from the accelerator or brake pedals during platooning and/or a dissolve may vary and may be different based on the state that the controller is in (e.g., Back Maintain Platoon or Back Dissolve Platoon). For example, if the brake pedal is actuated in either of these states, the controller may be designed to apply an amount of braking corresponding to the greater of the braking commanded by the platoon controller (e.g., Brake Request Controller 4223) and the amount of braking commanded by the driver via pressing the brake pedal. Such an arrangement ensures that the more aggressive braking command is utilized. Pressing the brake pedal in the Back Maintain Platoon state may also initiate a transition to the Back Dissolve Platoon state 3651.

Somewhat similarly, if the accelerator pedal is actuated by the back driver while the platoon controller is in either the platooning or dissolve states, the greater of the two inputs may be used. That is, the system may be designed to implement a torque request that is the greater of the torque commanded by the platoon controller (e.g., Torque Request Controller 4221) and the amount of torque commanded by the driver via pressing the accelerator pedal. If the accelerator pedal is depressed for a first threshold period while the platoon controller is in the Back Maintain Platoon state 3649, manual control may be enabled without transitioning to the Back Dissolve state 3651. In such a circumstance, the back platoon controller may transition directly back to the Back Rendezvous state 3643.

During a dissolve the platoon controller controls the back vehicle to slowly drop back relative to the front truck as previously described. When the gap reaches a comfortable distance, the back driver may transition out of the dissolve by pressing the accelerator pedal and thereby taking over control. Once the driver takes control, the platoon controller will transition to the Back Rendezvous state 3643. It is possible, although not likely, that the driver may not press the accelerator pedal to complete the dissolve. In such a case the platoon controller can cause the trailing vehicle to drop back to its maximum platooning distance (e.g., 100 meters or other appropriate threshold) at which point the platoon is terminated and the platoon controller transitions to the Rendezvous state. At such a point neither the platoon controller nor the driver would be putting in any torque requests which would cause the vehicle to coast.

There may be times during a dissolve in which the driver of the trailing vehicle may wish to reestablish the platoon before the dissolve is completed. The dissolve state preferably includes logic that determines whether reengagement of platooning is permitted in any particular situation. In general, reengagement of the platoon directly from a dissolve may be permitted if (and preferably only if) all of the platooning check associated with reengaging from a dissolve pass at the time that reengagement is desired. Preferably, an affirmative action of the driver of the trailing vehicle is required to reengage the platoon. For example, the driver can trigger reengagement of the platoon by pressing the platoon button or by way of any other suitable input designated by the system designer.

As suggested above, various platooning checks continue to execute even in the dissolve state. If any of the platoon checks fail, the platoon cannot be reinitiated directly from the dissolve at any time that one or more of the platoon monitor reengage checks are in the "fail" state. However, if the situation changes during the dissolve to a condition where all of the platoon monitor reengage checks pass, then reengagement is possible at that point. In some embodiments, a platoon button can be lit when all of the checks pass to indicate to the driver that reengagement of the platoon is permissible.

The dissolve state can be triggered in a variety of different manners. In some embodiments, either driver can trigger a dissolve at any time by pressing an appropriate button on the platoon controller interface (which may be a button on the dashboard or on the platoon controller in some embodiments). The platoon controller can also initiate a dissolve on its own in response to the detection of a failure of one of the platooning checks.

If the dissolve is triggered by a request from the front driver, then the state of the front controller may return to the Front Rendezvous state and the platoon cannot be reengaged without going through the entire handshaking routine including renewed consent from both parties. However if the dissolve is triggered by the system or an action of the trailing driver it is possible to reengage the platoon if and when all platooning checks are made and the driver of the trailing vehicle elects to reengage.

The embodiment described above with respect to FIG. 37, contemplates drivers actively participating in the process, including participating in the transition of the trailing vehicle from manual control to partially automatic control and at least the trailing vehicle driver participates in the transition back to manual control. However, it should be appreciated that similar processes can be employed when platooning is initiated from a different automated control state. In such circumstances, the described driver interactions can be facilitated by the active controller, as for example, an active cruise control (ACC) system.

As discussed above, a number of conditions must be met for the system to be ready for active platooning. The specific conditions that must be met before the partners are each "ready for platooning" may vary widely based on the system. By way of example some specific checks will be described with reference to FIG. 38. In general, if any one or more of the checks fail, the system is not ready for platooning and the corresponding platoon control cannot transition from its relevant Rendezvous state 3623, 3643 to the System Ready state 3625, 3645, unless and until conditions change sufficiently for all of the checks to pass. Preferably, the checks continue even after the platoon controller has transitioned to the System Ready or Ready to Platoon states so that the system becomes aware of changes that adversely affect the advisability of platooning. If a check fails after the associated platoon controller has transitioned to the System Ready or Ready to Platoon state, the platoon controller will transition back to the appropriate Rendezvous state 3625, 3645 and the partner vehicle is informed of the transition so that it too transitions back to its Rendezvous state if it has not already done so based on its independent detection of the change in conditions.

The checks (or a set of generally similar checks) preferably continue even after the platoon controller has transitioned to the Maintain Platoon state 3629, 3649. If a check fails during active platoon control, the platoon controllers would typically transition to the Dissolve Platoon state 3631, 3651 which orchestrated the dissolution of the platoon. In some implementations the checks may be set up as monitors that are always on and send an alert, set a flag or otherwise indicated when their associated condition is not met.

Figure 38:
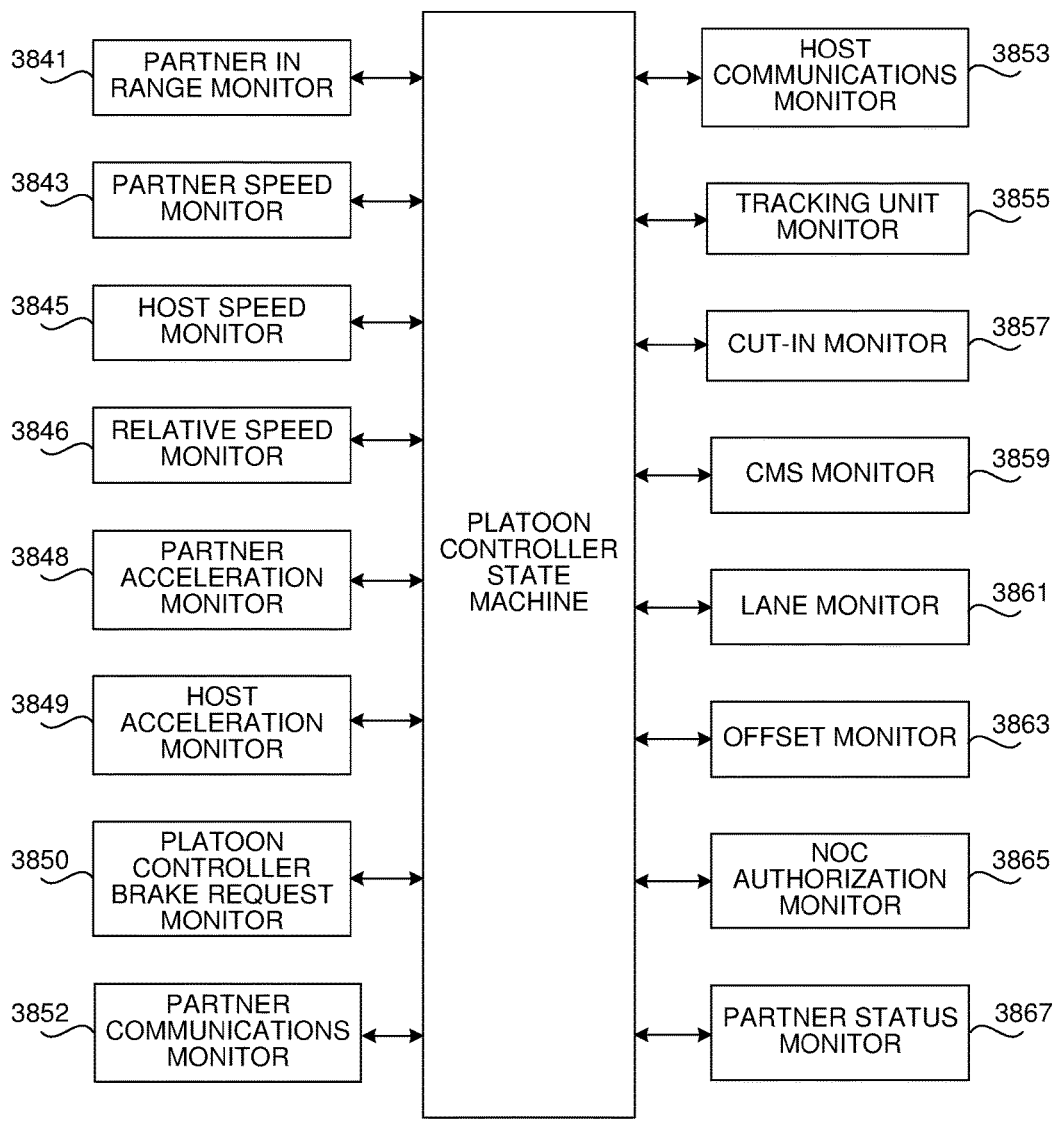
FIG. 38 is a block diagram illustrating a number of monitors useful for determining whether a host vehicle is ready to platoon in accordance with an embodiment.

Referring next to FIG. 38, a set of monitors that perform specific platooning checks. Many of the illustrated monitors are utilized by the back platoon controller to verify that conditions are appropriate for platooning. Although a specific set of monitors is described, it should be appreciated that the described monitors are illustrate in nature and that not all of the monitors need to be provided in any particular embodiment, new or additional monitors may be provided, and/or the functionalities of the described monitors may be varied to meet the needs of any particular controller. Further, although a number of separate monitors are illustrated, it should be appreciated that the functionalities of the described monitors and others can be combined in any desired manner and there is no need to provide the described functionality in dedicated monitors. Rather, analogous checks can be performed by the platoon controller algorithmically or in any other desired manner.

In the embodiment of FIG. 38, range monitor 3841 monitors the distance between the partners. The monitor is further configured to check whether the partner vehicle (i.e., the lead vehicle) is within active platooning range. Often, it will be desirable to begin active platoon control only when the vehicles are within a designated range of one another. The specific range permitted may vary widely based on the nature of the desired control, the technologies available to the respective platoon controllers, and the driving circumstances at the time the platoon is initiated (e.g., road conditions, traffic, etc.). By way of example, separations on the order of 5-100 meters when the vehicles are in-line (e.g. following one another in the same lane) tend to work well in many applications. In such a circumstance, the partner in range check performed by monitor 3841 would fail if the lead vehicle were more than 100 meters ahead of the trailing vehicle. Similarly, the partner in range check performed by monitor 3841 would fail if the designated lead vehicle was behind or less than 5 meters ahead of the host (designated back) vehicle.

If desired, the partner in range check performed by monitor 3841 can be the same when the vehicles are laterally offset (e.g., in different lanes) which would also preclude the platoon controller from engaging when the vehicles are beside each other in different lanes. However, in some circumstances it may be desirable to use somewhat different thresholds when the vehicles are laterally offset. In particular, it may be appropriate to allow platooning control to begin while the vehicles are next to each other in different lanes so that the "back" vehicle doesn't need to drop back unnecessarily far before platooning begins. Allowing the vehicles to platoon while the vehicles are beside each other can also be useful during active platooning when the platoon partners switch positions so that a formerly trailing vehicle takes the lead.

The outer limits of the platooning range may be based in part on the capabilities of the respective platoon partners. In practice, standard radar equipment on trucks today do not tend to provide measurements good for platoon control at distances much over 100 meters and is only configured to look ahead of the vehicle within a relatively narrow field of view. Similarly, standard DSRC systems today tend not to be too reliable at distances much over 150 meters. These types of equipment limitations restrict the practicality of active platoon control when the vehicles are further apart or not in view of one another. However it is envisioned that as the capabilities of the available equipment continues to improve, the acceptable range for active platooning may expand. The 100 meter maximum range also works well in conjunction with the described platoon system which contemplates manual operator control of the vehicle when platooning control is not active and affirmative driver opt-in before automated or partially automated control begins. That is because the driver of the trailing vehicle will typically want to be well within the 100 meter range before transferring control to the system.

Monitors 3843 and 3844 monitor the speeds of the partner and host vehicles respectively. These monitors are further configured to check whether the lead and host vehicles respectively are currently traveling at velocities suitable for platooning. The specific vehicles speeds suitable for platooning may vary significantly based on circumstances. By way of example front vehicle speeds on the order of 35-70 miles per hour have found to be appropriate in some circumstances/applications. The platoon controller on the trailing vehicle can determine the speed of the lead vehicle based on the host vehicle's speed and a measured relative velocity between the vehicle (e.g., as measured by a radar unit, one or more cameras, LIDAR or other suitable distance and relative velocity measuring technologies). The measured velocity can also be verified by comparison to speed reported by the lead vehicle as part of DSRC (or other) communications between the vehicles.

Often, the trailing vehicle will be permitted to have a slightly larger permitted platooning speed range since it may need to overtake (or drop back) relative to the lead vehicle. Thus, a suitable range for the trailing vehicle may be on the order of 33-73 miles per hour for similar applications. Of course, the specific permissible platooning speeds and the relative scale of the permissible ranges for the lead and trailing vehicles may vary widely based on a wide variety of factors including road conditions, traffic conditions, speed limits, vehicle capabilities, fleet management preferences, driver preferences, etc.

Monitor 3846 monitors the relative speed of the trailing vehicle relative to the front vehicle. The relative speed monitor may be further configured to check whether the relative speed of the vehicles is in a range suitable for platooning. Generally it is undesirable to start a platoon if the vehicles are relatively close together but traveling at significantly different speeds. Again, the specific ranges may vary widely, but speed differences of no more than 5 msec or 10 miles per hour may be appropriate in some circumstances. In some implementations, the permitted speed differential may be based in part on the longitudinal distance that the vehicles are separated by.

Monitors 3848 and 3849 monitor the acceleration levels of the partner and host vehicles respectively. The acceleration monitors may further be configured to check whether the lead and trailing vehicles are slowing (braking) more than a designated amount. This can be in terms of a designated deceleration threshold (e.g., no more than −1 m/s$^2$) or other appropriate threshold. Alternatively or additionally, another monitor 3850 can be configured to monitor what the platoon controller's current braking request. This monitor can further be configured to check whether initiating platooning at the current time would cause the platoon controller for the trailing vehicle to generate of a braking command of over a particular threshold. For the later approach, the gap regulator control algorithms may execute beginning at rendezvous after the partner is identified or at other appropriate times with its outputs not being used for control unless or until platooning is actually initiated—that is, the back platoon controller transitions to the platooning state in step 3733 (e.g., to Back Maintain Platoon state 3649). However, since the gap regulator control algorithms are executing before platooning begins, its braking command output can be checked to make sure that it does not currently exceed the braking threshold.

Monitors 3852 and 3853 monitor the integrity of the communications for the partner and host vehicles respectively. As part of that process, they check whether the control channel communications are stable on the partner and host vehicles respectively. Since the described platoon control makes use of data from the partner vehicle, information is transmitted between the vehicles frequently—often on an almost continuous basis. If either the controllers on either vehicle determine that they are not receiving communications from the other as expected, or that such communications are corrupted, the control channel communications stable check for that vehicle would fail.

Monitor 3855 monitors the tracking unit(s). The tracking unit monitor may further be configured to check whether the tracking unit(s) (e.g. radar unit 4137) has a fix on the lead vehicle. U.S. patent application Ser. No. 15/590,715 and 62/489,662, which are incorporated herein by reference, describe some suitable techniques for attaining and maintaining a radar fix on a partner vehicle. If the tracking unit does not have a fix on the lead vehicle, the tracking unit fix active check would fail. In embodiments that have multiple different tracking units available (e.g., two or more of radar, LIDAR, cameras or trackers utilizing other distance measuring technologies), monitor 3855 can be configured to require that all, some or at least one of the trackers have a fix on the partner vehicle to pass its check depending on the preferences of the system designer.

Cut-in monitor 3857 is configured to detect the presence of a cut-in vehicle between the lead and trailing vehicles. In general, a platooning would not be permitted to begin if a vehicle is present in-lane between the platoon partners. It is expected that the driver of the trailing vehicle would not press the platoon button to signify readiness to platoon (step 3730) if a vehicle were present between the vehicles, or the driver was concerned that a cut-in would occur based on observed behavior of other traffic. However, the cut-in check provides an extra level of safety since it prevents the system from being deemed ready if a vehicle is detected in-line between the designated platoon partners. The cut-in check is even more important during active platoon control where the detection of a cut-in vehicle may trigger a transition to the dissolve state.

It is noted that with Level 1 platooning the driver is actively involved in vehicle control (such as steering) even though torque request and braking may be controlled automatically to maintain the desired gap. It is expected that in many instances the driver will be able to identify circumstances where a cut-in is likely and react appropriately. For example, a driver may observe a vehicle in another lane whose actions suggest that they want to cut-in between the platoon partners (e.g. to try to take a rapidly approaching exit). This can be a particularly dangerous situation when a car tries to cut in between two trucks that are platooning with a small gap therebetween. If the driver detects such a situation, the appropriate response may be to brake even though the cut-in has not yet occurred and has therefore not been detected by the controller. Another common example is merging traffic where a merging vehicle may have little choice but to cut-in between the platoon partners.

In some embodiments, the platoon controller, the braking controller or other suitable controller is arranged to implement the larger of any braking command generated by the platoon controller itself and any braking commanded by the driver by depressing the brake pedal. This helps ameliorate the risk that the driver will under brake in response to a detected event.

CMS monitor 3859 monitors the status of the collision mitigation system. Many vehicle have collision mitigation systems that are configured to detect circumstances in which the risk of a collision is high, and in some circumstances initiate certain levels of automatic control to help mitigate that risk and/or to reduce the impact of an ensuing collision. The CMS monitor detects whether the collision mitigation system for either of the vehicles has been triggered. A platoon cannot be initiated when the CMS is triggered. It is noted that in some circumstances it may be desirable or necessary to modify or disable a pre-installed collision mitigation systems on the trailing vehicle if normal platoon control (e.g. following a lead vehicle at a close distance) would trigger the collision mitigation system.

Lane monitor 3861 monitors the lane in front of the front vehicle. The lane monitor is configured to detect the presence of a vehicle of concern in front of the lead vehicle. Generally, if a slow moving vehicle is detected relatively closely in front of the lead vehicle, that is a concern to the platoon control. As such, in some embodiments, platoon control cannot be initiated if a vehicle of concern is detected in front of the lead platoon partner. The specific thresholds that trigger failure of the vehicle of concern check may vary based on system design goals, the weight and braking ability of the platoon partners, or a variety of other factors. But generally, if the lead truck is very close behind another vehicle and/or rapidly approaching another vehicle in-lane, it is more likely that braking and potentially aggressive braking may be required, and it is generally not desirable to initiate platooning when such risk factors exist. Again, the front vehicle driver is unlikely to press the ready to platoon button (step 3627) when there is a vehicle of concern. However, the system can affirmatively check for such circumstance and the system will not be deemed ready to platoon if such an obstacle exists. Similarly, the detection of a vehicle of concern in front of the lead vehicle can trigger a dissolve, or cause the platoon controller to increase the target gap in response to the detection of such an event.

Offset monitor 3863 is arranged to monitor the lateral offset between the vehicles. A variety of checks may be based on detected lateral offset between the vehicles. One of the checks the offset monitor may perform is based on the determination that the platoon partners are traveling in different lanes. Specifically, it may be undesirable to permit a platoon to initiate with the partners driving in a laterally offset manner (e.g., in an adjacent lane) if another vehicle is relatively closely in front of the trailing vehicle in the same lane as the trailing vehicle. Again, the specific threshold distances/relative velocities, etc. used as triggers for preventing platooning under the circumstances may vary widely.

In applications where authorization of a central system such as a network operations center (NOC) or some other system is required, another check may be whether the front and host vehicles are both authorized for platooning. NOC authorization monitor 3865 may be arranged to perform this check.

Partner State Monitor 3867 monitors the state of the partner vehicle. One check that the partner state monitor performs is to verify that the lead vehicle is in the appropriate state before the back platoon controller can transition to certain states. For example, the front platoon controller must be in the Front System Ready state 3625 before the back controller can transition to the Back System Ready state 3645. Similarly, the front platoon controller must be in the Front Ready to Platoon state 3627 before the back platoon controller can transition to the Back Ready to Platoon state 3647. Conversely, the back platoon controller must be in the Back System Ready state 3645 before the front platoon controller can transition to the Front Ready to Platoon state 3627. System ready for platooning (e.g., in the front system ready state). This check helps enforce the aspect of the handshaking protocol discussed with reference to FIG. 37.

In the embodiment described with respect to FIG. 38, monitors 3841—3867 all exist on the each vehicle which allows their corresponding checks to occur when needed. The specific monitors discussed each perform checks that are relevant to the control of the trailing vehicle. In general, a different series of checks will be performed when the host is designated the lead vehicle to verify that the lead vehicle is System Ready to platoon. The lead vehicle checks may redundantly include some of the same checks performed by the trailing vehicle and any other checks deemed appropriate in a particular circumstance. By way of example, in some embodiments: (i) the host velocity monitor 3845 on the lead vehicle may perform checks analogous to the velocity check performed by the trailing vehicle velocity monitors (verifying that its velocity is within the speeds permitted for platooning); (ii) host communications monitor 3853 on the lead vehicle may perform checks analogous to the communications checks performed by the trailing vehicle communications monitors (verifying that its control channel communications are stable); (iii) lane monitor 3861 on the front vehicle will also determine whether there is a vehicle of concern in front of the lead vehicle; NOC authorization monitor 3865 on the lead vehicle will also verify whether it is authorized to platoon, as required. Of course the specific checks performed by the lead vehicle and lead vehicle monitors may vary widely based on factors such as the information and sensors available to the lead vehicle, system design preferences, etc. . . . .

It should be appreciated that the described monitors and checks are exemplary in nature. Therefore, while the various monitors and checks described have been found to work well, it should be appreciated that not all of the described checks are required in any particular embodiment and that other appropriate checks or modifications of the described checks, may be used in addition to, or in place of any of the specific checks described herein.

The monitors are preferably always on when the platoon controller is active (e.g., after startup). As mentioned previously, it is generally desirable to continue performing the platoon suitability checks after the platoon controller has transitioned from the Rendezvous state to the System Ready state, the Ready to Platoon state, and/or the Maintain Platoon state and even in the Dissolve Platoon state. Most of the described monitors and checks are appropriate to run in each of these states, although in some circumstances the constraints or thresholds associated with a monitor checks may change based on the current state of the platoon controller. Therefore, the monitors preferably run continuously when the platoon controller is active even though the results of their various checks and other outputs may not be relevant to all states. Having the monitors always active means that their results are immediately available to the platoon controllers any time they are required.

As suggested above, the specific thresholds or ranges that trigger a fail may vary based on the platoon controller's state. Such variations may be designed to include a certain degree of hysteresis to reduce the probability that the controller will oscillate between states during operation at a level close to a trigger. For example, if the authorized front vehicle speed is in the range of 35-70 mph for instituting a platoon, a slightly larger range may be appropriate for maintaining the ready and platooning states to reduce the probability of the check switching back and forth between pass and fail when the speed is near an end of the range. A certain degree of hysteresis can be applied to other checks as well.

If a check fails during active platoon control, the platoon controller would typically transition to the Dissolve Platoon state 3631, 3651 which orchestrated the dissolution of the platoon. It should be appreciated that the triggers to cause a transition to a dissolve may be different than triggers that indicate that the controller is not ready to initiate platoon control. For example a short break in communications (as for example breaks of a half a second or less) may be sufficient to fail the communications stable tests, 3752, 3753 when the controller is in the Rendezvous state. However during active platooning control it may be desirable to permit larger communication breaks to occur without triggering a dissolve (as for example a second or two) when operating conditions are otherwise in a safe and stable range.

In another example, it may be desirable to limit the amount of time that an active platoon may continue with the vehicles being in different lanes (e.g., 20 seconds, a minute, 5 seconds, etc). This constraint may be enforced by offset monitor 3863, which tracks the amount time that the vehicles are laterally offset and can implement checks to see whether that lane offset has persisted beyond a designated threshold period. In some designs it may be desirable to have similar constraints on lateral offset operation for the system to be deemed ready for platooning. However, in other applications, lateral offset during initiation of a platoon may be encouraged (e.g., by not putting any constraints on the time that the vehicles are laterally offset n the Rendezvous, System Ready and Ready to Platoon states) or more prohibited (e.g., by the use of a check that fails if lateral offset is detected). Thus, it should be appreciated that the amount of time that platooning is permitted with the vehicles laterally offset may vary widely base on system design goals.

In some circumstances the detection of certain conditions may trigger a change in the type of platoon control that is employed. For example, if the lead vehicle changes lanes during active platoon control so that it is laterally offset from the trailing vehicle, the tracker may no longer be able to "see" the back of the lead vehicle. If communications are stable, it may be desirable to transition from a gap control mode to a relative velocity control mode that causes the trailing vehicle to being dropping back at a controlled rate until the back of the lead vehicle can be "seen" again by the tracking unit without triggering a dissolve. However, another check or trigger may be used to initiate a dissolve if an excessive amount of time lapses without the tracking unit being able to relocate the back of the front vehicle.

In another example, the detection of some circumstances or events may make it appropriate to increase (or shorten) the target gap during platooning. For example, if there is traffic ahead of the lead vehicle that is traveling at approximately the same speed as the platoon, but is closer than desired, one appropriate response may be to increase the gap between the platoon partners. Of course a wide variety of other control schemes can readily be employed as well.

The checks (or a set of generally similar checks) preferably continue even after the platoon controller has transitioned to the Maintain Platoon state 3629, 3649. If a check fails during active platoon control, the platoon controllers would typically transition to the Dissolve Platoon state 3631, 3651 which orchestrates the dissolution of the platoon.

Figure 39:
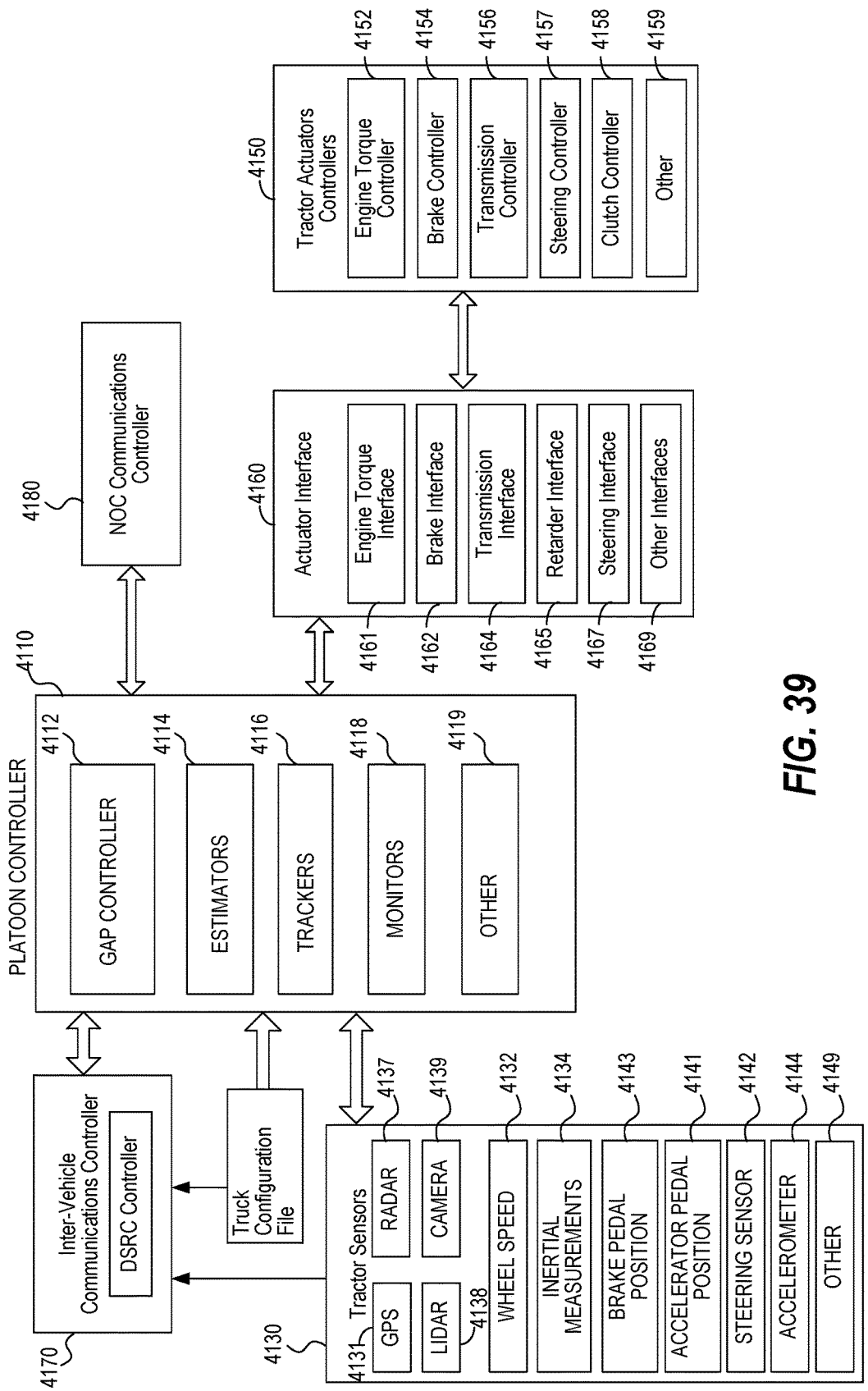
FIG. 39 is a block diagram of an alternative controller architecture suitable for use in an automated or partially automated vehicle control system that supports platooning.

An alternative platoon controller architecture embodiment is diagrammatically illustrated in FIG. 39. The illustrated architecture is suitable for use with platooning tractor-trailer trucks. The specific controller illustrated is primarily designed for use in conjunction with a platooning system in which both vehicles include an active driver, with the driver of the lead vehicle being fully responsible for control of the front vehicle. The a driver of the trailing vehicle is responsible for steering the trailing vehicle, but the platoon controller 4110 is primarily responsible for controlling the trailing vehicles torque and braking requests during active platooning. However it should be appreciated that generally similar control schemes can be used in systems which contemplate more automated or fully automated control of one or both of the platoon partners.

In the illustrated embodiment illustrated in FIG. 39, a platoon controller 4110, receives inputs from a number of sensors 4130 on the tractor and/or one or more trailers or other connected units, and a number of actuators and actuator controllers 4150 arranged to control operation of the tractor's powertrain and other vehicle systems. An actuator interface 4160 may be provided to facilitate communications between the platoon controller 4110 and the actuator controllers 4150. The platoon controller 4110 also interacts with an inter-vehicle communications controller 4170 which orchestrates communications with the platoon partner and a NOC communications controller 4180 that orchestrates communications with a network operations center (NOC). The vehicle also preferably has selected configuration files 4190 that include known information about the vehicle.

Some of the functional components of the platoon controller 4110 include gap controller 4112, a variety of estimators 4114, one or more partner vehicle trackers 4116 and various monitors 4118. In many applications, the platoon controller 4110 will include a variety of other components 4119 as well. Exemplary embodiments of the platoon controller 4110 and gap controller 4112 are described in more detail below with reference to FIGS. 40 and 41.

Some of the sensors utilized by the platoon controller 4110 may include GNSS (GPS) unit 4131, wheel speed sensors 4132, inertial measurement devices 4134, radar unit 4137, LIDAR unit 4138, cameras 4139, accelerator pedal position sensor 4141, steering wheel position sensor 4142, brake pedal position sensor 4143, and various accelerometer 4144. Of course, not all of these sensors will be available on all vehicles involved in a platoon and not all of these sensors are required in any particular embodiment. A variety of other sensor 4149 (now existing or later developed or commercially deployed) may be additionally or alternatively be utilized by the platoon controller in other embodiments. In the primary embodiments described herein, GPS position data is used. However, GPS is just one of the currently available global navigation satellite systems (GNSS). Therefore, it should be appreciated that data from any other GNSS system or from other suitable position sensing systems may be used in place of, or in addition to the GPS system.

Many (but not all) of the described sensors, including wheel speed sensors, 4132, radar unit 4137, accelerator pedal position sensor 4141, steering wheel position sensor 4142, brake pedal position sensor 4143, and accelerometer 4144 are relatively standard equipment on newer trucks (tractors) used to pull semi-trailers. However, others, such as the GNSS unit 4131 and LIDAR unit 4138 (if used) are not currently standard equipment on such tractors or may not be present on a particular vehicle and may be installed as needed or desired to help support platooning.

Some of the vehicle actuators controllers 4150 that the platoon controller may direct at least in part include engine torque controller 4152 (which is often part of the integrated functionality of an engine control unit (ECU) or power train control module (PCM)); transmission controller 4154; brake controller 4156; steering controller 4157 (when automated steering is provided); and clutch controller 4158. Of course, not all of these actuator controllers will be available or are required in any particular embodiment and it may be desirable to interface with a variety of other vehicle actuator controllers 4159 that may be available on the controlled vehicle as well. Therefore, it should be appreciated that the specific actuator controllers 4150 directed or otherwise utilized by the platoon controller on any particular controlled vehicle may vary widely. Further, the capabilities of any particular actuator controller (e.g. engine torque controller 4152), as well as its interface (e.g., the nature and format of the commands, instructions, requests and messages it can handle or generate) will often vary with the make and model of that particular actuator controller. Therefore, an actuator interface 4160 is preferably provided to translate requests, commands, messages and instructions from the platoon controller 4110 into formats that are appropriate for the specific actuator controller hardware and software utilized on the controlled vehicle. The actuator interface 4160 also provides a mechanism for communicating/translating messages, commands, instructions and requests received from the various actuator controllers back to the platoon controller 4110. Typically an appropriate actuator interface would be provided to interact with each of the specific vehicle controllers utilized. In various embodiments, this may include one or more of: an engine torque interface 4161; a brake interface 4162; a transmission interface 4164; a retarder interface 4165 (if a separate retarder controller is used); a steering interface 4167; and/or any other appropriate controller interface 4169.

Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder will be controlled by the engine torque controller 4152 and in such embodiments, the retarder can be controlled by sending appropriate torque commands (which may be negative) to the engine torque controller 4152. In other embodiments a separate retarder controller (not shown) may be accessible to, and therefore directed by, platoon controller 4110 through an appropriate retarder interface 4165.

The communications between vehicles may be directed over any suitable channel and may be coordinated by inter-vehicle communications controller 4170. By way of example, the Dedicated Short Range Communications (DSRC) protocol, which is a two-way short to medium range wireless communications technology that has been developed for vehicle to vehicle communications, works well. The specific information transmitted back and forth between the vehicles may vary widely based on the needs of the platoon controller.

The communications between vehicles may be directed over any suitable channel and may be coordinated by inter-vehicle communications controller 4170. By way of example, the Dedicated Short Range Communications (DSRC) protocol (e.g. the IEEE 802.11p protocol), which is a two-way short to medium range wireless communications technology that has been developed for vehicle to vehicle communications, works well. Of course other communications protocols and channels may be used in addition to or in place of a DSRC link. For example, the inter vehicle communications may additionally or alternatively be transmitted over a Citizen's Band (CB) Radio channel, one or more General Mobile Radio Service (GMRS) bands, and one or more Family Radio Service (FRS) bands or any other now existing or later developed communications channels using any suitable communication protocol.

In various embodiments, the transmitted information may include the current commands generated by the platoon controller 4110 such as requested/commanded engine torque 4280, requested/commanded braking deceleration 4282. They may also include steering commands, gear commands, etc. when those aspects are controlled by platoon controller 4110. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the tractor sensor information provided to platoon controller 4110 is also transmitted to the platoon partner and corresponding information is received from the platoon partner so that the platoon controllers 4110 on each vehicle can develop an accurate model of what the partner vehicle is doing. The same is true for any other relevant information that is provided to the platoon controller, including any vehicle configuration information 4190 that is relevant to the platoon controller. It should be appreciated that the specific information transmitted may vary widely based on the requirements of the platoon controllers 4110, the sensors and actuators available on the respective vehicles, and the specific knowledge that each vehicle may have about itself.

The information transmitted between vehicles may also include information about intended future actions. For example, if the lead vehicle knows it approaching a hill, it may expect to increase its torque request (or decrease its torque request in the context of a downhill) in the near future and that information can be conveyed to a trailing vehicle for use as appropriate by the platoon controller 4110. Of course, there is a wide variety of other information that can be used to foresee future torque or braking requests and that information can be conveyed in a variety of different forms. In some embodiments, the nature of the expected events themselves can be indicated (e.g., a hill, or curve or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as the cellular network, various Wi-Fi networks, satellite communications networks and/or any of a variety of other networks as appropriate. The communications with the NOC may be coordinated by NOC communications controller 4180. The information transmitted to and/or received from the NOC may vary widely based on the overall system design. In some circumstances, the NOC may provide specific control parameters such as a target gap tolerance. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to the platoon controller. The NOC may also provide information about the partner vehicle including its configuration information and any known relevant information about its current operational state such as weight, trailer length, etc.

The configuration file 4190 may include a wide variety of information about the host vehicle that may be considered relevant to the controller. By way of example, some of the information might include the vehicle's specification including such things as engine performance characteristics, available sensors, the nature of its braking system, the location of its GNSS antenna relative to the front of the cab, gear ratios, differential ratios etc.

Figure 40:
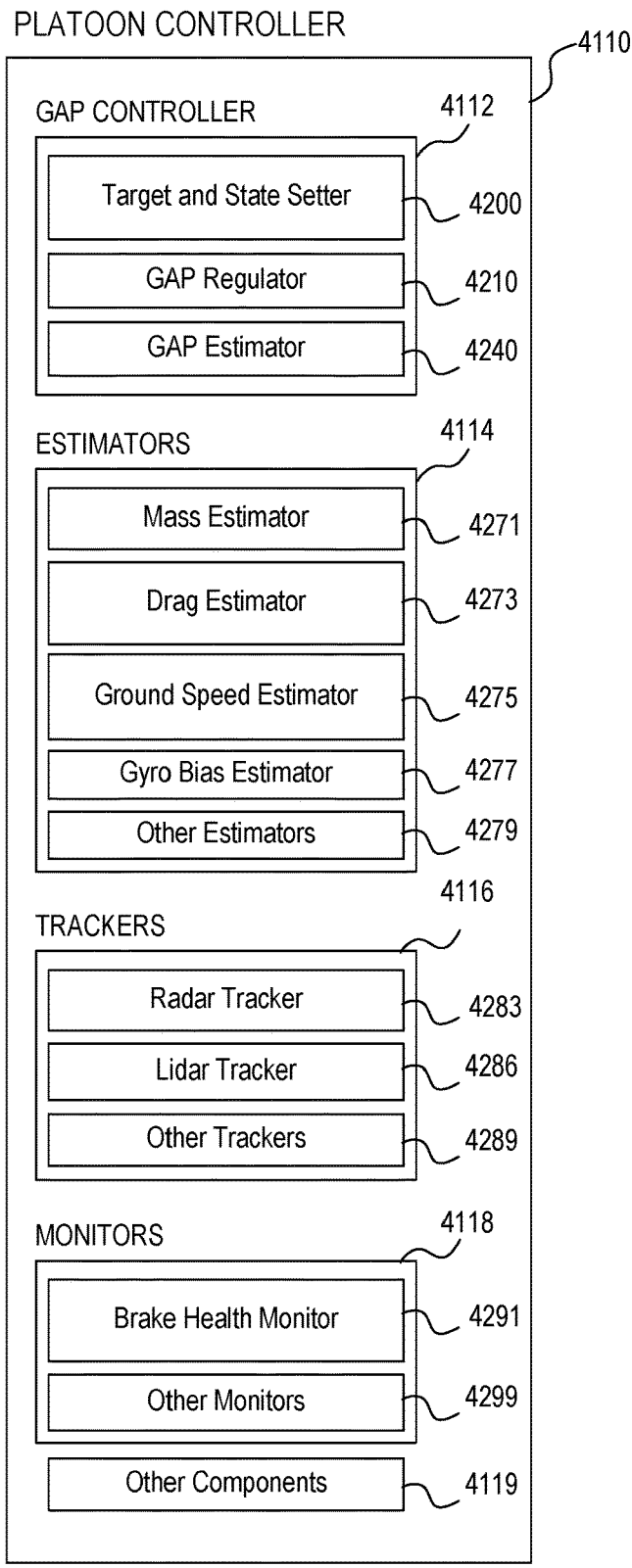
FIG. 40 is a block diagram of a representative platoon controller architecture suitable for use in the automatic or partially automated vehicle control system of FIG. 39.

FIG. 40 illustrates a particular embodiment of a platoon controller 4110. In the illustrated embodiment, the platoon controller 4110 includes a gap controller 4112, a plurality of estimators 4114, one or more trackers 4116, any desired monitors 4118 and potentially any of a variety of other components 4119.

In the illustrated embodiment, the gap controller 4112 includes a target and state setter 4200, a gap regulator 4210 and a gap estimator 4240. In general, the target and state setter 4200 is arranged to determine the intended operational mode (state) of the gap regulator 4210 and the values of any variable control parameters that are appropriate for use in that operational mode.

The gap regulator 4210 is arranged to control the trailing platoon partner in the manner designated by the target and state setter 4200. In the gap control operational mode, the gap regulator 4210 controls the vehicle in a manner that seeks to attain and maintain the desired gap in accordance with any designated control parameters specified by the state setter 4200. In other modes, the gap regulator 4210 controls the vehicle in a manner that seeks to attain the appropriate response for the selected operational mode.

The gap estimator 4240 is arranged to estimate/determine the current gap based on actual measurements and/or other information that is available to the platoon controller 4110. It should be apparent that an accurate understanding of the current gap is important to successful operation of the gap regulator. At the same time, it should be appreciated that any measurement system has inherent tolerances and can be subject to reporting errors and/or may become unavailable in some circumstances. Thus, the gap estimator 4240 is configured to receive information from multiple position or relative position related sensors and to fuse such data into a reliable estimate of the current gap.

The torque and braking requests generated by GAP regulator 4210 are sent to the appropriate actuator interface (e.g., engine torque interface 4161 and brake interface 4162 respectively). The engine torque interface 4161 then forwards an appropriate torque command to engine torque controller 4152 which directs the delivery of the requested torque by directing various engine operating parameters such as fuel charge, valve timing, retarder state, etc. appropriately. The brake interface 4162 generates an appropriate brake request that is sent to the brake controller 4156.

A particular embodiment of gap controller 4112 is described in more detail below with reference to FIG. 41.

Returning to FIG. 40, there are a variety of estimators 4114 that are useful for the gap controller 4112. In various embodiments these may include one or more of a mass estimator 4271, a drag estimator 4273, a ground speed estimator 4275, a gyro bias estimator 4277 and/or other estimators 4279.

The mass estimator 4271 is arranged to estimate the respective masses of the platoon partners. These mass estimations may be used by the gap controller 4112 to help scale its torque and brake requests appropriately based on the respective weights (masses) of the platoon partners.

The drag estimator 4273 is arranged to estimate the respective drag resistances of the platoon partners. These drag resistance estimates may also be used by the gap controller to help adjust its torque and brake requests appropriately. In general, the drag resistance of any particular truck or other vehicle can vary based on a variety of factors including: (a) its drag profile (which in the context of a truck may change based on the trailer being pulled—if any, or other characteristics of the load); (b) the vehicle's current speed, (c) wind speed and direction, (d) rolling resistance, (e) platoon state (e.g., whether a platoon is active, the position of the vehicle within the platoon, the gap), (f) bearing wear, etc.

The ground speed estimator 4275 is arranged to estimate the actual ground speed of the respective platoon partners. Many trucks and other vehicles have wheel speed sensors that can quite accurately measure the rotational speed of the associated wheels. The actual ground speed at which the vehicles are traveling will vary based on the respective diameters of the wheels and slip conditions of the tires. The precise diameter of the wheels can vary based on the tires used. Furthermore, the diameter of the wheels will vary over time with tire wear, changes in ambient temperature and other factors. The wheel diameter will even change over the course of a particular trip as the tires heat up (or otherwise change in temperature) during use. In practice, all of these variations in wheel diameter are potentially significant enough to impact the gap estimation and gap control. Therefore, the ground speed estimator 4275 is arranged to estimate the actual ground speed based on measured wheel speed and other available information such as GNSS information. The ground speed estimates are particularly useful in times when tracker based gap measurements (e.g., radar, cameras, LIDAR, etc.) aren't available—which may occur, for example, when the platoon partners are laterally offset due to a lane change, etc.

Several of the measurements utilized by the gap controller 4112 are inertial measurements that are gyro based. These may include yaw measurements which indicate the rate at which the associated vehicle is turning, longitudinal acceleration measurements, etc. Gyros often have an inherent measurement error referred to as a gyro bias that can affect measurements. The gyro bias estimator 4277 estimates such biases to allow the gap controller to compensate for such gyro based measurement errors.

The platoon controller 4110 can include any other estimators 4279 that may be useful to any particular gap controller 4112 as well.

The platoon controller 4110 may also include one or more trackers 4116. Each tracker 4116 is arranged to measure or otherwise determine the gap. One type of tracker that is used in many implementations is a radar based radar tracker 4283. Newer commercially available trucks often come equipped with a radar unit as standard equipment and radar trackers are particularly well suited for use in such vehicles. Of course, one or more radar units may be installed on any vehicle that does not come pre-equipped with a radar unit to facilitate use of radar tracker 4283. By way of example, some specific radar trackers are described in more detail in co-pending U.S. application Ser. Nos. 15/590,715 and 15/590,803, both filed May 9, 2017, both of which are incorporated herein by reference.

LIDAR is another distance measuring technology that is well suited for measuring the gap between vehicles. LIDAR is quickly gaining popularity for use in automated and autonomous driving applications. LIDAR tracker 4286 is well suited for use on vehicles that have or are provided with LIDAR units. Cameras and stereo cameras are also becoming more popular distance measuring tools for use in various automated and autonomous driving applications.

Of course, other distance measuring technologies can be used to measure or estimate the gap between vehicles as represented by other trackers 4289. By way of example, a GPS tracker could be used that is based primarily on the respective reported GPS positions of the vehicles.

The tracker(s) used in many embodiments are configured to fuse data from multiple sensors to help validate the measurements of the primary sensors used by the respective trackers. The aforementioned radar tracker application describes a variety of methods for fusing data to help validate measurements of a primary sensor in that manner.

In various embodiments, the gap estimator 4240 could replace or be replaced by one or more of the trackers, or could be thought of as a tracker itself since it determines/estimates the gap based on inputs from multiple sensors. In the illustrated embodiment, the gap estimator 4240 is shown separately as part of gap controller 4112 since it fuses distance data from the tracker(s) and any other available sources such as GNSS sensors on each of the vehicles.

The platoon controller 4110 may also include one or more monitors 4118 that are configured to monitor specific components that are relevant to gap control. By way of example, one specific monitor that is particularly useful to the control of platooning trucks is brake health monitor 4291. The brake health monitor 4291 is configured to monitor the brake system and to identify circumstances in which the brakes may not be able to deliver the level of braking normally expected for platoon control—as for example could occur if the foundation brakes include drum brakes that have been used while traveling downhill in the mountains to the extent that they are close to overheating. If the brake health monitor 4291 identifies such a circumstance, it informs the platoon controller, which can take the appropriate remedial action. The appropriate remedial action will vary based on the specific circumstances identified by the brake health monitor, but may include, for example, actions such as dissolving the platoon, increasing the target gap to a level more appropriate for the brake conditions, etc. Of course, the brake health monitor can also configured to identify circumstances in which the condition of the brakes has improved (e.g., the brakes have cooled sufficiently) and inform the platoon controller of those circumstances as well so that the platoon controller can act accordingly. For example, improved braking status may allow the target gap to be reduced, a platoon to be reestablished or other appropriate actions.

The platoon controller may include any of a variety of other monitors 4299 that are configured to monitor the state or status of other components, systems, environmental conditions, road or traffic conditions, etc. that may be relevant to platoon control. For example, a DSRC link monitor may be provided to monitor the status of a DSRC communication link between the platoon partners.

Referring next to FIG. 41, another embodiment of gap controller 4112 will be described in more detail. Similarly to the embodiment illustrated in FIG. 2, the gap controller 4112 includes a target and state setter 4200, a gap regulator 4210 and a gap estimator 4240. In the embodiment of FIG. 3, the target and state setter 4200 includes an operating state selector 4203, and a control parameter selector 4206 that determines, selects, sets or otherwise indicates to the gap regulator the values of any variable control parameters that are appropriate for use in the selected operational mode.

The operating state selector 4203 is arranged to determine the intended operational mode (state) of the gap regulator 4210. In some specific embodiments, the operational modes might include a "normal" or "gap control" operational mode in which the gap regulator is configured to control towards attaining an maintaining a designated gap between the vehicles. In the gap control operational mode control parameter variables dictated by the control parameter selector might include the target gap itself (e.g. 10 m, 12 m, etc.)—which may vary somewhat based on driving conditions (e.g., weather, terrain, road conditions, traffic, etc.). Other control parameters during normal operation may include parameters that impact the draw-in speed, the tightness of the control, tolerances or variations between torque control and braking control, etc. In other embodiments, "initiate platoon" and/or "draw-in" or "pull-in" may be one or more separate states that are used to establish a platoon and/or to bring the platoon partners together in a safe manner under at least partially automated control.

Another potential operational mode is a "dissolve" mode in which the platoon controller transitions the trailing vehicle toward/to a position at which the driver of the trailing vehicle (or an automatic cruise control system) can safely take over control of the vehicle. Generally, dissolving a platoon includes increasing the gap between the vehicles in a controlled manner to/towards a point at which the platoon can be dissolved and vehicle control can be safely transferred to manual control by the driver or to control through the use of a different system such as adaptive cruise control. The dissolve mode may optionally be triggered by a wide variety of different circumstances, as for example, in response to one of the platoon partners or the NOC deciding to terminate the platoon; the detection of a car cutting-in between the platooning vehicles; the loss of communications between the vehicles for an extended period; the detection of an object in front of the lead vehicle that is too slow or too close to the platoon; etc.

Another potential operational mode may be a velocity control or relative velocity control mode. Velocity control, or relative velocity control may be preferable to trying to control to maintain a particular gap in a variety of specific circumstances—as for example when the trailing vehicle's radar (or other) tracking unit loses sight of the partner vehicle, as can occur when there is a lateral offset between the vehicles due to a lane change or other conditions.

Of course, there can be a variety of other operational modes as well.

The gap regulator 4210 is arranged to control the trailing platoon partner in the manner designated by the target and state setter 4200. In the embodiment illustrated in FIG. 3, the gap regulator 4210 includes a scaler 4212 and two separate controllers which are used in different combinations in different operating modes. In the illustrated embodiment, the controllers include a sliding mode controller 4215 (which performs gap control) and a velocity/relative velocity controller 4218. It should be appreciated that in other embodiments, a single controller, additional and/or different may be provided as appropriate for any particular implementation.

In the illustrated embodiment, the feed forward scaler 4212 is configured to scale the torque and brake signals from the front vehicle before adding them to the outputs from the sliding mode and relative velocity controllers 4215, 4218 to create the torque and brake request to the engine and brake controllers. Such scaling may be based on factors such as the respective weights (masses) of the platoon partners, the respective drags of the vehicles, the severity of a braking event (e.g., in high braking scenarios, the braking command may be increased a bit to provide a margin of safety to account for uncertainties in braking performance and reactions times), etc. In other embodiments, such scaling functions can be integrated into the respective controllers themselves if desired.

The sliding mode controller 4215 is configured to control the trailing vehicle in a manner that seeks to attain and maintain the desired gap in accordance with the target gap and any other control parameters specified by the control parameter selector 4206. Thus, its primary function is gap control. The velocity controller 4218 is configured to control the trailing vehicles in a manner that maintains a designated velocity relative to the lead vehicle, or in some circumstances, simply a designated velocity. In the illustrated embodiment, these two separate controllers are provided so that the gap regulator 4210 can provide different types of control, as may be appropriate in different operational circumstances. A few specific examples are described with reference to FIGS. 42A-42C. In the described embodiments, both the controllers 4215 and 4218 are operated continuously during platooning and the selector/adder 4250 is used to select the appropriate signals to output based on the current operating mode. An optional braking monitor 4255 is a safety feature that may be utilized to help ensure that the brake commands outputted by selector/adder 4250 don't overly aggressively brake the trailing vehicle except in where necessary from a safety/crash prevention standpoint. This is to reduce the risk of traffic behind the trailing platoon partner from being impacted by unexpected aggressive braking of the trailing platoon partner.

Figure 43:
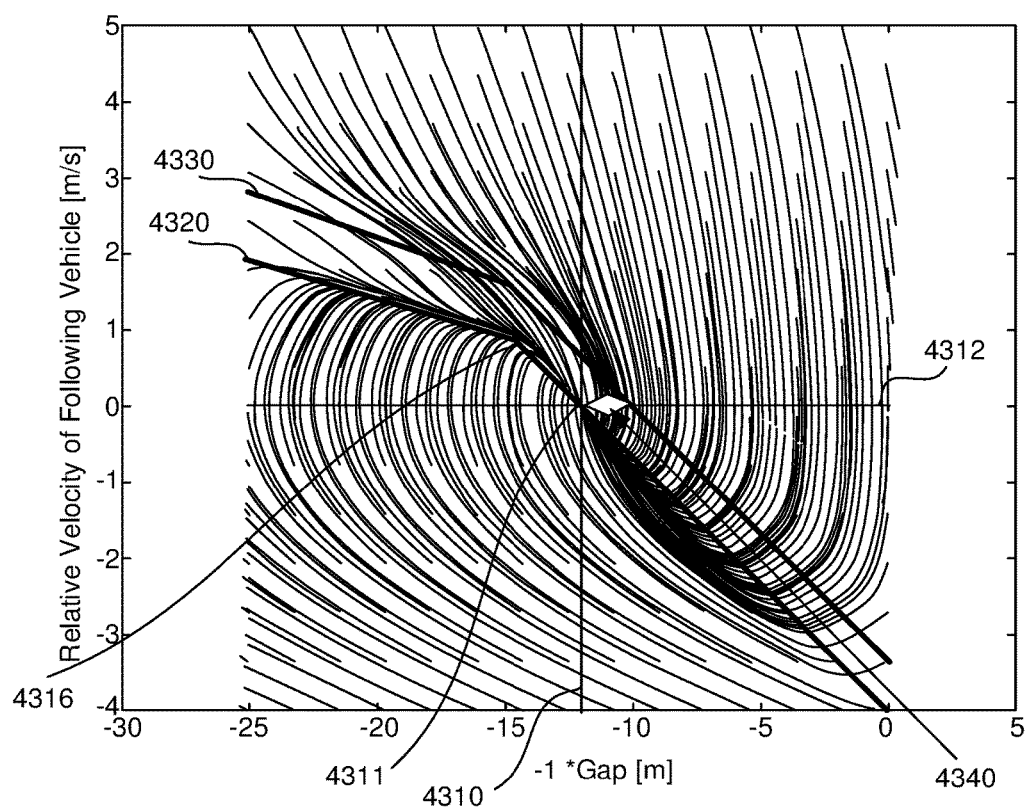
FIG. 43 is a state space diagram illustrating a sliding mode control scheme.

The sliding mode controller 4215 is arranged to control the trailing vehicle in a manner such that its relative velocity relative to the front vehicle varies as a function of the gap between the vehicles. This characteristic is illustrated in the state space diagrams of FIG. 43 which show a control scheme in accordance with one specific implementation. More specifically, FIG. 43 plots relative velocity between the vehicles (the Y-axis) vs. gap between the vehicles (the X-axis). FIG. 43 also show a torque request controller target control line 4320. In the illustrated embodiment, the nominal desired gap is 12 meters—which is represented by line 4310. Thus, the target control point 4311 is 12 meters with zero relative velocity, which is the point represented by the intersection of line 4310 (12 meters gap) and line 4312 (zero relative velocity).

The torque request controller component 4221 of gap regulator 4210 is configured to generate a torque request that is appropriate to control the gap in accordance with target control line 4320. The torque request is then implemented by engine torque controller 4152. As can be seen in FIG. 43, when the gap is larger than the desired gap, the rear truck is controlled to travel slightly faster than the front truck is traveling such that the relative velocity of the rear truck has a small positive value. As the rear truck draws closer to the lead truck, its relative velocity is reduced in a smooth manner until the gap is reduced to the target control point 4311, at which point the relative velocity would be zero if perfect control were attained. If the rear truck gets closer than the desired gap, it is slowed so that it has a negative relative velocity relative to the lead truck to reestablish the desired gap.

The sliding mode controller 4215 utilizes a unified sliding mode control scheme during both the "pull-in" and gap maintenance stages of platooning. Configuring the sliding mode controller to control towards target control line 4320 helps ensure that the relative speed vs. gap relationship stays within the region of safe operation illustrated in FIG. 17A.

In the embodiment illustrated in FIG. 41, the sliding mode controller 4215 includes separate controllers (e.g. torque request controller 4221 and brake request generator components 4223) which are configured to control towards different gap control targets. The different control targets are illustrated in the state space diagrams of FIG. 43 which show a control scheme in accordance with one specific implementation. More specifically, FIG. 43 shows a brake request controller target control line 4330 in addition to torque request controller target control line 4320. FIG. 43 additionally shows representative transition paths from various points in the state space to the torque request target control line 4320.

For most open highway driving conditions, modulating the torque request alone is sufficient to control the gap appropriately without requiring the use of the foundation brakes. This is in part because the torque request can be negative to a certain degree without needing to actuate the foundation brakes through the use of engine braking and/or the retarder (if available). As mentioned above, when fuel is cut-off there will be some pumping losses and some frictional losses in the powertrain, so some level of negative torque can be provided while using normal valve timing by simply reducing the fuel charge appropriately. When larger negative torque is needed, the engine torque controller 4152 can create larger negative torques by actuating the retarder and/or by taking other appropriate measures.

Separately, the brake request controller component 4223 of gap regulator 4210 is arranged to generate brake requests during normal operation that are generally arranged to maintain a different gap—specifically a smaller gap—than the torque request controller 4221 targets. This difference in the gaps that the torque and brake request controllers control to is sometimes referred to herein as the gap tolerance 4340. In general, brake requests 4213 are not generated unless or until the gap is reduced at least the gap tolerance below the torque request target control line 4320. Since the brakes can only be used to slow the vehicle, the effect of this difference is that the trailing truck will be allowed to creep in a relatively small amount (2 meters in the example) before the foundation brakes are actuated when the gap regulator 4210 cannot maintain the desired gap through control of the torque request alone. When the desired gap can be restored by modulating the torque requests alone without crossing target brake control line 4330, then the foundation brakes do not need to be used at all. This has the effect of safely maintaining a gap while reducing the probability that the foundation brakes will be deployed unnecessarily.

Figure 42A:
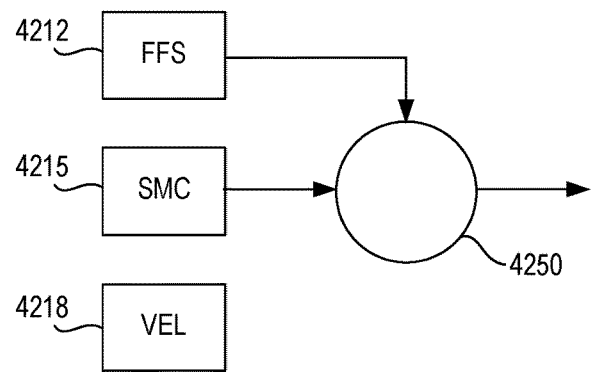
FIGS. 42A-42C are a series of diagrams illustrating different control states used by a gap regulator in accordance with one embodiment during different operational states.

Normal gap control is illustrated in FIG. 42A. During normal gap control, the sliding mode controller 4215 is use to determine torque and brake requests that are appropriate to attain and maintain the target gap set by control parameter selector 4206. When appropriate, the torque and brake requests generated by the sliding mode controller 4215 may be scaled appropriately by selector/adder 4250 based on inputs from feed forward scaler 4212. In this normal gap control mode, the outputs of the relative velocity controller 4218 are not used in the control of the trailing vehicle.

In some embodiments, the sliding mode controller 4215 includes separate torque request and brake request controllers 4221, 4223 as illustrated in FIG. 41. The torque request and brake request controllers 4221, 4223 are configured to control the engine and brakes respectively towards different gap targets which tends to provide a smoother, more comfortable ride and reduce the use of wheel brakes (e.g., the foundation brakes in tractor-trailer rigs) compared to control in which the engine and brakes are controlled to the same target gap. Such a gap control architecture is described in more detail in U.S. Provisional application No. 62/489,662, which is incorporated herein by reference.

Although the sliding mode controller 4215 works very well to control the gap, there will be operational circumstances in which different types of control may be appropriate. For example, a different type of control may be desirable when it is necessary to dissolve a platoon and return the trailing vehicle to manual or other automated control. Typically, the gap between vehicles during platooning will be smaller, often much smaller, than can safely be maintained by a driver under manual control. Therefore, in general, when a platoon is dissolved with the intent to restoring manual control of the trailing vehicle, it will be desirable to grow the gap to a distance that is appropriate for manual control before relinquishing control to the driver. This can be accomplished in a smooth manner by relative velocity controller 4218.

Figure 42B:
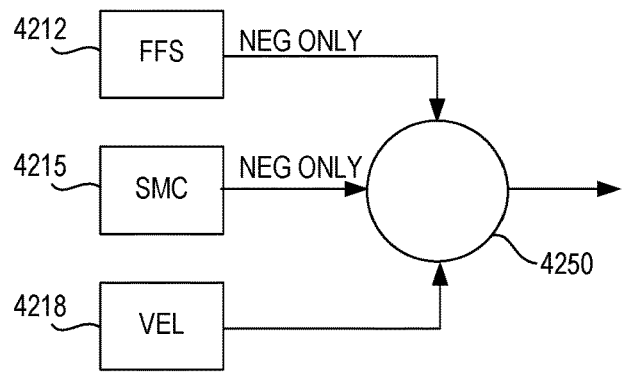

When operating state selector 4203 determines that the platoon should be dissolved, it directs the GAP regulator 4210 to transition to a dissolve mode as represented by FIG. 42B. In the dissolve mode, primary control is provided by relative velocity controller 4218. The control parameter selector 4206 may designate a desired (target) relative velocity for the trailing truck during the dissolve. The specific target relative velocity may vary based on the nature of the circumstances and/or the vehicles involved in the platoon. In general, it is desirable to select a relative velocity that will cause the vehicles to gradually, but expeditiously separate, without requiring the trailing vehicle to slow excessively (which could unduly hinder following traffic) and preferably without requiring the lead vehicle to alter its drive plan. By way of example, relative velocities during dissolves on the order of 0.5 to 4 meters per second, as for example, 1-2 m/s, have been found to work well in the context of platooning trucks.

During a dissolve, the lead vehicle may take a variety of actions. For example, the lead truck may accelerate or increase its torque command aggressively. In such cases, it may not be desirable to try to accelerate the trailing truck in a similar manner thereby allowing the lead vehicle to pull away more than would otherwise occur under relative velocity control. One way to accomplish this in the context of platooning trucks is to ignore or otherwise disable positive torque commands from feed forward scaler 4212.

Another potential scenario is that the lead truck brakes or slows significantly while under velocity control. In some circumstances, the velocity controller 4218 may be configured to permit a certain amount of gap shrinkage when the gap is relatively larger to thereby reduce the overall amount of braking required. In the illustrated embodiment, the sliding mode controller is configured to ensure that the gap between the vehicles is always sufficient to give the trailing vehicle sufficient time to respond in a manner that prevents the trailing vehicle from running into the back of the lead vehicle regardless of the occurrence of (reasonable) unexpected events. Therefore, if the sliding mode controller is outputting a braking or negative torque signal that has a greater magnitude than the relative velocity controller, then that larger braking/negative torque command should be passed to the vehicle's engine and braking controllers. Therefore, during a dissolve, the selector/adder 4250 is configured to only utilize negative commands (i.e., braking commands and negative torque commands) from the sliding mode controller 4215 and to only use such commands when they are greater in magnitude than the commands from the relative velocity controller 4218.

There may also be operational circumstances outside of dissolves in which relative velocity control or simply velocity control is desired. For example, there may be circumstances in which the back of the lead vehicle moves out of view of the trailing vehicle's tracker(s) 4116 or the tracker(s) 4116 otherwise loses sight of the back of the platoon partner. This can occur, for example, as a result of a lane change by one of the platoon partners. In such a circumstance the gap regulator may not have an accurate measure of the longitudinal gap between the vehicles—and may have to rely on less accurate approaches for determining the gap such as the vehicle's respective GNSS positions. In such circumstances, it may be desirable to control the trailing vehicle to slowly drop back until the back of the lead vehicle comes within the tracker's view. Again, the relative velocity controller 4218 is well suited for use in this circumstance—although the preferred relative velocity control may be a bit different than occurs during a dissolve. Specifically, the goal is typically not to drop back as quickly or as far as would occur during a dissolve—thus a smaller relative velocity (e.g. 0.5 m/s vs. 2 m/s), may be appropriate.

Figure 42C:
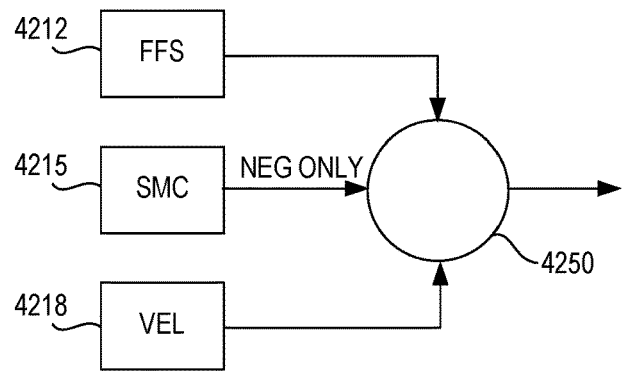

One approach to such relative velocity control is illustrated in FIG. 42C. In the velocity control scheme of FIG. 42C velocity controller 4218 is used in conjunction with normal scaling from feed forward scaler 4212. This causes the trailing platoon partner to better follow lead vehicle accelerations and/or torque increases than occurs during the dissolve state illustrated in FIG. 42B. At the same time, for safety purposes, braking requests and negative torque request from the sliding mode controller 4215 may be utilized as appropriate by selector/adder 4250 in a manner similar to the approach described above with respect to FIG. 4B.

Although particular platoon and gap controller architectures are illustrated in FIGS. 40 and 41, it should be appreciated that the specific architectures utilized may vary widely to meet the needs of any particular platooning or other automated vehicle control scheme.

As will be apparent to those familiar with the art, the described controllers can be implemented algorithmically using software or firmware algorithms executing on one or more processors, using programmable logic, using digital or analog components or using any combination of the preceding.

In the detailed description above, it is assumed that the controlled power plant is an internal combustion engine, as for example a diesel engine. However, it should be appreciated that the described control approach can be utilized regardless of the nature of the power plant used to provide torque to drive the host vehicle. Therefore, the present embodiments should be considered illustrative and not restrictive and the invention is not to be limited to the details given herein, but may be modified within the scope and equivalents of the appended claims.

In sum, the present invention provides devices, systems and methods for vehicle monitoring and platooning, including in some embodiments various capabilities for semi-automated vehicular convoying as well as systems, processes and methodologies for integrating sensor data with communicated data to yield improved identification of platoon partners as well as providing increased safety for vehicles traveling in close proximity and improved platoon performance. Among the many advantages of such a system are the ability to follow closely together in a safe, efficient, convenient manner, together with improved fuel economy, better fleet management, improved proactive fleet and vehicle maintenance, reduced accident risk, and numerous other benefits.

While this invention has been described in terms of several embodiments, there are alterations, modifications, permutations, and substitute equivalents, which fall within the scope of this invention. In view of the many alternative ways of implementing the methods and apparatuses of the present invention, it is intended that the following appended claims be interpreted as including all such alterations, modifications, permutations, and substitute equivalents as fall within the true scope of the present invention.

The invention claimed is:

1. A method of initiating a platoon between a host vehicle and a platoon partner, the method comprising:
   establishing communications with the platoon partner;
   receiving a message that the platoon partner's platoon control system is ready to platoon;
   determining whether a platoon controller on the host vehicle is ready to platoon, wherein a multiplicity of platooning prerequisite checks must be met before the host vehicle is determined to be ready to platoon;
   sending a host system ready to platoon message to the platoon partner, wherein the host system ready to platoon message is only sent to the platoon partner when the platoon controller on the host vehicle is determined to be ready to platoon and after the platoon partner's platoon control system ready message has been received;
   receiving a platoon partner ready to platoon message indicating that the platoon partner has consented to platooning, wherein the platoon partner ready to platoon message is only received after sending the host system ready to platoon message;
   informing a driver of the host vehicle that the host vehicle is ready to platoon, wherein the driver is only informed that the host vehicle is ready to platoon after the platoon partner ready to platoon message has been received;
   receiving an initiate platoon command from the driver; and
   initiating at least partially automated platoon control of the host vehicle in response to the initiate platoon command.

2. A method as recited in claim 1, wherein the host vehicle includes an engine and brakes and wherein platoon control automatically generates engine torque requests and braking requests suitable for controlling the host vehicle to platoon behind the platoon partner.

3. A method of initiating a platoon between a host vehicle and a platoon partner, the method comprising:
- establishing communications with the platoon partner;
- receiving a message that the platoon partner's platoon control system is ready to platoon;
- determining whether a platoon controller on the host vehicle is ready to platoon, wherein a multiplicity of platooning prerequisite checks must be met before the host vehicle is determined to be ready to platoon, the platooning prerequisite checks including at least (i) verifying that the platoon partner is within a designated range of the host vehicle, (ii) verifying that communications between the host vehicle and the platoon partners are stable, (iii) verifying that a tracking unit on the host vehicle has a fix on the platoon partner, and (iv) verifying that no cut-in vehicle has been detected between the host vehicle and the platoon partner;
- sending a host system ready to platoon message to the platoon partner, wherein the host system ready to platoon message is only sent to the platoon partner when the platoon controller on the host vehicle is determined to be ready to platoon and after the platoon partner's platoon control system ready message has been received;
- receiving a platoon partner ready to platoon message indicating that the platoon partner has consented to platooning, wherein the platoon partner ready to platoon message is only received after sending the host system ready to platoon message;
- informing a driver of the host vehicle that the host vehicle is ready to platoon, wherein the driver is only informed that the host vehicle is ready to platoon after the platoon partner ready to platoon message has been received;
- receiving an initiate platoon command from the driver; and
- initiating at least partially automated platoon control of the host vehicle in response to the initiate platoon command.

4. A method as recited in claim 3 wherein determining whether the platoon controller on the host vehicle is ready to platoon further includes:
- verifying that at least two of platoon partner speed, host vehicle speed, and relative speed of the host vehicle relative to the platoon partner are within approved platooning limits;
- verifying that current decelerations of the host vehicle and platoon partner do not exceed approved thresholds; and
- verifying that transitioning to platoon control at the current time would not cause generation of a braking request exceeding a designated braking request threshold.

5. A method as recited in claim 3 wherein the platooning prerequisite checks include verifying that the platoon partner is currently in a ready to platoon state.

6. A method of initiating a platoon between a host vehicle and a platoon partner, the method comprising:
- establishing communications with the platoon partner;
- receiving a message that the platoon partner's platoon control system is ready to platoon;
- determining whether a platoon controller on the host vehicle is ready to platoon, wherein determining whether the platoon controller on the host vehicle is ready to platoon includes (i) verifying that the platoon partner is currently in a ready to platoon state, (ii) verifying that the platoon partner is within a designated range of the host vehicle, (iii) verifying that communications between the host vehicle and the platoon partners are stable, and (iv) verifying that a tracking unit on the host has a fix on the platoon partner;
- sending a host system ready to platoon message to the platoon partner, wherein the host system ready to platoon message is only sent to the platoon partner when the platoon controller on the host vehicle is determined to be ready to platoon and after the platoon partner's platoon control system ready message has been received;
- receiving a platoon partner ready to platoon message indicating that the platoon partner has consented to platooning, wherein the platoon partner ready to platoon message is only received after sending the host system ready to platoon message;
- informing a driver of the host vehicle that the host vehicle is ready to platoon, wherein the driver is only informed that the host vehicle is ready to platoon after the platoon partner ready to platoon message has been received;
- receiving an initiate platoon command from the driver; and
- initiating at least partially automated platoon control of the host vehicle in response to the initiate platoon command.

7. A method as recited in claim 6 further comprising:
verifying that a current deceleration of the platoon partner does not exceed an designated deceleration thresholds.

8. A method as recited in claim 6 further comprising:
verifying that no cut-in vehicle has been detected between the host and the platoon partner.

9. A method as recited in claim 6 further comprising:
verifying that the platoon partner is currently confirming that it is receiving stable communications from the host vehicle.

10. A method as recited in claim 6 further comprising:
verifying that transitioning to platoon control at the current time would not cause generation of a braking request exceeding a designated braking request threshold.

11. A method as recited in claim 6 further comprising:
verifying that at least two of platoon partner speed, host vehicle speed, and relative speed of the host vehicle relative to the platoon partner are within approved platooning limits.

12. A method of initiating a platoon between a host vehicle and a platoon partner, the method comprising:
- establishing communications with the platoon partner;
- receiving a message that the platoon partner's platoon control system is ready to platoon;
- determining whether a platoon controller on the host vehicle is ready to platoon, wherein a multiplicity of platooning prerequisite checks must be met before the host vehicle is determined to be ready to platoon, and wherein the platoon controller on the host vehicle includes a state machine that determines the state of the platoon controller, and wherein available states of the state machine when the host vehicle is designated a trailing vehicle include: a rendezvous state, a back system ready state, a back ready to platoon state, a back maintain platoon control state, and a back dissolve platoon state;
- sending a host system ready to platoon message to the platoon partner, wherein the host system ready to platoon message is only sent to the platoon partner when the platoon controller on the host vehicle is determined to be ready to platoon and after the platoon partner's platoon control system ready message has been received;

receiving a platoon partner ready to platoon message indicating that the platoon partner has consented to platooning, wherein the platoon partner ready to platoon message is only received after sending the host system ready to platoon message;

informing a driver of the host vehicle that the host vehicle is ready to platoon, wherein the driver is only informed that the host vehicle is ready to platoon after the platoon partner ready to platoon message has been received;

receiving an initiate platoon command from the driver; and initiating at least partially automated platoon control of the host vehicle in response to the initiate platoon command.

13. A method as recited in claim 12 wherein the state machine can only transition to the back ready to platoon state when a corresponding platoon controller on the partner vehicle is in a front ready to platoon state that requires a driver of the partner vehicle to affirmatively indicate that the driver is ready to platoon.

14. A method as recited in claim 12 wherein the state machine can only transition to the back system ready state when the multiplicity of platooning prerequisite checks are met.

15. A method as recited in claim 14 wherein the platooning prerequisite checks include:
   verifying that the platoon partner is currently in a ready to platoon state;
   verifying that the platoon partner is within a designated range of the host vehicle;
   verifying that communications between the host and the platoon partners are stable; and
   verifying that a tracking unit on the host has a fix on the platoon partner.

16. A method as recited in claim 12 wherein a driver of the trailing vehicle must affirmatively indicate that the driver is ready to platoon for the state machine to transition from the back ready to platoon state to the back maintain platoon control state.

17. A method as recited in claim 12 wherein available states of the state machine when the host vehicle is designated a leading vehicle include:
   a front rendezvous state;
   a front system ready state;
   a front ready to platoon state; and
   a front maintain platoon state.

18. A method as recited in claim 12 wherein the platoon controller is further configured to perform a multiplicity of platooning requirement checks when the state machine is in the back maintain platoon control state, and wherein failure of any of the platooning requirement checks causes the state machine to transition to the back dissolve platoon state.

19. A method as recited in claim 18 wherein one of the platooning requirement checks monitors communications received from the platoon partner and will cause the state machine to transition from the back maintain platoon control state to the back dissolve state if reliable communications are not received from the platoon partner for a designated period of time.

20. A method as recited in claim 18 wherein one of the platooning requirement checks will cause the state machine to transition from the back maintain platoon control state to the back dissolve state when a vehicle of concern is identified in front of the platoon partner.

* * * * *